(12) United States Patent
Sato et al.

(10) Patent No.: US 11,385,390 B2
(45) Date of Patent: Jul. 12, 2022

(54) OPTICAL ELEMENT AND LIGHT GUIDE ELEMENT

(71) Applicant: FUJIFILM Corporation, Tokyo (JP)

(72) Inventors: Hiroshi Sato, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 17/062,952

(22) Filed: Oct. 5, 2020

(65) Prior Publication Data
US 2021/0033764 A1    Feb. 4, 2021

Related U.S. Application Data

(63) Continuation of application No. PCT/JP2019/015022, filed on Apr. 4, 2019.

(30) Foreign Application Priority Data

Apr. 5, 2018    (JP) .............................. JP2018-073412

(51) Int. Cl.
*G02B 5/30*    (2006.01)
*F21V 8/00*    (2006.01)

(52) U.S. Cl.
CPC ......... *G02B 5/3016* (2013.01); *G02B 6/0056* (2013.01)

(58) Field of Classification Search
CPC ... G02B 5/3016; G02B 5/3083; G02B 6/0056
See application file for complete search history.

(56) References Cited

U.S. PATENT DOCUMENTS 11,067,860 B2 *   7/2021  Oh .................... G02B 5/1847
2010/0225876 A1   9/2010  Escuti et al.
(Continued)

FOREIGN PATENT DOCUMENTS

JP    2010-525394 A    7/2010
JP    2012-215794 A    11/2012
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2019/015022, dated Oct. 15, 2020, and English translation of the Written Opinion.
(Continued)

*Primary Examiner* — Thomas A Hollweg
*Assistant Examiner* — Mary A El-Shammaa
(74) *Attorney, Agent, or Firm* — Birch, Stewart, Kolasch & Birch, LLP

(57) ABSTRACT

An object is to provide an optical element in which a wavelength dependence of refraction of transmitted light is small, and a light guide element including the optical element. The object can be achieved with an optical element including: a plurality of optically-anisotropic members including an optically-anisotropic layer that is formed using a liquid crystal compound and has a liquid crystal alignment pattern in which an optical axis rotates in an in-plane direction; and a wavelength selective phase difference layer that is disposed between two optically-anisotropic members and converts circularly polarized light in a specific wavelength range into circularly polarized light having an opposite turning direction, the optically-anisotropic layers of one optically-anisotropic member have the same liquid crystal alignment pattern, in a case where a length over which the (Continued)

direction of the optical axis rotates by 180° is set as a single period, the length of the single period in one or more optically-anisotropic members is different from that of another optically-anisotropic member, the liquid crystal compound of the optically-anisotropic layer is twisted and aligned, and the at least one optically-anisotropic member includes two optically-anisotropic layers having opposite twisted directions of twisted alignments of the liquid crystal compounds.

17 Claims, 13 Drawing Sheets

(56) References Cited

U.S. PATENT DOCUMENTS

| | | |
|---|---|---|
| 2014/0016081 A1 | 1/2014 | Kakubari et al. |
| 2016/0231568 A1 | 8/2016 | Saarikko et al. |
| 2019/0018248 A1 | 1/2019 | Nishiyama et al. |
| 2020/0081170 A1 | 3/2020 | Saitoh et al. |
| 2021/0397011 A1* | 12/2021 | Otani ................ B32B 17/10458 |

FOREIGN PATENT DOCUMENTS

| | | |
|---|---|---|
| WO | WO 2018/150773 A1 | 8/2018 |
| WO | WO 2018/212348 A1 | 11/2018 |

OTHER PUBLICATIONS

International Search Report (Form PCT/ISA/210) for International Application No. PCT/JP2019/015022, dated Jul. 2, 2019, with English translation.
Kress et al., "Towards the Ultimate Mixed Reality Experience: HoloLens Display Architecture Choices," SID 2017 Digest, 2017, pp. 127-131.

* cited by examiner

OPTICAL ELEMENT AND LIGHT GUIDE ELEMENT

CROSS-REFERENCE TO RELATED APPLICATIONS

This application is a Continuation of PCT International Application No. PCT/JP2019/015022 filed on Apr. 4, 2019, which claims priority under 35 U.S.C. § 119(a) to Japanese Patent Application No. 2018-073412 filed on Apr. 5, 2018. The above application is hereby expressly incorporated by reference, in its entirety, into the present application.

BACKGROUND OF THE INVENTION

1. Field of the Invention

The present invention relates to an optical element that refracts transmitted light and a light guide element including the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light propagates in the light guide plate. The light propagated in the light guide plate is also diffracted by the diffraction element in the other end portion of the light guide plate and is emitted from the light guide plate to an observation position by the user.

As the light guide plate used in the AR glasses, for example, a light guide plate (waveguide) described in US2016/0231568A is known.

This light guide plate includes a front surface and a rear surface from which light is reflected and guided, a first portion that is provided on the front surface or the rear surface, and a second portion that is provided on the front surface or the rear surface. The first portion has a structure which causes light to change phase upon reflection from the first portion by a first amount. In addition, the second portion on the same surface has a different structure which causes light to change phase upon reflection from the second portion by a second amount different from the first amount, the structure different from the first portion. Further, in the light guide plate, the first portion is offset from the second portion by a distance which substantially matches the difference between the second amount and the first amount.

SUMMARY OF THE INVENTION

However, as also described in US2016/0231568, an angle of light diffraction by a diffraction element depends on the wavelength of the light. That is, a traveling direction of light diffracted by a diffraction element varies depending on the wavelength of the light.

Accordingly, in a case where light components having different wavelengths are diffracted by one diffraction element to be introduced into a light guide plate and are emitted from the light guide plate, for example, in the case of a color image consisting of a red image, a green image, and a blue image, a so-called color shift in which positions of the red image, the green image, and the blue image are different from each other occurs.

In order to solve the problem, in the AR glasses described in Bernard C. Kress et al., Towards the Ultimate Mixed Reality Experience: HoloLens Display Architecture Choices, SID 2017 DIGEST, pp. 127-131, three elongated light guide plates corresponding to the red image, the green image, and the blue image in which a diffraction element (surface relief grating (SRG)) is provided at opposite ends are prepared, the three light guide plates including the diffraction element are laminated, and a projection image of each of the colors displayed by a display is guided to an observation position by a user such that a color image is displayed.

As a result, in the AR glasses, the positions of the red image, the green image, and the blue image are matched to each other, and a color image having no color shift is displayed.

This way, in the AR glasses of the related art, the image displayed by the display is guided to the observation position by the user. Therefore, it is necessary to laminate the three light guide plates each of which includes the diffraction element. Thus, as a whole, the light guide plate is thick and heavy. Further, the device configuration is also complicated.

An object of the present invention is to solve the above-described problem of the related art and to provide an optical element in which a wavelength dependence of an angle of transmitted light is small, for example, red light, green light, and blue light incident from the same direction can be refracted and transmitted substantially in the same direction, and the amount of transmitted light is large and a light guide element including the optical element.

In order to achieve the object, an optical element according to an aspect of the present invention has the following configurations.

[1] An optical element comprising:
a plurality of optically-anisotropic members including at least one optically-anisotropic layer that is formed using a composition including a liquid crystal compound and has a liquid crystal alignment pattern in which a direction of an optical axis derived from the liquid crystal compound changes while continuously rotating in at least an in-plane direction; and
a wavelength selective phase difference layer that is disposed between at least one pair of optically-anisotropic members among the plurality of optically-anisotropic members and converts circularly polarized light in a specific wavelength range into circularly polarized light having an opposite turning direction,
in which in a case where, in the liquid crystal alignment pattern, a length over which the direction of the optical axis rotates by 180° in the in-plane direction in which the direction of the optical axis changes while continuously rotating is set as a single period, the length of the single period in the optically-anisotropic layer of at least one optically-anisotropic member is different from that in the optically-anisotropic layer of another optically-anisotropic member, the liquid crystal compound in the optically-anisotropic layer is twisted and aligned in a thickness direction, and the at least one optically-anisotropic member includes two optically-anisotropic layers having the same in-plane liquid crystal alignment pattern and opposite twisted directions of twisted alignments of the liquid crystal compounds.

[2] The optical element according to [1], in which an optically-anisotropic member positioned at one end in an arrangement direction of the optically-anisotropic members includes one optically-anisotropic layer.

[3] The optical element according to [1], wherein each of all the optically-anisotropic members includes the two optically-anisotropic layers.

[4] The optical element according to any one of [1] to [3], in which the wavelength selective phase difference layer is disposed between each of plural pairs of adjacent optically-anisotropic members, and a specific wavelength range in which circularly polarized light is converted by the wavelength selective phase difference layer gradually decreases in an arrangement direction of the optically-anisotropic members.

[5] The optical element according to any one of [1] to [4], in which the length of the single period in the liquid crystal alignment pattern of the optically-anisotropic layer varies depending on all the optically-anisotropic members.

[6] The optical element according to any one of [1] to [5], in which the optically-anisotropic members and the wavelength selective phase difference layers are alternately disposed.

[7] The optical element according to any one of [1] to [6], in which in the optically-anisotropic layer of the optically-anisotropic member positioned at one end in an arrangement direction of the optically-anisotropic members, the length of the single period in the liquid crystal alignment pattern is the shortest.

[8] The optical element according to any one of [1] to [7], in which the optically-anisotropic layer of the at least one the optically-anisotropic member has in-plane regions having different lengths of the single periods in the liquid crystal alignment pattern.

[9] The optical element according to [8], in which the length of the single period in the liquid crystal alignment pattern gradually decreases in the in-plane direction in which the direction of the optical axis derived from the liquid crystal compound changes while continuously rotating in the liquid crystal alignment pattern.

[10] The optical element according to any one of [1] to [9], in which the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

[11] The optical element according to any one of [1] to [10], comprising:

three or more optically-anisotropic members; and two or more wavelength selective phase difference layers.

[12] The optical element according to [11], in which one wavelength selective phase difference layer converts circularly polarized light of red light into circularly polarized light having an opposite turning direction, and another wavelength selective phase difference layer converts circularly polarized light of green light into circularly polarized light having an opposite turning direction.

[13] The optical element according to any one of [1] to [12], in which the wavelength selective phase difference layer consists of a plurality of phase difference layers, and an in-plane slow axis direction of at least one phase difference layer is different from that of another phase difference layer.

[14] The optical element according to [13], in which at least one phase difference layer in the wavelength selective phase difference layer is a λ/4 plate.

[15] The optical element according to [14], in which the λ/4 plate in the wavelength selective phase difference layer has reverse wavelength dispersion properties, and at least one other phase difference layer has forward wavelength dispersion properties.

[16] A light guide element comprising:

the optical element according to any one of [1] to [15]; and a light guide plate.

[17] The light guide element according to [16], in which two optical elements spaced from each other are provided in the light guide plate.

In the optical element and the light guide element according to the present invention, the wavelength dependence of the refraction angle is small, and for example, red light, green light, and blue light incident from the same direction can be refracted to be emitted substantially in the same direction. Further, the amount of transmitted light (emitted light) is also large.

DESCRIPTION OF THE PREFERRED EMBODIMENTS

Figure 1:
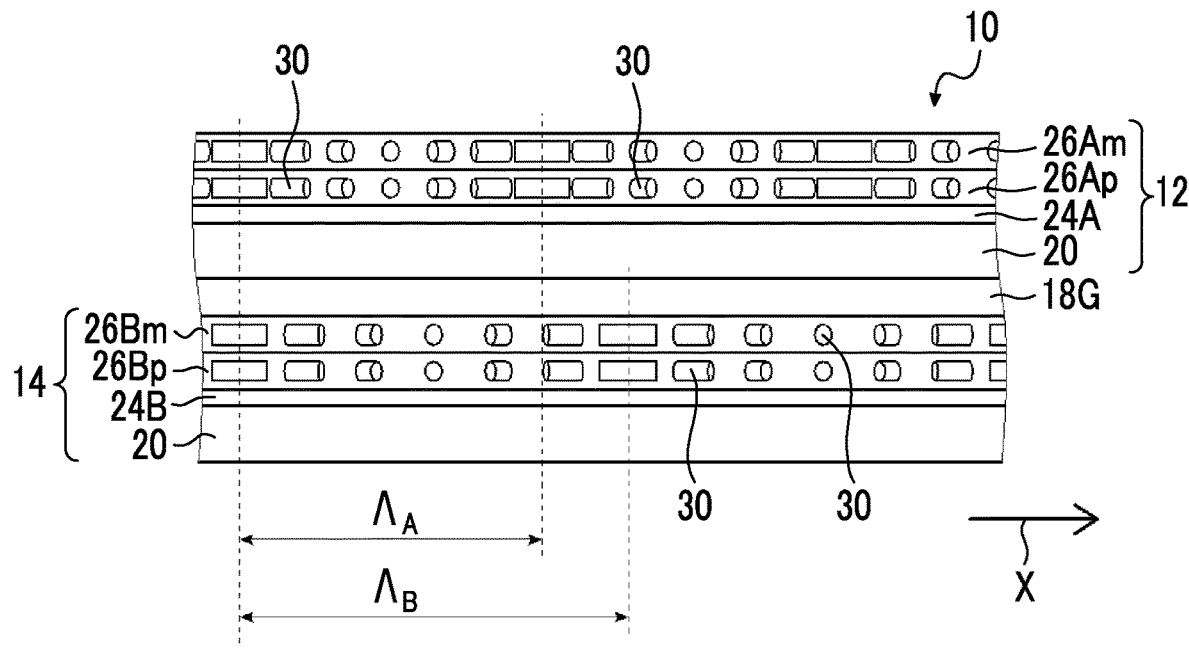
FIG. 1 is a diagram conceptually showing an example of an optical element according to the present invention.

Hereinafter, an optical element and a light guide element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" and "equal" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$, using AxoScan (manufactured by Axometrics, Inc.). By inputting an average refractive index $((nx+ny+nz)/3)$ and a thickness (d (μm)) to AxoScan, the following expressions can be calculated.

$Re(\lambda)=R0(\lambda)$   Slow Axis Direction(°)

$R0(\lambda)$ is expressed as a numerical value calculated by AxoScan and represents $Re(\lambda)$.

An optical element according to the embodiment of the present invention comprises: a plurality of optically-anisotropic members including at least one optically-anisotropic layer that is formed using a composition including a liquid crystal compound and has a liquid crystal alignment pattern in which a direction of an optical axis derived from the liquid crystal compound changes while continuously rotating in at least an in-plane direction; and a wavelength selective phase difference layer that is disposed at least a pair of two optically-anisotropic members adjacent to each other in an arrangement direction.

Here, the wavelength selective phase difference layer converts circularly polarized light in a specific wavelength range into circularly polarized light having an opposite turning direction and allows transmission (passage) of the other light as it is. In a case where the wavelength selective phase difference layer converts circularly polarized light of red light into circularly polarized light having an opposite turning direction, the wavelength selective phase difference layer converts right circularly polarized light into left circularly polarized light and converts left circularly polarized light into right circularly polarized light for only red light, and allows transmission of the other light such as green light and blue light as it is irrespective of the turning direction of circularly polarized light or the like.

In addition, in the optical element according to the embodiment of the present invention, optically-anisotropic layers in one optically-anisotropic member have the same in-plane liquid crystal alignment pattern. Further, in a case where, in the liquid crystal alignment pattern of the optically-anisotropic layer, a length over which the direction of the optical axis derived from the liquid crystal compound rotates by 180° in the in-plane direction in which the direction of the optical axis derived from the liquid crystal compound changes while continuously rotating is set as a single period, the length of the single period in the optically-anisotropic layer in one optically-anisotropic member is different from that in the optically-anisotropic layer of another optically-anisotropic member.

Further, in the optical element according to the embodiment of the present invention, the liquid crystal compound in the optically-anisotropic layer is twisted and aligned in a thickness direction, and the at least one optically-anisotropic member includes two optically-anisotropic layers having the same in-plane liquid crystal alignment pattern and opposite twisted directions of twisted alignments of the liquid crystal compounds.

Although described below in detail, the optical element according to the embodiment of the present invention has the above-described configuration such that a wavelength dependence of a refraction angle of incident and transmitted light is small, and light components having different wavelengths incident from the same direction can be emitted substantially in the same direction, and the amount of transmitted light (emitted light) can be made to be large.

[First Aspect of Optical Element]

FIG. 1 is a diagram conceptually showing an example of the optical element according to the embodiment of the present invention.

An optical element 10 in the example shown in the drawing includes a first optically-anisotropic member 12, a second optically-anisotropic member 14, and a wavelength selective phase difference layer 18G that is disposed between the first optically-anisotropic member 12 and the second optically-anisotropic member 14.

As described above, in the optical element according to the embodiment of the present invention, optically-anisotropic members including an optically-anisotropic layer that is formed using a composition including a liquid crystal compound and has a predetermined liquid crystal alignment pattern in which an optical axis derived from the liquid crystal compound rotates in a plane are arranged in a thickness direction. Further, the optically-anisotropic layer has an in-plane liquid crystal alignment pattern, and the liquid crystal compound is twisted and aligned in the thickness direction.

The first optically-anisotropic member 12 includes a support 20, an alignment film 24A, a right-twisted optically-anisotropic layer 26Ap, and a left-twisted optically-anisotropic layer 26Am. In addition, the second optically-anisotropic member 14 includes the support 20, an alignment film 24B, a right-twisted optically-anisotropic layer 26Bp, and a left-twisted optically-anisotropic layer 26Bm.

Figure 2:
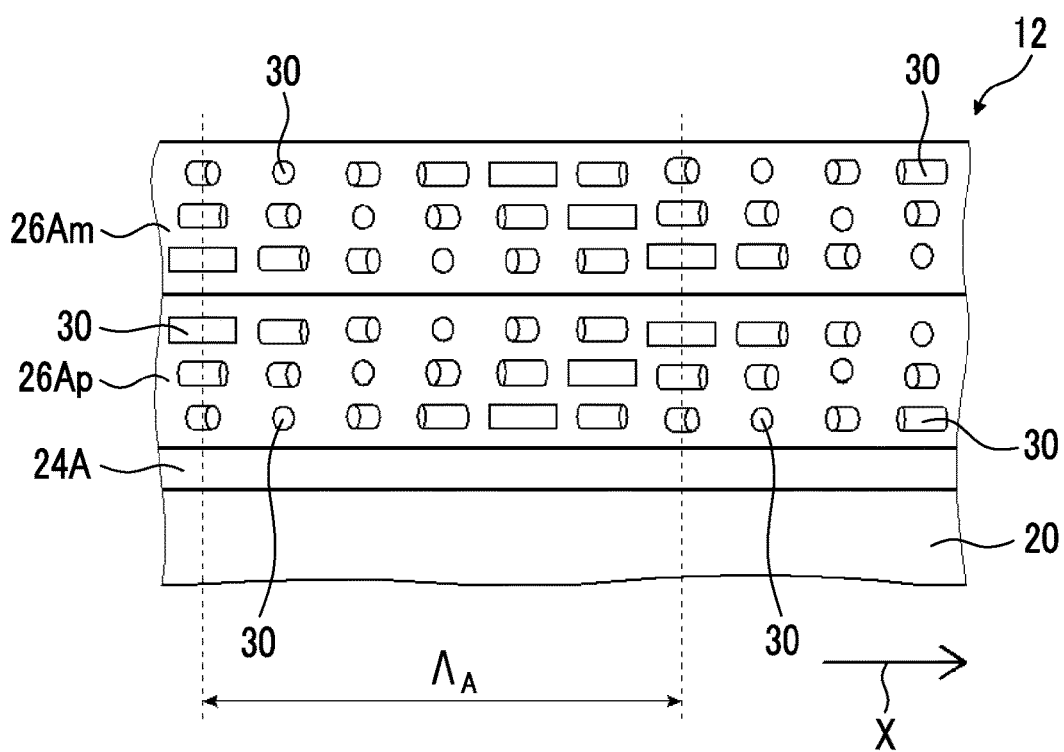
FIG. 2 is a diagram conceptually showing an optically-anisotropic layer of the optical element shown in FIG. 1.

In all the right-twisted optically-anisotropic layer 26Ap, the left-twisted optically-anisotropic layer 26Am, the right-twisted optically-anisotropic layer 26Bp, and the left-twisted optically-anisotropic layer 26Bm, the liquid crystal compound is twisted and aligned in the thickness direction (refer to FIG. 2).

In the right-twisted optically-anisotropic layer 26Ap and the right-twisted optically-anisotropic layer 26Bp, the twisted direction of the twisted alignment of the liquid crystal compound in the thickness direction is the right direction (the twisted angle is $+\phi$) in case of being seen from the upper side (light incidence side) in the drawing. On the other hand, in the left-twisted optically-anisotropic layer 26Am and the left-twisted optically-anisotropic layer 26Bm, the twisted direction of the twisted alignment of the liquid crystal compound in the thickness direction is the left direction (the twisted angle is $-\phi$) in case of being seen from the upper side in the drawing.

In the following description, "the twisted direction of the twisted alignment of the liquid crystal compound in the thickness direction" will also be simply referred to as "the twisted direction of the liquid crystal compound". In addition, in the present invention, the twisted direction of the liquid crystal compound is a twisted direction in case of being seen from the light incidence direction of the optical element 10.

In addition, in the optical element according to the embodiment of the present invention, the wavelength selective phase difference layer converts circularly polarized light in a specific wavelength range into circularly polarized light having an opposite turning direction and allows transmission (passage) of the other light as it is.

In the optical element 10 in the example shown in the drawing, the wavelength selective phase difference layer 18G converts a turning direction of circularly polarized light of green light into an opposite turning direction and allows transmission of the other light as circularly polarized light as it is without converting the turning direction.

Although not shown in the drawing, the first optically-anisotropic member 12 and the wavelength selective phase difference layer 18G, and the wavelength selective phase difference layer 18G and the second optically-anisotropic member 14 are bonded to each other through bonding layers provided therebetween, respectively.

In the present invention, as the bonding layer, any layer consisting of one of various well-known materials can be used as long as it is a layer that can bond materials as bonding targets. The bonding layer may be a layer consisting of an adhesive that has fluidity during bonding and is a solid after bonding, a layer consisting of a pressure sensitive adhesive that is a gel-like (rubber-like) flexible solid during bonding and of which the gel state does not change after bonding, or a layer consisting of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the first optically-anisotropic member 12, the wavelength selective phase difference layer 18G, and the second optically-anisotropic member 14 may be laminated and held by a frame, a holding device, or the like to configure the optical element according to the embodiment of the present invention.

The optical element according to the embodiment of the present invention is not limited to the configuration in which the first optically-anisotropic member 12, the wavelength selective phase difference layer 18G, and the second optically-anisotropic member 14 are laminated in a state where they are closely attached to each other as in the example shown in the drawing, and may adopt a configuration in which the members are arranged in a state where one or more members are spaced from each other.

In addition, the optical element 10 in the example shown in the drawing includes the support 20 for each of the optically-anisotropic members. However, the optical element according to the embodiment of the present invention does not necessarily include the support 20 for each of the optically-anisotropic members.

For example, the optical element according to the embodiment of the present invention may have a configuration in which the wavelength selective phase difference layer 18G is formed on a surface of the second optically-anisotropic member 14 (the right-twisted optically-anisotropic layer 26Bp), the alignment film 24A is formed on a surface thereof, and the first optically-anisotropic member 12 (the right-twisted optically-anisotropic layer 26Ap and the left-twisted optically-anisotropic layer 26Am) is formed thereon.

Alternatively, the support 20 of the second optically-anisotropic member 14 may be peeled off from the above-described configuration such that only the wavelength selective phase difference layer, the alignment film, and the optically-anisotropic layers configure the optical element according to the embodiment of the present invention. In addition, the alignment film may be peeled off from the above-described configuration such that only the wavelength selective phase difference layer and the optically-anisotropic layers configure the optical element according to the embodiment of the present invention.

That is, the optical element according to the embodiment of the present invention can use various layer configurations as long as a plurality of optically-anisotropic members are arranged, a wavelength selective phase difference layer is disposed between at least one pair of two optically-anisotropic members adjacent to each other among the arranged optically-anisotropic members, the optically-anisotropic layer has a liquid crystal alignment pattern in which a direction of an optical axis derived from a liquid crystal compound rotates in one in-plane direction, the liquid crystal alignment patterns of the optically-anisotropic layers of at least one optically-anisotropic member have different single periods described below, and the liquid crystal compound in the optically-anisotropic layer is twisted and aligned in a thickness direction, and at least one optically-anisotropic member includes two optically-anisotropic layers having the same in-plane liquid crystal alignment pattern and opposite twisted directions of twisted alignments of the liquid crystal compounds.

<Optically-Anisotropic Member>

In the optical element 10 according to the embodiment of the present invention, the wavelength selective phase difference layer 18G is provided between the first optically-anisotropic member 12 and the second optically-anisotropic member 14.

As described above, the first optically-anisotropic member 12 includes the support 20, the alignment film 24A, the right-twisted optically-anisotropic layer 26Ap, and the left-twisted optically-anisotropic layer 26Am. In addition, the second optically-anisotropic member 14 includes the support 20, the alignment film 24B, the right-twisted optically-anisotropic layer 26Bp, and the left-twisted optically-anisotropic layer 26Bm.

<<Support>>

In the first optically-anisotropic member 12 and the second optically-anisotropic member 14, the support 20 supports the alignment film and the optically-anisotropic layer.

In the following description, in a case where it is not necessary to distinguish between the alignment films 24A and 24B, the alignment films 24A and 24B will also be collectively referred to as "alignment film". In addition, in the following description, in a case where it is not necessary to distinguish between the right-twisted optically-anisotropic layer 26Ap, the left-twisted optically-anisotropic layer 26Am, the right-twisted optically-anisotropic layer 26Bp, and the left-twisted optically-anisotropic layer 26Bm, these optically-anisotropic layers will also be collectively referred to as "optically-anisotropic layer".

As the support 20, various sheet-shaped materials (films or plate-shaped materials) can be used as long as they can support the alignment film and the optically-anisotropic layer.

As the support 20, a transparent support is preferable, and examples thereof include a polyacrylic resin film such as polymethyl methacrylate, a cellulose resin film such as cellulose triacetate, a cycloolefin polymer film, polyethylene terephthalate (PET), polycarbonate, and polyvinyl chloride. Examples of the cycloolefin polymer film include trade name "ARTON", manufactured by JSR Corporation and trade name "ZEONOR", manufactured by Zeon Corporation). The support is not limited to a flexible film and may be a non-flexible substrate such as a glass substrate.

The thickness of the support 20 is not particularly limited and may be appropriately set depending on the use of the optical element 10, a material for forming the support 20, and the like in a range where the alignment film and the optically-anisotropic layer can be supported.

The thickness of the support 20 is preferably 1 to 1000 μm, more preferably 3 to 250 μm, and still more preferably 5 to 150 μm.

<<Alignment Film>>

In the first optically-anisotropic member 12, the alignment film 24A is formed on the surface of the support 20. The alignment film 24A is an alignment film for aligning the liquid crystal compound 30 in a plane of the optically-anisotropic layer to a predetermined liquid crystal alignment pattern during the formation of the right-twisted optically-anisotropic layer 26Ap and the left-twisted optically-anisotropic layer 26Am.

On the other hand, in the second optically-anisotropic member 14, the alignment film 24B is formed on the surface of the support 20. The alignment film 24B is an alignment film for aligning the liquid crystal compound 30 in a plane of the optically-anisotropic layer to a predetermined liquid crystal alignment pattern during the formation of the right-twisted optically-anisotropic layer 26Bp and the left-twisted optically-anisotropic layer 26Bm.

In each of the optically-anisotropic layers, as described above, the liquid crystal compound 30 has the in-plane liquid crystal alignment pattern and is twisted and aligned in the thickness direction. The twisted alignment of the liquid crystal compound 30 in the thickness direction is obtained by the action of a chiral agent in the optically-anisotropic layer.

Although described below, in the optical element 10 according to the embodiment of the present invention, the optically-anisotropic layer has a liquid crystal alignment pattern in which a direction of an optical axis 30A (refer to FIG. 3) derived from the liquid crystal compound 30 changes while continuously rotating in one in-plane direction (arrow X direction described below). Accordingly, the alignment film of each of the optically-anisotropic members is formed such that the optically-anisotropic layer can form the liquid crystal alignment pattern.

In addition, in the optical element according to the embodiment of the present invention, in a case where a length over which the direction of the optical axis 30A rotates by 180° in the in-plane direction in which the direction of the optical axis 30A changes while continuously rotating in the liquid crystal alignment pattern is set as a single period (a rotation period of the optical axis), a length of the single period of the liquid crystal alignment pattern in the optically-anisotropic layer of at least one optically-anisotropic member is different from that of the optically-anisotropic layer of another optically-anisotropic member.

In the optical element 10 shown in FIG. 1, a single period (single period $\Lambda_A$) of the liquid crystal alignment pattern in the right-twisted optically-anisotropic layer 26Ap and the left-twisted optically-anisotropic layer 26Am is shorter than a single period (single period $\Lambda_B$) of the liquid crystal alignment pattern in the right-twisted optically-anisotropic layer 26Bp and the left-twisted optically-anisotropic layer 26Bm.

In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking ester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 15:
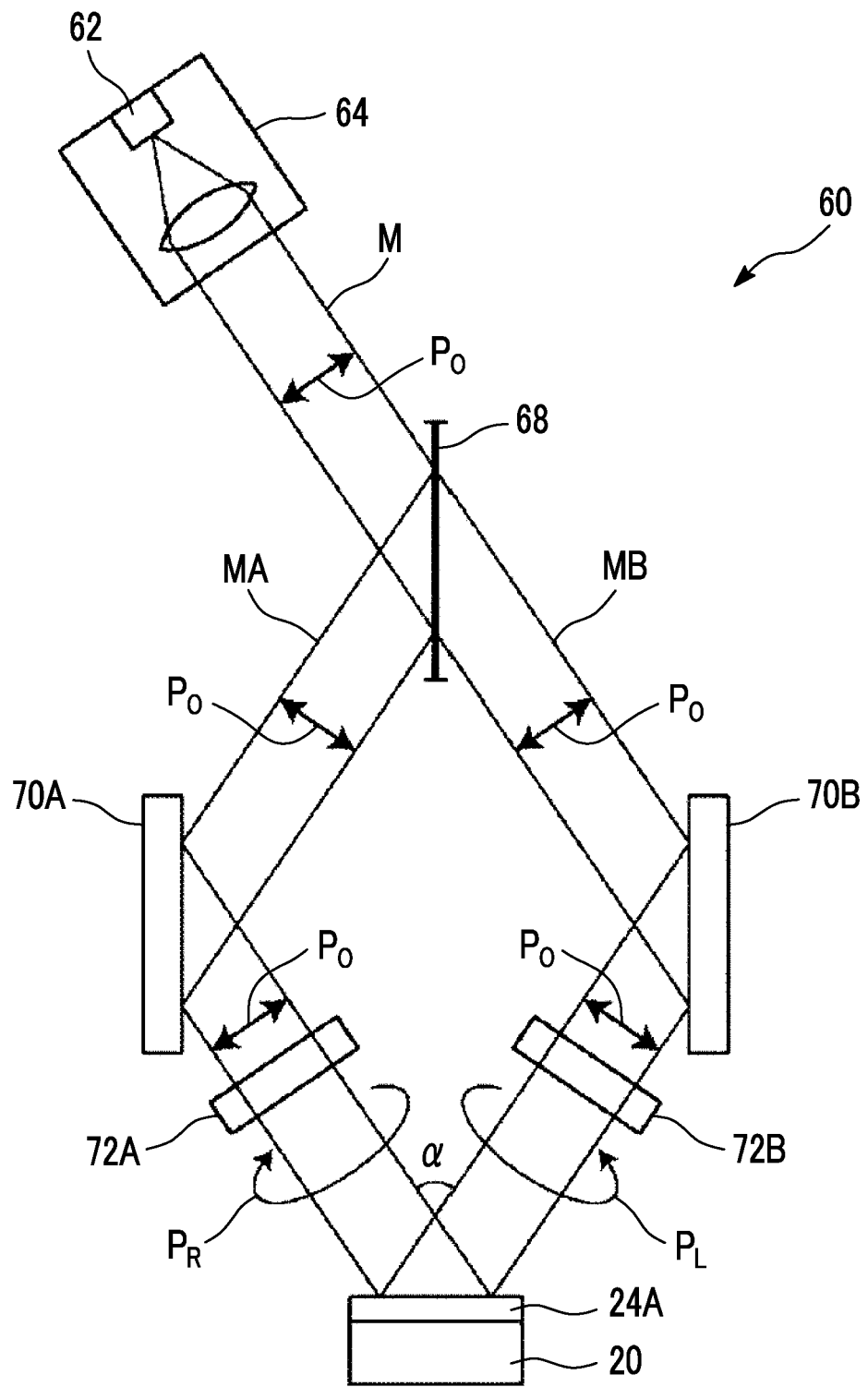
FIG. 15 is a diagram conceptually showing an example of an exposure device that exposes an alignment film of the optical element shown in FIG. 1.

FIG. 15 conceptually shows an example of an exposure device that exposes the alignment film to form an alignment pattern. In the example shown in FIG. 15, for example, the exposure of the alignment film 24A of the first optically-anisotropic member 12 is shown. The alignment film 24B of the second optically-anisotropic member 14 can also form the alignment pattern as in the exposure device.

An exposure device 60 shown in FIG. 15 includes: a light source 64 that includes a laser 62; a beam splitter 68 that splits laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 includes a polarizing plate and emits linearly polarized light $P_0$. The λ/4 plates 72A and 72B have optical axes perpendicular to each other. The λ/4 plate 72A converts the linearly polarized light $P_0$ (beam MA) into right circularly polarized light $P_R$, and λ/4 plate 72B converts the linearly polarized light $P_0$ (beam MB) into left circularly polarized light $P_L$.

The support 20 including the alignment film 24A on which the alignment pattern is not yet formed is disposed at an exposed portion, the two beams MA and MB intersect and interfere each other on the alignment film 24A, and the alignment film 24A is irradiated with and exposed to the interference light.

Due to the interference in this case, the polarization state of light with which the alignment film 24A is irradiated periodically changes according to interference fringes. As a result, in the alignment film 24A, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the liquid crystal alignment pattern in which the optical axis 30A derived from the liquid crystal compound 30 continuously rotates in the in-plane direction, the length (single period Λ) of the single period over which the optical axis 30A rotates by 180° in the in-plane direction in which the optical axis 30A rotates can be adjusted.

By forming the optically-anisotropic layer on the alignment film having the alignment pattern in which the alignment state periodically changes, as described below, the right-twisted optically-anisotropic layer 26Ap and the left-twisted optically-anisotropic layer 26Am having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

As described above, in the optical element according to the embodiment of the present invention, optically-anisotropic layers in one optically-anisotropic member have the same in-plane liquid crystal alignment pattern. Accordingly, the right-twisted optically-anisotropic layer 26Ap and the left-twisted optically-anisotropic layer 26Am have the same in-plane liquid crystal alignment pattern. Further, the right-twisted optically-anisotropic layer 26Bp and the left-twisted optically-anisotropic layer 26Bm in the second optically-anisotropic member 14 have the same in-plane liquid crystal alignment pattern.

Here, in the optical element 10 shown in FIG. 1, the alignment film is formed on only an underlayer of the right-twisted optically-anisotropic layer 26Ap and an underlayer of the right-twisted optically-anisotropic layer 26Bp.

In the optically-anisotropic layer that is formed using the composition including the liquid crystal compound, in a case where the underlayer, that is, the formation surface (deposition surface) has the in-plane liquid crystal alignment pattern, the in-plane liquid crystal alignment pattern is formed to conform to the in-plane liquid crystal alignment pattern of the underlayer even without the alignment film. Accordingly, even in a case where the alignment film is not formed on the underlayer of the left-twisted optically-anisotropic layer 26Am, the in-plane liquid crystal alignment pattern of the left-twisted optically-anisotropic layer 26Am is the same as that of the right-twisted optically-anisotropic layer 26Ap. Further, even in a case where the alignment film is not formed on the underlayer of the left-twisted optically-anisotropic layer 26Bm, the in-plane liquid crystal alignment pattern of the left-twisted optically-anisotropic layer 26Bm is the same as that of the right-twisted optically-anisotropic layer 26Bp.

However, the present invention is not limited to this configuration. That is, optionally, the alignment film may be provided on the underlayer of the left-twisted optically-anisotropic layer 26Am and/or the left-twisted optically-anisotropic layer 26Bm. However, in the present invention, the optically-anisotropic layers in the same optically-anisotropic member have the same in-plane liquid crystal alignment pattern. Therefore, all the alignment films in the same optically-anisotropic member have the same alignment pattern.

In the optical element according to the embodiment of the present invention, the alignment film is provided as a preferable aspect and is not an essential component.

For example, the following configuration can also be adopted, in which, by forming the alignment pattern on the support 20, for example, using a method of rubbing the support 20 or a method of processing the support 20 with laser light or the like, the right-twisted optically-anisotropic layer 26Ap or the like has the liquid crystal alignment pattern in which the direction of the optical axis 30A derived from the liquid crystal compound 30 changes while continuously rotating in at least an in-plane direction.

<<Optically-Anisotropic Layer>>

In the first optically-anisotropic member 12, the right-twisted optically-anisotropic layer 26Ap is formed on the surface of the alignment film 24A, and the left-twisted optically-anisotropic layer 26Am is formed on the surface of the right-twisted optically-anisotropic layer 26Ap. In addition, in the second optically-anisotropic member 14, the right-twisted optically-anisotropic layer 26Bp is formed on the surface of the alignment film 24B, and the left-twisted optically-anisotropic layer 26Bm is formed on the surface of the right-twisted optically-anisotropic layer 26Bp.

In FIG. 1, in order to simplify the drawing and to clarify the configuration of the optical element 10, only the liquid crystal compound 30 (liquid crystal compound molecules) on the surface of the alignment film in the right-twisted optically-anisotropic layer 26Ap, the left-twisted optically-anisotropic layer 26Am, the right-twisted optically-anisotropic layer 26Bp, and the left-twisted optically-anisotropic layer 26Bm is shown. Regarding this point, the same can also be applied to FIGS. 9, 11, 12, and 14 described below.

In all the right-twisted optically-anisotropic layer 26Ap, the left-twisted optically-anisotropic layer 26Am, the right-twisted optically-anisotropic layer 26Bp, and the left-twisted optically-anisotropic layer 26Bm, as conceptually shown in FIG. 2 using the first optically-anisotropic member 12 as an example, a plurality of liquid crystal compounds 30 are arranged in the thickness direction and are twisted and aligned in the thickness direction.

As described above, in the optical element 10 according to the embodiment of the present invention, the optically-anisotropic layer (the right-twisted optically-anisotropic layer 26Ap, the left-twisted optically-anisotropic layer 26Am, the right-twisted optically-anisotropic layer 26Bp, and the left-twisted optically-anisotropic layer 26Bm) is formed using the composition including the liquid crystal compound.

In a case where an in-plane retardation value is set as $\lambda/2$, the optically-anisotropic layer has a function of a general $\lambda/2$ plate, that is, a function of imparting a phase difference of a half wavelength, that is, 180° to two linearly polarized light components in light incident into the optically-anisotropic layer and are perpendicular to each other.

The optically-anisotropic layer has the liquid crystal alignment pattern in which the direction of the optical axis derived from the liquid crystal compound changes while continuously rotating in the in-plane direction indicated by arrow X in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "in-plane direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

In the optically-anisotropic layer, the liquid crystal compound 30 is two-dimensionally aligned in a plane parallel to the arrow X direction and a Y direction perpendicular to the arrow X direction. That is, in FIGS. 1 and 2 and FIGS. 4, 5, and 9 described below, the Y direction is a direction perpendicular to the paper plane.

As described above, the right-twisted optically-anisotropic layer 26Ap and the left-twisted optically-anisotropic layer 26Am in the first optically-anisotropic member 12 have the same in-plane liquid crystal alignment pattern. In addition, the right-twisted optically-anisotropic layer 26Bp and the left-twisted optically-anisotropic layer 26Bm in the second optically-anisotropic member 14 have the same in-plane liquid crystal alignment pattern.

In the present invention, specifically, the optically-anisotropic layers having the same in-plane liquid crystal alignment pattern represents that the in-plane directions in which the direction of the optical axis derived from the liquid crystal compound continuously changes while rotating, the in-plane directions in which the direction of the optical axis derived from the liquid crystal compound continuously rotates, and the lengths (single periods Λ) of the single periods over which the direction of the optical axis 30A in the liquid crystal alignment pattern rotates by 180° are all the same. The in-plane direction in which the direction of the optical axis derived from the liquid crystal compound continuously changes while rotating is the arrow X direction in the example shown in the drawing. In addition, the in-plane directions in which the direction of the optical axis derived from the liquid crystal compound continuously rotates is clockwise in the arrow X direction in the example shown in the drawing.

However, the right-twisted optically-anisotropic layer 26Ap and left-twisted optically-anisotropic layer 26Am have opposite twisted directions of the liquid crystal compounds 30 that are twisted and aligned in the thickness direction. Likewise, the right-twisted optically-anisotropic layer 26Bp and left-twisted optically-anisotropic layer 26Bm have opposite twisted directions of the liquid crystal compounds 30 that are twisted and aligned in the thickness direction.

Figure 3:
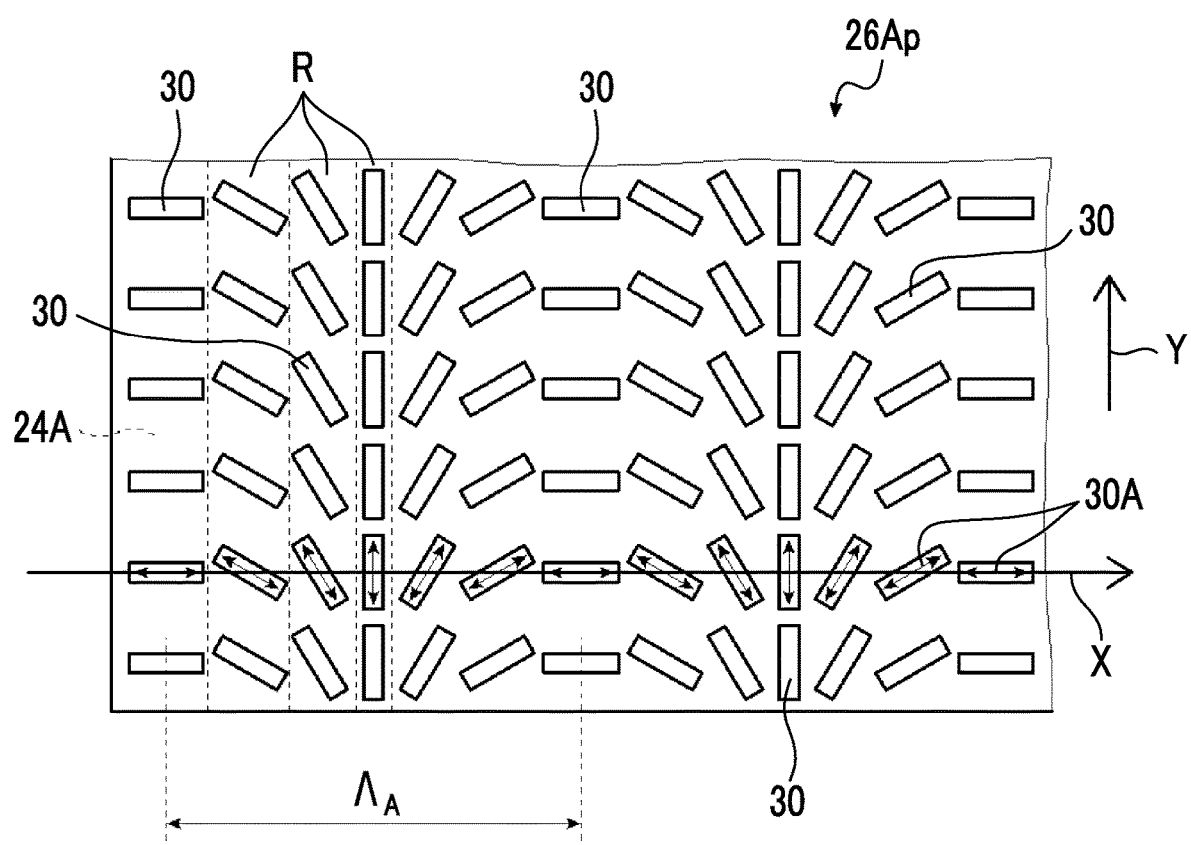
FIG. 3 is a plan view showing the optically-anisotropic layer of the optical element shown in FIG. 1.

FIG. 3 conceptually shows a plan view of the right-twisted optically-anisotropic layer 26Ap.

The plan view is a view in a case where the optical element 10 is seen from the top in FIG. 1, that is, a view in a case where the optical element 10 is seen from a thickness direction. In other words, the plan view is a view in a case where the right-twisted optically-anisotropic layer 26Ap is seen from a direction (normal direction) perpendicular to a main surface. The main surface is the maximum surface of a sheet-shaped material (a plate-shaped material or a film). That is, the thickness direction is a laminating direction of the respective layers (films).

In addition, in FIG. 3, in order to clarify the configuration of the optical element 10 according to the embodiment of the present invention, only the liquid crystal compound 30 on the surface of the alignment film 24A is shown as in FIG. 1.

However, in the thickness direction, as shown in FIG. 2, the right-twisted optically-anisotropic layer 26Ap has the structure in which the liquid crystal compound 30 is twisted and aligned in the thickness direction and laminated on the surface of the alignment film 24A as described above.

In the optically-anisotropic layer, the liquid crystal alignment pattern in which the direction of the optical axis derived from the liquid crystal compound changes while continuously rotating in an in-plane direction indicated by arrow X contributes to refraction of light transmitted through the optically-anisotropic layer.

FIG. 3 shows the right-twisted optically-anisotropic layer 26Ap as a representative example, but the left-twisted optically-anisotropic layer 26Am also exhibits the same effects. However, basically, the right-twisted optically-anisotropic layer 26Bp and the left-twisted optically-anisotropic layer 26Bm also have the same configuration and the same effects as those of the right-twisted optically-anisotropic layer 26Ap, except that the lengths (single periods Λ) of the single periods of the liquid crystal alignment patterns described below are different from each other.

In the optical element 10, the direction in which the direction of the optical axis 30A rotates in the optically-anisotropic layer of the first optically-anisotropic member 12 is opposite to that in the optically-anisotropic layer of the second optically-anisotropic member 14. That is, in a case where the rotation of the direction of the optical axis 30A in the optically-anisotropic layer of the first optically-anisotropic member 12 is clockwise with respect to the arrow X direction, the rotation of the direction of the optical axis 30A in the optically-anisotropic layer of the second optically-anisotropic member 14 is counterclockwise with respect to the arrow X direction.

The right-twisted optically-anisotropic layer 26Ap has the liquid crystal alignment pattern in which the direction of the optical axis 30A derived from the liquid crystal compound 30 changes while continuously rotating in the arrow X direction in a plane.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, regarding the liquid crystal compound 30 forming the right-twisted optically-anisotropic layer 26Ap, the liquid crystal compounds 30 having the same direction of the optical axes 30A are arranged at regular intervals in the Y direction perpendicular to the arrow X direction, that is, the Y direction perpendicular to the in-plane direction in which the optical axis 30A continuously rotates.

In other words, regarding the liquid crystal compound 30 forming the right-twisted optically-anisotropic layer 26Ap, in the liquid crystal compounds 30 arranged in the Y direction, angles between the directions of the optical axes 30A and the arrow X direction are the same.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, the length Λ of the single period in the optically-anisotropic layer is a distance between centers of two liquid crystal compounds 30 in the arrow X direction, the two liquid crystal compounds having the same angle in the arrow X direction. Specifically, as shown in FIG. 3, a distance of centers in the arrow X direction of two liquid crystal compounds 30 in which the arrow X direction and the direction of the optical axis 30A match each other is the length Λ of the single period. In the following description, the length Λ of the single period will also be referred to as "single period Λ".

In addition, in the following description, in order to distinguish between the single periods Λ of the respective optically-anisotropic layers, the single period Λ of the right-twisted optically-anisotropic layer 26Ap will also be referred to as "$Λ_A$", and the single period Λ of the right-twisted optically-anisotropic layer 26Bp will also be referred to as "$Λ_B$". As described above, the optically-anisotropic layers in the same optically-anisotropic member have the same single period Λ. Accordingly, the single period Λ in the left-twisted optically-anisotropic layer 26Am is also "$Λ_A$", and the single period Λ in the left-twisted optically-anisotropic layer 26Bm is "$Λ_B$".

In the optical element 10 according to the embodiment of the present invention, in the liquid crystal alignment pattern of the optically-anisotropic layer, the single period Λ is repeated in the arrow X direction, that is, in the in-plane direction in which the direction of the optical axis 30A changes while continuously rotating.

As described above, in the liquid crystal compounds arranged in the Y direction in the optically-anisotropic layer, the angles between the optical axes 30A and the arrow X direction (the in-plane direction in which the direction of the optical axis of the liquid crystal compound 30 rotates) are the same. Regions where the liquid crystal compounds 30 in which the angles between the optical axes 30A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the optically-anisotropic layer having the liquid crystal alignment pattern in which the direction of the optical axis 30A continuously changes while rotating in a plane as in the right-twisted optically-anisotropic layer 26Ap (the left-twisted optically-anisotropic layer 26Am, the right-twisted optically-anisotropic layer 26Bp, and the left-twisted optically-anisotropic layer 26Bm), light is refracted, and the direction of circularly polarized light is converted.

Figure 4:
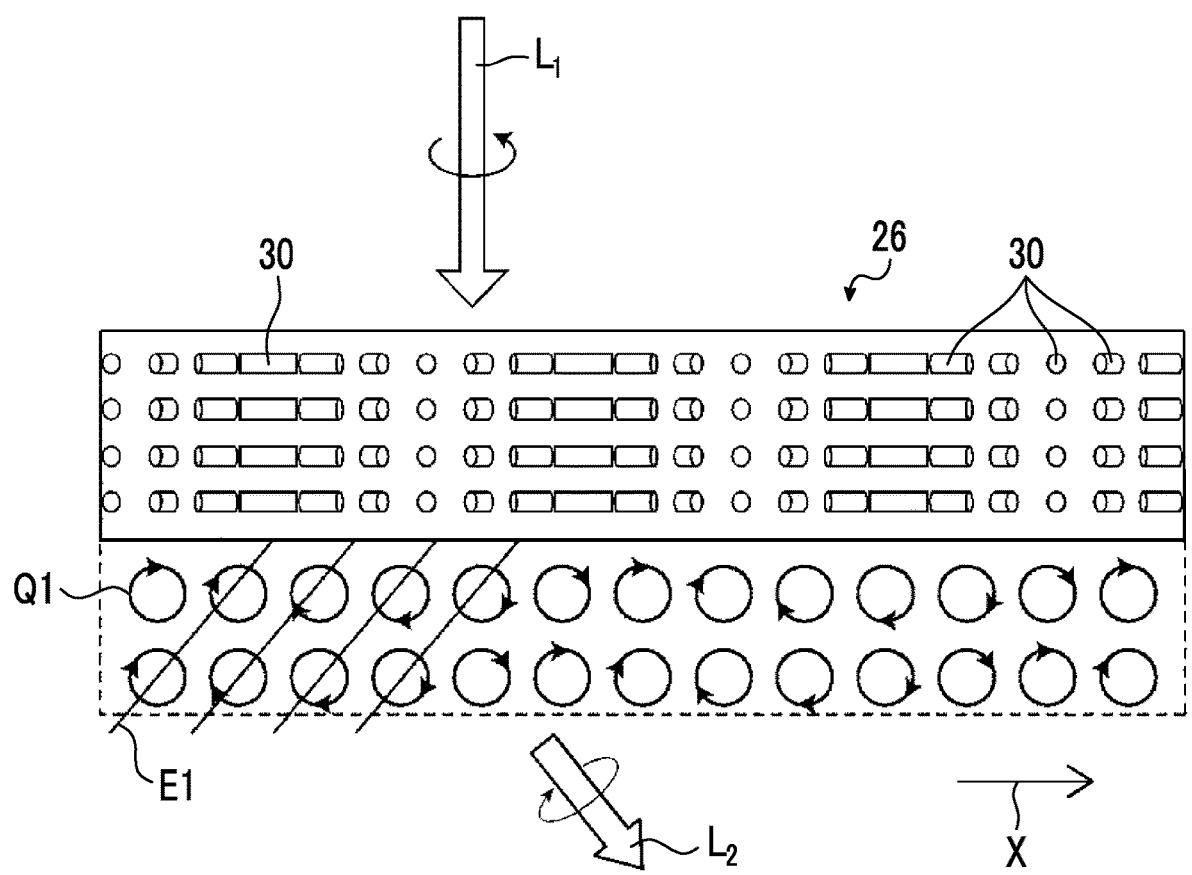
FIG. 4 is a conceptual diagram showing the optically-anisotropic layer of the optical element shown in FIG. 1.
Figure 5:
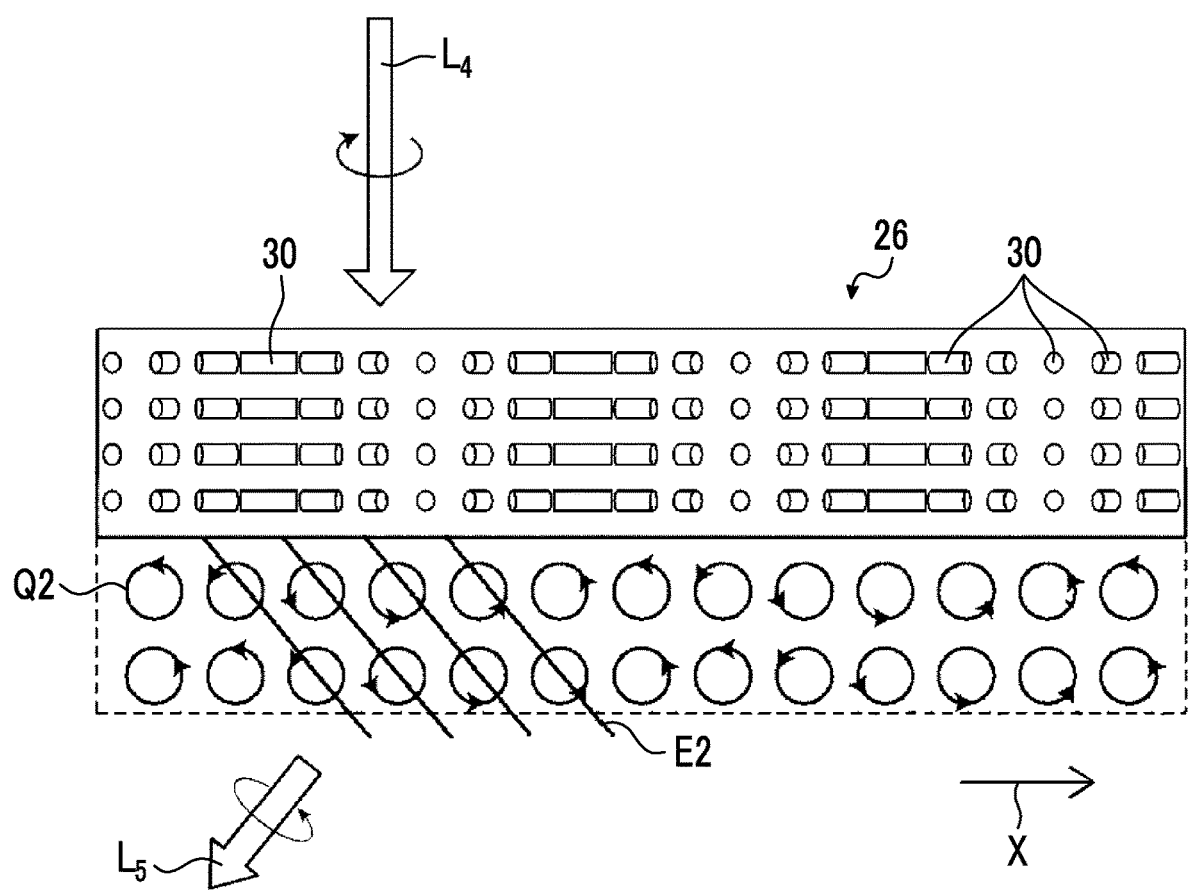
FIG. 5 is a conceptual diagram showing the optically-anisotropic layer of the optical element shown in FIG. 1.

FIGS. 4 and 5 show the effects of the liquid crystal alignment pattern in a plane will be described using the optically-anisotropic layer 26 in which the liquid crystal compound 30 is not twisted and aligned in the thickness direction. That is, in the optically-anisotropic layer 26, the direction of the optical axis 30A of the liquid crystal compound 30 in the thickness direction is homogeneous.

In the optically-anisotropic layer 26, the value of the product of the difference in refractive index of the liquid crystal compound and the thickness of the optically-anisotropic layer is λ/2.

As shown in FIG. 4, in a case where the value of the product of the difference in refractive index of the liquid crystal compound and the thickness of the optically-anisotropic layer in the optically-anisotropic layer 26 is λ/2 and incidence light $L_1$ as left circularly polarized light is incident into the optically-anisotropic layer 26, the incidence light $L_1$ transmits through the optically-anisotropic layer 26 to be imparted with a phase difference of 180°, and the transmitted light $L_2$ is converted into right circularly polarized light.

In addition, in a case where the incidence light $L_1$ transmits through the optically-anisotropic layer 26, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the optically-anisotropic layer 26 is a pattern that is periodic in the arrow X direction. Therefore, as shown in FIG. 4, the incidence light $L_1$ transmitted through the optically-anisotropic layer 26 is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as conceptually shown in FIG. 5, in a case where the value of the product of the difference in refractive index of the liquid crystal compound and the thickness of the optically-anisotropic layer in the optically-anisotropic layer 26 is λ/2 and incidence light $L_4$ as right circularly polarized light is incident into the optically-anisotropic layer 26, the incidence light $L_4$ transmits through the optically-anisotropic layer 26 to be imparted with a phase difference of 180° and is converted into transmitted light $L_5$ of left circularly polarized light.

In addition, in a case where the incidence light $L_4$ transmits through the optically-anisotropic layer 26, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the optically-anisotropic layer 26 is a pattern that is periodic in the arrow X direction. Therefore, as shown in FIG. 5, the incidence light $L_4$ transmitted through the optically-anisotropic layer 26 is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

Regarding a laminate including two optically-anisotropic layers that have the same liquid crystal alignment pattern in which the direction of the optical axis 30A continuously changes while rotating and have a configuration in which the liquid crystal compounds 30 are twisted and aligned in a thickness direction and twisted directions of the liquid crystal compounds 30 are opposite to each other, in a case where the two layers are considered as one optically-anisotropic layer, the same effects as those of the optically-anisotropic layer 26 shown in FIGS. 4 and 5 are exhibited.

That is, the laminate including the right-twisted optically-anisotropic layer 26Ap and the left-twisted optically-anisotropic layer 26Am and the laminate including the right-twisted optically-anisotropic layer 26Bp and the left-twisted optically-anisotropic layer 26Bm exhibits the same effects as those of the optically-anisotropic layer 26 shown in FIGS. 4 and 5.

The effects are described in detail in Applied Optics, Vol. 54, No. 34, pp 10035-10043 (2015).

That is, the first optically-anisotropic member 12 that includes the laminate including the right-twisted optically-anisotropic layer 26Ap and the left-twisted optically-anisotropic layer 26Am and the second optically-anisotropic member 14 that includes the laminate including the right-twisted optically-anisotropic layer 26Bp and the left-twisted optically-anisotropic layer 26Bm exhibits the same effects as those of the optically-anisotropic layer 26 shown in FIGS. 4 and 5. The effects will be described below.

In the optically-anisotropic layer, it is preferable that the in-plane retardation value of the plurality of regions R is a half wavelength. It is preferable that an in-plane retardation $Re(550)=\Delta n_{550} \times d$ of the plurality of regions R of the optically-anisotropic layer with respect to the incidence light having a wavelength of 550 nm is in a range defined by the following Expression (1). In the example shown in the drawings, examples of the optically-anisotropic layer include the right-twisted optically-anisotropic layer 26Ap, the left-twisted optically-anisotropic layer 26Am, the right-twisted optically-anisotropic layer 26Bp, and the left-twisted optically-anisotropic layer 26Bm.

Here, $\Delta n_{550}$ represents a difference in refractive index generated by refractive index anisotropy of the region R in a case where the wavelength of incidence light is 550 nm, and d represents the thickness of the optically-anisotropic layer.

$$200 \text{ nm} \leq \Delta n_{550} \times d \leq 350 \text{ nm} \quad (1).$$

That is, in a case where the in-plane retardation $Re(550) = \Delta n_{550} \times d$ of the plurality of regions R of the optically-anisotropic layer satisfies Expression (1), a sufficient amount of a circularly polarized light component in light incident into the optically-anisotropic layer can be converted into circularly polarized light that travels in a direction tilted in a forward direction or reverse direction with respect to the arrow X direction. It is more preferable that the in-plane retardation $Re(550) = \Delta n_{550} \times d$ satisfies 225 nm $\leq \Delta n_{550} \times d \leq 340$ nm, and it is still more preferable that the in-plane retardation $Re(550) = \Delta n_{550} \times d$ satisfies 250 nm $\leq \Delta n_{550} \times d \leq 330$ nm.

Expression (1) is a range with respect to incidence light having a wavelength of 550 nm. However, an in-plane retardation $Re(\lambda) = \Delta n_\lambda \times d$ of the plurality of regions R of the optically-anisotropic layer with respect to incidence light having a wavelength of $\lambda$ nm is preferably in a range defined by the following Expression (1-2) and can be appropriately set.

$$0.7\lambda \text{ nm} \leq \Delta n_\lambda \times d \leq 1.3\lambda \text{ nm} \quad (1\text{-}2)$$

In addition, the value of the in-plane retardation of the plurality of regions R of the optically-anisotropic layer in a range outside the range of Expression (1) can also be used. Specifically, by satisfying $\Delta n_{550} \times d < 200$ nm or 350 nm $< \Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450) = \Delta n_{450} \times d$ of each of the plurality of regions R of the optically-anisotropic layer with respect to incidence light having a wavelength of 450 nm and an in-plane retardation $Re(550) = \Delta n_{550} \times d$ of each of the plurality of regions R of the optically-anisotropic layer with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \quad (2)$$

Expression (2) represents that the liquid crystal compound 30 in the optically-anisotropic layer has reverse dispersion properties. That is, by satisfying Expression (2), the optically-anisotropic layer can correspond to incidence light having a wide range of wavelength.

Here, in the optically-anisotropic layer having the liquid crystal alignment pattern in which the optical axis 30A continuously changes while rotating in the in-plane direction, by changing the single period $\Lambda$ of the liquid crystal alignment pattern, the refraction angle of transmitted light can be adjusted. That is, by changing the single period $\Lambda$ of the liquid crystal alignment pattern formed in the optically-anisotropic layer, refraction angles of the transmitted light components $L_2$ and $L_5$ can be adjusted.

Specifically, as the single period $\Lambda$ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow X direction, the refraction direction of transmitted light can be reversed.

Further, in the optically-anisotropic layer of the optical element 10 according to the embodiment of the present invention, the liquid crystal compound 30 is twisted and aligned in the thickness direction as shown in FIG. 2 using the right-twisted optically-anisotropic layer 26Ap and the left-twisted optically-anisotropic layer 26Am of the first optically-anisotropic member 12 as an example. In the following description, the state where the liquid crystal compound 30 is twisted and aligned in the thickness direction will also be referred to as "the liquid crystal compound 30 is twisted and aligned".

As described above, in the laminate including two optically-anisotropic layers that have the liquid crystal alignment pattern in which the optical axis of the liquid crystal compound 30 continuously rotates in the in-plane direction and have a configuration in which the liquid crystal compounds 30 are twisted and aligned and twisted directions of the liquid crystal compounds 30 are opposite to each other, the same effects as those of the optically-anisotropic layer 26 shown in FIGS. 4 and 5 in which the liquid crystal compound 30 is not twisted and aligned are exhibited.

Here, in the laminate including two optically-anisotropic layers having the above-described liquid crystal alignment pattern and having the configuration in which twisted directions of the liquid crystal compounds 30 are opposite to each other, as shown in detail in Applied Optics, Vol. 54, No. 34, pp 10035-10043 (2015), light propagating in the optically-anisotropic layer can be more effectively converted into circularly polarized light having an opposite direction to that of the incident circularly polarized light as compared to the optically-anisotropic layer 26 in which the liquid crystal compound 30 is not twisted and aligned. Therefore, the amount of transmitted light (emitted light) can be improved. In particular, in a case where the angle of refracted light is large, the laminate including two optically-anisotropic layers in which twisted directions of the liquid crystal compounds 30 are opposite to each other can increase the amount of transmitted light (emitted light) as compared to the optically-anisotropic layer 26 in which the liquid crystal compound 30 is not twisted and aligned.

Figure 6:
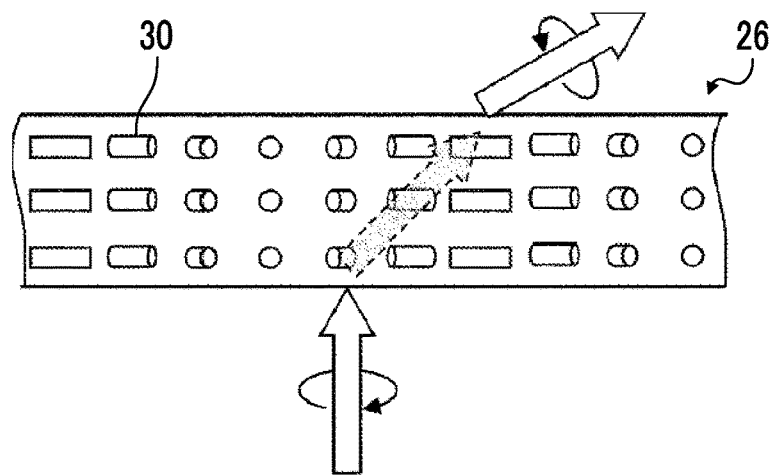
FIG. 6 is a conceptual diagram showing effects of the optically-anisotropic layer.

As conceptually shown in FIG. 6, in a case where right circularly polarized light that is vertically incident into the optically-anisotropic layer 26 in which the liquid crystal compound 30 is not twisted and aligned obliquely propagates in the optically-anisotropic layer, the liquid crystal compound 30 is twisted in a traveling direction of the light that propagates. Therefore, due to the twist of the liquid crystal compound 30, the incident right circularly polarized light is not sufficiently converted into left circularly polarized light after passing through the optically-anisotropic layer. Therefore, it is considered that the amount of transmitted light decreases.

Figure 7:
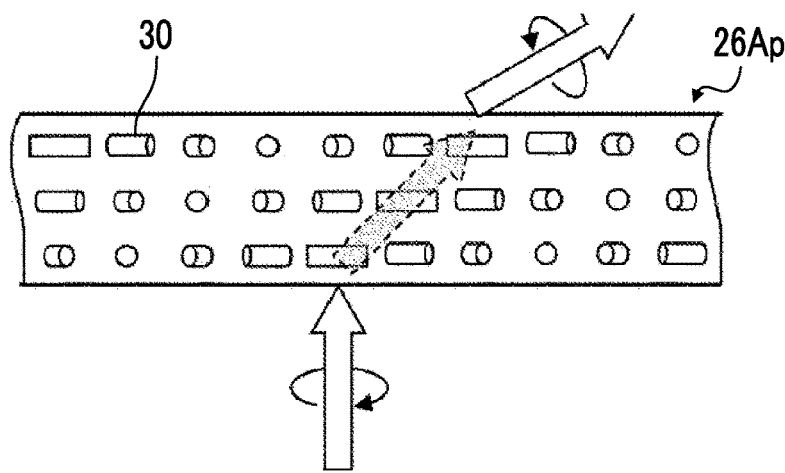
FIG. 7 is a conceptual diagram showing effects of the optically-anisotropic layer.

On the other hand, as conceptually shown in FIG. 7, in the right-twisted optically-anisotropic layer 26Ap in which the liquid crystal compound 30 is twisted and aligned in the thickness direction, in a case where right circularly polarized light that is vertically incident obliquely propagates in the optically-anisotropic layer, the twist of liquid crystal in a traveling direction of light that propagates is extremely small. Therefore, the incident right circularly polarized light is converted into left circularly polarized light after passing through the optically-anisotropic layer, and a decrease in the amount of transmitted light can be suppressed.

Figure 8:
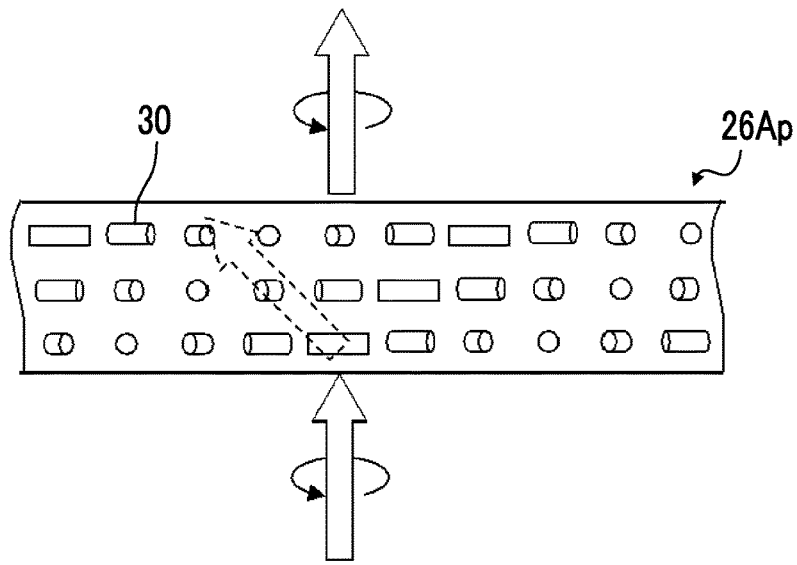
FIG. 8 is a conceptual diagram showing effects of the optically-anisotropic layer.

In addition, as conceptually shown in FIG. 8, in a case where left circularly polarized light is vertically incident into the right-twisted optically-anisotropic layer 26Ap in which the liquid crystal compound 30 is twisted and aligned in the thickness direction, light that propagates is strongly affected by the twist of liquid crystal. Therefore, light propagated in the optically-anisotropic layer is substantially left circularly polarized light without any change. Thus, most of the light transmits in the same traveling direction as that of the incidence light. Therefore, although not shown in the drawing, by adopting the laminate including two optically-anisotropic layers in which twisted directions of the liquid crystal compounds 30 are opposite to each other, the same effects as those of the optically-anisotropic layer 26 shown in FIGS. 4 and 5 in which the liquid crystal compound 30 is not twisted and aligned are exhibited, and the amount of transmitted light (emitted light) can be improved. In the example shown in the drawing, the laminate in which the two layers are laminated is the laminate including the right-twisted optically-anisotropic layer 26Ap and the left-twisted optically-anisotropic layer 26Am.

Therefore, in the optical element 10 according to the embodiment of the present invention, the amount of transmitted light can be improved and the brightness of transmitted light can be improved as compared to the optical element including the optically-anisotropic layer 26 having the liquid crystal alignment pattern in which the optical axis 30A is rotated only in a plane without twisting and aligning the liquid crystal compound 30 in the thickness direction.

In the present invention, the twisted angle of the liquid crystal compound 30 that is twisted and aligned in the optically-anisotropic layer is not limited. That is, in the example shown in the drawing, in the right-twisted optically-anisotropic layer 26Ap, the left-twisted optically-anisotropic layer 26Am, the right-twisted optically-anisotropic layer 26Bp, and the left-twisted optically-anisotropic layer 26Bm, the twisted angle of the liquid crystal compound 30 that is twisted and aligned is not limited.

However, the polarization state of light propagating in the optically-anisotropic layer varies depending on the twisted angle of the liquid crystal compound 30. Specifically, since the direction of light propagating in the optically-anisotropic layer varies depending on the single period Λ of the liquid crystal alignment pattern, the twisted angle for effectively converting incident circularly polarized light into circularly polarized light having an opposite direction varies. Accordingly, it is preferable that the twisted angle of the liquid crystal compound 30 is appropriately set depending on the single period Λ of the liquid crystal alignment pattern and the desired emission direction of transmitted light.

Irrespective of whether the twisted direction of the liquid crystal compound 30 is right or left (clockwise or counterclockwise), from the viewpoint of suitably improving the amount of transmitted light, the absolute value of the twisted angle of the liquid crystal compound 30 is preferably 5° to 360°, more preferably 10° to 320°, still more preferably 20° to 280°, and still more preferably 30° to 250°.

The twisted angle of the liquid crystal compound 30 is a twisted angle from a lower surface to an upper surface of the liquid crystal compound 30 that is twisted and aligned in the thickness direction in the optically-anisotropic layer.

Although described below in detail, the optically-anisotropic layer in which the liquid crystal compound 30 is twisted and aligned in the thickness direction is formed using the liquid crystal composition including the liquid crystal compound and the chiral agent.

The twisted direction of the liquid crystal compound 30 in the optically-anisotropic layer can be adjusted by adjusting the kind of the liquid crystal compound 30 that forms the optically-anisotropic layer and/or the kind of the chiral agent to be added.

In addition, the twisted angle of the liquid crystal compound 30 in the optically-anisotropic layer can be adjusted by adjusting the kind of the chiral agent to be added and/or the addition amount of the chiral agent.

The optically-anisotropic layer is formed of a cured layer of a liquid crystal composition including a rod-shaped liquid crystal compound or a disk-shaped liquid crystal compound and a chiral agent, and has a liquid crystal alignment pattern in which an optical axis of the rod-shaped liquid crystal compound or an optical axis of the disk-shaped liquid crystal compound is aligned in a plane as described above, in which the rod-shaped liquid crystal compound or the disk-shaped liquid crystal compound are twisted and aligned in the thickness direction.

By forming an alignment film on the support 20, applying the liquid crystal composition including the chiral agent to the alignment film, and curing the applied liquid crystal composition, the optically-anisotropic layer that is formed of the cured layer of the liquid crystal composition in which the liquid crystal compound has the alignment pattern aligned in a plane as described above and is twisted and aligned in the thickness direction can be obtained. Although the optically-anisotropic layer functions as a so-called λ/2 plate, the present invention also includes an aspect where a laminate including the support 20 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, or an alignment assistant.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

Figure 19:
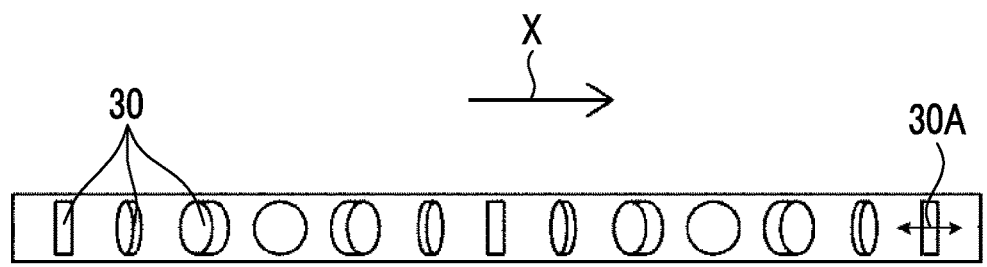
FIG. 19 is a conceptual diagram showing a disk-shaped liquid crystal compound that can be used in the optical element according to the present invention.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk plane, that is so-called, a fast axis (refer to FIG. 19).

—Chiral Agent (Optically Active Compound)—

The chiral agent has a function of inducing the twisted alignment of the liquid crystal compound 30 in the optically-anisotropic layer. The chiral agent may be selected depending on the purpose because a twisted direction or a twist pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

<Wavelength Selective Phase Difference Layer>

In the optical element 10 according to the embodiment of the present invention, the wavelength selective phase difference layer 18G is provided between the first optically-anisotropic member 12 and the second optically-anisotropic member 14.

In the optical element according to the embodiment of the present invention, the wavelength selective phase difference layer is a member that converts circularly polarized light in a specific wavelength range into circularly polarized light having an opposite turning direction.

In the optical element in the example shown in the drawing, the wavelength selective phase difference layer 18G converts selectively circularly polarized light of green light into circularly polarized light having an opposite turning direction, converts right circularly polarized light of green light into left circularly polarized light of green light, and converts left circularly polarized light of green light into right circularly polarized light of green light.

In addition, the wavelength selective phase difference layer 18G allows transmission (passage) of light other than the circularly polarized light of green light as it is. Accordingly, the circularly polarized light other than the circularly polarized light of green light transmits through the wavelength selective phase difference layer 18G while maintaining the turning direction.

In other words, in the present invention, the wavelength selective phase difference layer shifts only a phase in a specific wavelength range by π. The wavelength selective phase difference layer will also be referred to as, for example, a λ/2 plate that acts only in a specific wavelength range.

This wavelength selective phase difference layer can be prepared, for example, by laminating a plurality of phase difference plates having different phase differences.

As the wavelength selective phase difference layer, for example, a wavelength selective phase difference layer described in JP2000-510961A, SID 99 DIGEST, pp. 1072-1075, or the like can be used.

In the wavelength selective phase difference layer, a plurality of phase difference plates (phase difference layers) having different slow axis angles (slow axis directions) are laminated such that linearly polarized light in a specific wavelength range into linearly polarized light having an opposite turning direction. The plurality of phase difference plates are not limited to the configuration in which all the slow axis angles are different from each other. For example, a slow axis angle of at least one phase difference plate may be different from that of another phase difference plate.

It is preferable that at least one phase difference plate has forward dispersibility. In a case where at least one phase difference plate has forward dispersibility, by laminating a plurality of phase difference plates at different slow axis angles, a λ/2 plate that acts only in a specific wavelength range can be realized.

On the other hand, the wavelength selective phase difference layer described in JP2000-510961A, SID 99 DIGEST, pp. 1072-1075, or the like can selectively convert linearly polarized light into linearly polarized light having an opposite turning direction.

Here, in the present invention, the wavelength selective phase difference layer is a layer that converts circularly polarized light in a specific wavelength range into circularly polarized light having an opposite turning direction. Therefore, it is preferable that a λ/4 plate is provided on both surfaces of the wavelength selective phase difference layer described in JP2000-510961A, SID 99 DIGEST, pp. 1072-1075, or the like for use.

As the λ/4 plate, various phase difference plates, for example, a cured layer or a structural birefringence layer of a polymer or a liquid crystal compound can be used.

It is preferable that the λ/4 plate has reverse dispersion properties. In a case where the λ/4 plate has reverse dispersion properties, incidence light in a wide wavelength range can be handled.

As the λ/4 plate, a phase difference layer in which a plurality of phase difference plates are laminated to actually function as a λ/4 plate are preferably used. For example, a broadband λ/4 plate described in WO2013/137464A in which a λ/2 plate and a λ/4 plate are used in combination can handle with incidence light in a wide wavelength range and can be preferably used.

<Effect of Optical Element>

As described above, the optically-anisotropic layer that is formed using the composition including the liquid crystal compound and has the liquid crystal alignment pattern in which the direction of the optical axis 30A rotates in the arrow X direction refracts circularly polarized light. Here, a refraction angle varies depending on wavelengths of light. Specifically, as the wavelength of light increases, the refraction angle increases. Accordingly, for example, in a case where incidence light is red light, green light, and blue light, the red light is refracted to the highest degree, and the blue light is refracted to the lowest degree.

Therefore, for example, in a light guide plate of AR glasses, in a case where the optical element that includes the optically-anisotropic layer having the above-described liquid crystal alignment pattern in which the direction of the optical axis 30A rotates is used as a diffraction element for incidence and emission of light into and from the light guide plate, in the case of a full color image, an image having a so-called color shift in which transmission directions of red light, green light, and blue light are different from each other and a red image, a green image, and a blue image do not match each other is observed.

By providing a light guide plate for each of a red image, a green image, and a blue image as described in Bernard C. Kress et al., Towards the Ultimate Mixed Reality Experience: HoloLens Display Architecture Choices, SID 2017 DIGEST, pp. 127-131 and laminating the three light guide plates, the color shift can be resolved. However, in this configuration, as a whole, the light guide plate is thick and heavy. Further, the configuration is also complicated.

On the other hand, in the optical element according to the embodiment of the present invention, optically-anisotropic members including one or more optically-anisotropic layers are arranged, a wavelength selective phase difference layer is disposed between at least one pair of two optically-anisotropic members adjacent to each other among the arranged optically-anisotropic members, the optically-anisotropic layer in the optically-anisotropic member has a liquid crystal alignment pattern in which a direction of an optical axis derived from a liquid crystal compound rotates in one in-plane direction, and a single period in the liquid crystal alignment pattern of the optically-anisotropic layer in at least one optically-anisotropic member is different from that of the optically-anisotropic layer in another optically-anisotropic member.

Further, in the optical element according to the embodiment of the present invention, two optically-anisotropic layers are laminated, the optically-anisotropic layers having a configuration in which the liquid crystal compounds forming the optically-anisotropic layers are twisted and aligned in the thickness direction, the optically-anisotropic members have the same liquid crystal alignment pattern in a plane, and twisted directions are different from each other.

In the optical element according to the embodiment of the present invention, the wavelength dependence of a refraction angle of light is significantly reduced, light components having a large amount and different wavelengths can be refracted to be transmitted and emitted substantially in the same direction.

Therefore, by using the optical element according to the embodiment of the present invention (for example, an optical element 32 described below) as a diffraction element for incidence of light from a light guide plate and/or as a diffraction element for emission of light into a light guide plate, for example, in AR glasses, light having a large amount of a red image, a green image, and a blue image can be propagated by one light guide plate without the occurrence of a color shift. As a result, an appropriate bright image can be displayed to a user.

Hereinafter, the effects of the optical element 10 will be described in detail with reference to the conceptual diagrams of FIGS. 9 and 10.

In the optical element according to the embodiment of the present invention, basically, only the optically-anisotropic layer and the wavelength selective phase difference layer exhibit an optical action. Therefore, in order to simplify the drawing and to clarify the configuration and the effects, in FIG. 9, only the right-twisted optically-anisotropic layer 26Ap and the left-twisted optically-anisotropic layer 26Am in the first optically-anisotropic member 12 and only the right-twisted optically-anisotropic layer 26Bp and the left-twisted optically-anisotropic layer 26Bm in the second optically-anisotropic member 14 are shown, and the members shown in the drawing are spaced from each other in the arrangement direction. Regarding this point, the same can also be applied to FIG. 12 described below.

As described above, in the optical element 10, the wavelength selective phase difference layer 18G that converts a turning direction of circularly polarized light of green light into an opposite direction is provided between the first optically-anisotropic member 12 including the right-twisted optically-anisotropic layer 26Ap and the left-twisted optically-anisotropic layer 26Am and the second optically-anisotropic member 14 including the right-twisted optically-anisotropic layer 26Bp and the left-twisted optically-anisotropic layer 26Bm.

For example, the optical element 10 refracts incidence light to be transmitted in a predetermined direction, the incidence light including circularly polarized light of blue light and circularly polarized light of green light. In FIG. 9, incidence light is right circularly polarized light. However, even in a case where incidence light is left circularly polarized light, the effects are the same, except that the refraction direction is reversed.

In the optical element 10, first, right circularly polarized light $G_R$ of green light and right circularly polarized light $B_R$ of blue light are incident into the laminate including the right-twisted optically-anisotropic layer 26Ap and the left-twisted optically-anisotropic layer 26Am in the first optically-anisotropic member 12 (refer to incidence light $L_4$ in FIG. 5).

As described above, in the laminate including two optically-anisotropic layers that have the same liquid crystal alignment pattern in which the direction of the optical axis 30A continuously changes while rotating in a plane and have a configuration in which the liquid crystal compounds 30 are twisted and aligned in a thickness direction and twisted directions of the liquid crystal compounds 30 are opposite to each other, the same liquid crystal alignment pattern shown in FIGS. 4 and 5 are provided in a plane, and the same effects as those of the optically-anisotropic layer 26 in which the liquid crystal compound is twisted and aligned are exhibited.

Accordingly, the right circularly polarized light $G_R$ of green light and the right circularly polarized light $B_R$ of blue light incident into the first optically-anisotropic member 12 are refracted in a direction opposite to the arrow X direction at a predetermined angle with respect to the incidence direction by the right-twisted optically-anisotropic layer 26Ap and the left-twisted optically-anisotropic layer 26Am, and are converted into left circularly polarized light $G_{1L}$ of green light and left circularly polarized light $B_{1L}$ of blue light (refer to transmitted light $L_5$ in FIG. 5).

Here, as described above, regarding the refraction angle of the optically-anisotropic layer having the liquid crystal alignment pattern in which the direction of the optical axis 30A continuously changes while rotating, the angle of green light having a long wavelength is large. Therefore, as shown in FIG. 10, regarding the refraction angle with respect to incidence light, an angle $\theta_{G1}$ of green light (G) is more than an angle $\theta_{B1}$ of blue light (B).

Next, the left circularly polarized light $G_{1L}$ of green light and the left circularly polarized light $B_{1L}$ of blue light transmitted through the left-twisted optically-anisotropic layer 26Am are incident into the wavelength selective phase difference layer 18G.

As described above, the wavelength selective phase difference layer 18G converts only the circularly polarized light of green light into circularly polarized light having an opposite turning direction and allows transmission (passage) of the other circularly polarized light in a state where the turning direction thereof is maintained.

Accordingly, in a case where the left circularly polarized light $G_{1L}$ of green light and the left circularly polarized light $B_{1L}$ of blue light are incident into and transmits through the wavelength selective phase difference layer 18G, the left circularly polarized light $B_{1L}$ of blue light transmits through the wavelength selective phase difference layer 18G as it is. On the other hand, the left circularly polarized light $G_{1L}$ of green light is converted into right circularly polarized light $G_{1R}$ of green light.

Next, the right circularly polarized light $G_{1R}$ of green light and the left circularly polarized light $B_{1L}$ of blue light transmitted through the wavelength selective phase difference layer 18G are incident into the laminate including the left-twisted optically-anisotropic layer 26Bm and the right-twisted optically-anisotropic layer 26Bp in the second optically-anisotropic member 14.

As in the laminate including the left-twisted optically-anisotropic layer 26Am and the right-twisted optically-anisotropic layer 26Ap in the first optically-anisotropic member 12, the laminate including the left-twisted optically-anisotropic layer 26Bm and the right-twisted optically-anisotropic layer 26Bp in the second optically-anisotropic member 14 exhibits the same effects as those of the optically-anisotropic layer 26 shown in FIGS. 4 and 5.

Accordingly, the right circularly polarized light $G_{1R}$ of green light and the left circularly polarized light $B_{1L}$ of blue light incident into the laminate including the left-twisted optically-anisotropic layer 26Bm and the right-twisted optically-anisotropic layer 26Bp in the second optically-anisotropic member 14 are refracted as described above and are converted into circularly polarized light having an opposite turning direction such that left circularly polarized light $G_{2L}$ of green light and right circularly polarized light $B_{2R}$ of blue light are emitted.

Here, turning directions of the right circularly polarized light $G_{1R}$ of green light and the left circularly polarized light $B_{1L}$ of blue light incident into the second optically-anisotropic member 14 are opposite to each other. In addition, in the first optically-anisotropic member 12 and the second optically-anisotropic member 14, as described above, rotation directions of the optical axes 30A of the liquid crystal compounds 30 in the optically-anisotropic layers are opposite to each other.

Figure 10:
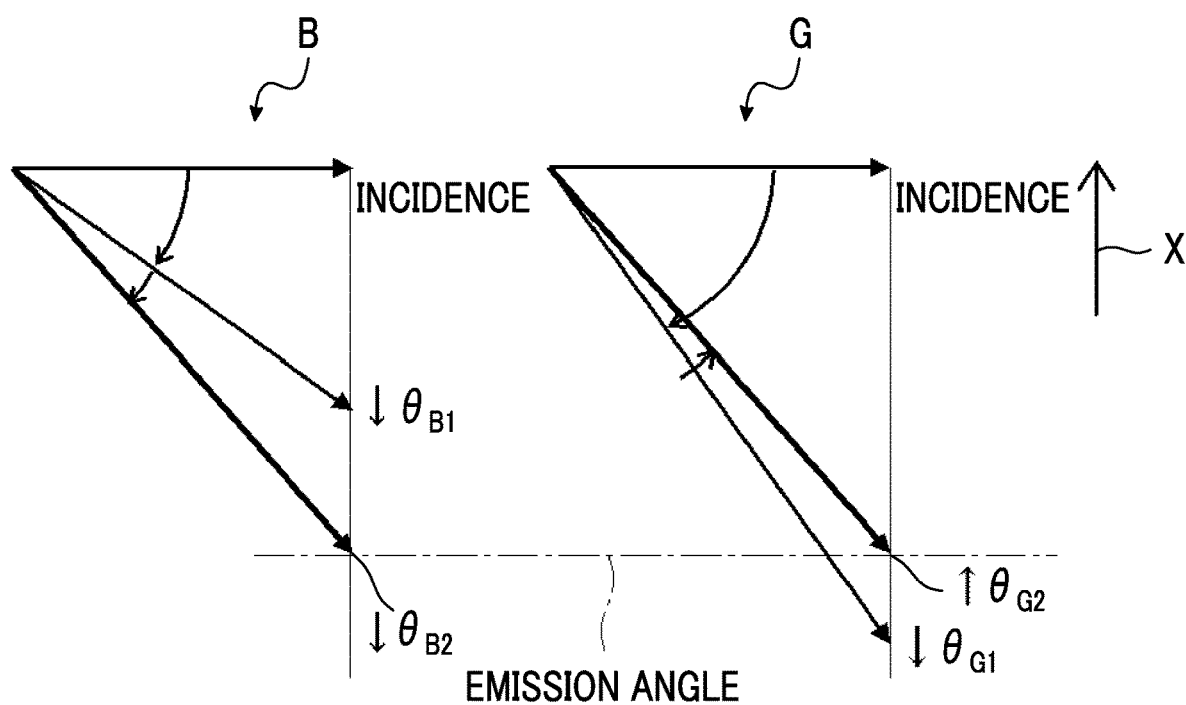
FIG. 10 is a conceptual diagram showing effects of the optical element shown in FIG. 1.

Therefore, the left circularly polarized light $B_{2L}$ of blue light is further refracted in a direction opposite to the arrow X direction and is emitted at an angle $\theta_{B2}$ with respect to the incidence light (the right circularly polarized light $B_R$ of blue light) as shown on the left side of FIG. 10 (refer to transmitted light $L_5$ in FIG. 5).

On the other hand, the turning direction of the right circularly polarized light $G_{1R}$ of green light is opposite to that of blue light. Therefore, as shown on the right side of FIG. 10, in the second optically-anisotropic member 14, the right circularly polarized light $G_{1R}$ of green light is refracted in the direction indicated by the arrow X that is opposite to that of the first optically-anisotropic member 12 such that refraction returns to the original state (refer to transmitted light $L_2$ in FIG. 4).

In addition, regarding the single periods $\Lambda$ of the respective optically-anisotropic layers, the single period $\Lambda_B$ of the second optically-anisotropic member 14 is longer than the single period $\Lambda_A$ of the first optically-anisotropic member 12. Therefore, the refraction angle of the circularly polarized light is less than that in a case where the circularly polarized light transmits through the first optically-anisotropic member 12.

As a result, an angle $\theta_{G2}$ of the left circularly polarized light $G_{2L}$ of green light transmitted through the second optically-anisotropic member 14 is less than an angle $\theta_{G1}$ of the left circularly polarized light $G_{1L}$ (right circularly polarized light $G_{1R}$) of green light transmitted through the first optically-anisotropic member 12 with respect to the incidence light (the right circularly polarized light $G_R$ of green light), and the light is emitted at the angle $\theta_{G2}$ that is substantially the same as the angle $\theta_{B2}$ of the left circularly polarized light $B_{2L}$ of blue light.

This way, in the optical element 10 according to the embodiment of the present invention, green light having a long wavelength and large refraction by the optically-anisotropic layer is refracted in a direction opposite to the arrow X direction in the first optically-anisotropic member 12 and is refracted in the arrow X direction in the second optically-anisotropic member 14 such that refraction returns to the original state. Specifically, in the optical element 10 according to the embodiment of the present invention, green light having a long wavelength and a large refraction by the optically-anisotropic layer is refracted in a direction opposite to the arrow X direction by the laminate including the left-twisted optically-anisotropic layer 26Am and the right-twisted optically-anisotropic layer 26Ap, and is refracted in the arrow X direction by the laminate including the left-twisted optically-anisotropic layer 26Bm and the right-twisted optically-anisotropic layer 26Bp such that refraction returns to the original state.

On the other hand, blue light having a short wavelength and small refraction by the optically-anisotropic layer is refracted in a direction opposite to the arrow X direction in the first optically-anisotropic member 12 and the second optically-anisotropic member 14.

That is, in the optical element 10, depending on the magnitude of refraction by the optically-anisotropic layer derived from a wavelength, light having large refraction and a long wavelength is initially refracted and is secondly refracted in an opposite direction such that refraction returns to the initial state. On the other hand, light having small refraction and a short wavelength is secondly refracted in the same direction as that the direction in which the light is initially refracted. As a result, the refraction angle $\theta_{G2}$ of green light and the refraction angle $\theta_{B2}$ of blue light with respect to incidence light can be made to be very close to each other.

Therefore, in the optical element 10 according to the embodiment of the present invention, blue light and green light that are incident can be refracted at substantially the same angle to be emitted substantially in the same direction. Further, the optically-anisotropic layer is obtained by twisting and aligning the liquid crystal compound, and the optically-anisotropic member is obtained by laminating two optically-anisotropic layers having different twisted directions. Therefore, the amount of emitted light (transmitted light) is also large.

As described above, the refraction angle of light by the optically-anisotropic layer increase as the wavelength of the light increases. In the example shown in the drawings, examples of the optically-anisotropic layer include the left-twisted optically-anisotropic layer 26Am, the right-twisted optically-anisotropic layer 26Ap, the left-twisted optically-anisotropic layer 26Bm, and the right-twisted optically-anisotropic layer 26Bp.

In addition, the refraction angles of light by the optically-anisotropic layer increase as the length of the single period $\Lambda$ over which the direction of optical axis 30A rotates by 180° in the arrow X direction in the liquid crystal alignment pattern decreases. In the optical element 10, for example, as shown in FIG. 1, the single period $\Lambda_A$ of the liquid crystal alignment pattern in the optically-anisotropic layer of the first optically-anisotropic member 12 is shorter than the single period $\Lambda_B$ of the liquid crystal alignment pattern in the optically-anisotropic layer of the second optically-anisotropic member 14. That is, in the first optically-anisotropic member 12 on the light incidence side, light is largely refracted.

Accordingly, by adjusting the single period $\Lambda$ of the liquid crystal alignment pattern with respect to a wavelength of light as a target, emission directions of light components having different wavelengths can be suitably made to be the same.

In a case where light components having two wavelength ranges are targets as in the optical element 10 in the example shown in the drawing, a designed wavelength of light having a long wavelength is represented by $\lambda a$, a designed wavelength of light having a short wavelength is represented by $\lambda b$ ($\lambda a > \lambda b$), a single period of a liquid crystal alignment pattern in the optically-anisotropic layer of the first optically-anisotropic member is represented by $\Lambda_1$, and a single period of a liquid crystal alignment pattern in the optically-anisotropic layer of the second optically-anisotropic member is represented by $\Lambda_2$, emission directions of light components in two wavelength ranges can be made to be substantially the same by satisfying the following expression.

$$\Lambda_2 = [(\lambda a + \lambda b)/(\lambda a - \lambda b)]\Lambda_1$$

In this expression, any one of the first optically-anisotropic member 12 and the second optically-anisotropic member 14 may be the first optically-anisotropic member.

In consideration of this point, in the present invention, it is preferable that the following expression is satisfied in the optical element 10 in which light components having two wavelengths (wavelength ranges) are targets.

$$0.6*\{[(\lambda a+\lambda b)/(\lambda a-\lambda b)]\Lambda_1\} \leq \Lambda_2 \leq 3.0*\{[(\lambda a+\lambda b)/(\lambda a-\lambda b)]\Lambda_1\}$$

As a result, by significantly reducing the wavelength dependence of refraction, emission directions of light components having two wavelength ranges can be made to be substantially the same.

In addition, in the present invention, it is more preferable that the following expression is satisfied in the optical element 10 in which light components having two wavelengths (wavelength ranges) are targets.

$$0.7*\{[(\lambda a+\lambda b)/(\lambda a-\lambda b)]\Lambda_1\} \leq \Lambda_2 \leq 1.8*\{[(\lambda a+\lambda b)/(\lambda a-\lambda b)]\Lambda_1\}$$

It is still more preferable that the relationship satisfies the following expression.

$$0.8*\{[(\lambda a+\lambda b)/(\lambda a-\lambda b)]\Lambda_1\} \leq \Lambda_2 \leq 1.3*\{[(\lambda a+\lambda b)/(\lambda a-\lambda b)]\Lambda_1\}$$

It is still more preferable that the relationship satisfies the following expression.

$$0.9*\{[(\lambda a+\lambda b)/(\lambda a-\lambda b)]\Lambda_1\} \leq \Lambda_2 \leq 1.15*\{[(\lambda a+\lambda b)/(\lambda a-\lambda b)]\Lambda_1\}$$

[Second Aspect of Optical Element]

In the above-described optical element 10, light components having two wavelength ranges (designed wavelengths) including green light and blue light are targets. However, the optical element according to the embodiment of the present invention is not limited thereto, and incidence light including light components having three or more wavelength ranges may be refracted and emitted.

Figure 11:
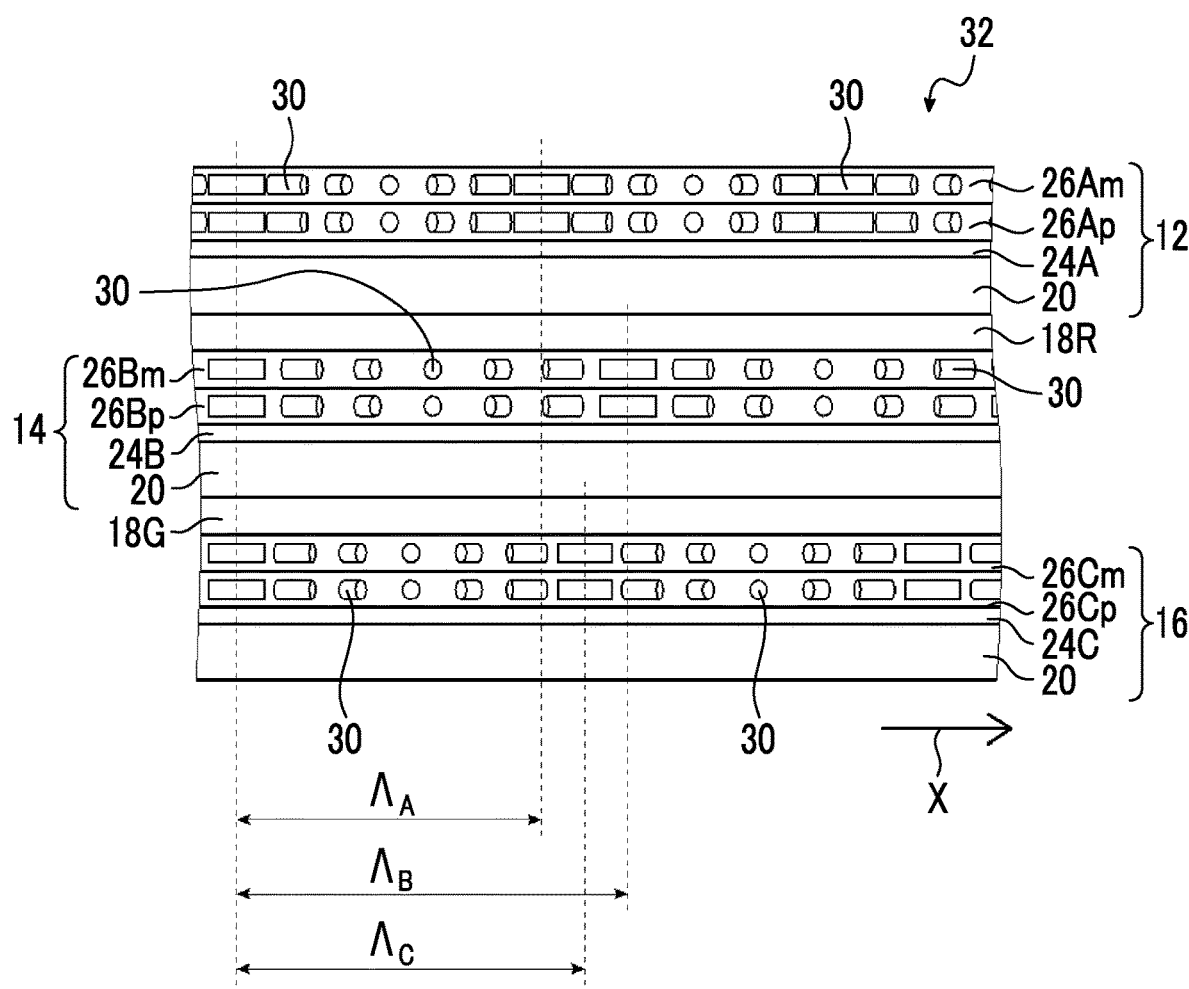
FIG. 11 is a diagram conceptually showing another example of the optical element according to the present invention.

FIG. 11 shows an example of the second aspect of the optical element.

In the optical element 32 shown in FIG. 11, the same members as those of the optical element 10 shown in FIG. 1 are widely used. Therefore, the same members are represented by the same reference numerals, and different members will be mainly described below.

The optical element 32 shown in FIG. 11 further includes a third optically-anisotropic member 16 and a wavelength selective phase difference layer 18R in addition to the first optically-anisotropic member 12, the second optically-anisotropic member 14, and the wavelength selective phase difference layer 18G of the above-described optical element 10.

The third optically-anisotropic member 16 has the same configuration as that of the first optically-anisotropic member 12 or the like and includes the support 20, an alignment film 24C, a right-twisted optically-anisotropic layer 26Cp, and a left-twisted optically-anisotropic layer 26Cm.

The alignment film 24C, the right-twisted optically-anisotropic layer 26Cp, and the left-twisted optically-anisotropic layer 26Cm are the same as the alignment film 24A, the right-twisted optically-anisotropic layer 26Ap, and the left-twisted optically-anisotropic layer 26Am, except that the single periods Λ are different. Accordingly, In the right-twisted optically-anisotropic layer 26Cp and the left-twisted optically-anisotropic layer 26Cm, the liquid crystal alignment patterns in which the optical axes 30A rotate in the arrow X direction are the same, and twisted directions of the liquid crystal compounds 30 are opposite to each other.

In addition, the wavelength selective phase difference layer 18R converts selectively circularly polarized light of red light into circularly polarized light having an opposite turning direction, converts right circularly polarized light of red light into left circularly polarized light of red light, converts left circularly polarized light of red light into right circularly polarized light of red light, and allows transmission of the other light as it is.

In the optical element 32, in the optically-anisotropic layer of the first optically-anisotropic member 12 and the optically-anisotropic layer of the third optically-anisotropic member 16, rotation directions of the optical axes 30A of the liquid crystal compounds 30 in the arrow X direction are the same, and the rotation direction of the optical axis 30A of the liquid crystal compound 30 of the optically-anisotropic layer of the second optically-anisotropic member 14 in the arrow X direction is opposite to that of the other two optically-anisotropic layers.

In the example shown in the drawing, the optically-anisotropic layers of the first optically-anisotropic member 12 are the right-twisted optically-anisotropic layer 26Ap and the left-twisted optically-anisotropic layer 26Am. In addition, the optically-anisotropic layers of the third optically-anisotropic member 16 are the right-twisted optically-anisotropic layer 26Cp and the left-twisted optically-anisotropic layer 26Cm. Further, the optically-anisotropic layers of the second optically-anisotropic member 14 are the right-twisted optically-anisotropic layer 26Bp and the left-twisted optically-anisotropic layer 26Bm.

In addition, in the optical element 32, regarding the length of the single period Λ over which the optical axis 30A of the liquid crystal compound 30 rotates by 180° in the arrow X direction in the liquid crystal alignment pattern, the single period $Λ_A$ of the optically-anisotropic layer of the first optically-anisotropic member 12 is the shortest, and the single period $Λ_B$ of the optically-anisotropic layer of the second optically-anisotropic member 14 is the longest. In the optical element 32, the first optically-anisotropic member 12 side is a light incidence side. That is, in the optical element 32, in the optically-anisotropic layers (laminate) of the first optically-anisotropic member 12 on the light incidence side, light is refracted to the highest degree.

Further, in the optical element 32, the wavelength selective phase difference layer 18R that selectively converts a turning direction of circularly polarized light of red light is disposed between the first optically-anisotropic member 12 and the second optically-anisotropic member 14. In addition, in the optical element 32, the wavelength selective phase difference layer 18G that selectively converts a turning direction of circularly polarized light of green light is disposed between the second optically-anisotropic member 14 and the third optically-anisotropic member 16.

Hereinafter, the effects of the optical element 32 will be described in detail with reference to the conceptual diagrams of FIGS. 12 and 13.

For example, the optical element 10 refracts incidence light to be transmitted in a predetermined direction, the incidence light including circularly polarized light of red light, circularly polarized light of green light, and circularly polarized light of blue light. In FIG. 12, incidence light is right circularly polarized light as in FIG. 9. However, even in a case where incidence light is left circularly polarized light, the effects are the same, except that the refraction direction is reversed.

In the optical element 10, first, right circularly polarized light $R_R$ of red light, right circularly polarized light $G_R$ of green light and right circularly polarized light $B_R$ of blue light (refer to incidence light $L_4$ in FIG. 5) are incident into the laminate including the right-twisted optically-anisotropic layer 26Ap and the left-twisted optically-anisotropic layer 26Am in the first optically-anisotropic member 12.

As described above, regarding a laminate including two optically-anisotropic layers that have the same liquid crystal alignment pattern in which the direction of the optical axis 30A continuously changes while rotating in a plane and have a configuration in which the liquid crystal compounds 30 are twisted and aligned in a thickness direction and twisted directions of the liquid crystal compounds 30 are opposite to each other, the same effects as those of the optically-anisotropic layer 26 shown in FIGS. 4 and 5 are exhibited.

Accordingly, in a case where right circularly polarized light $R_R$ of red light, right circularly polarized light $G_R$ of green light, and right circularly polarized light $B_R$ of blue light are incident into the first optically-anisotropic member 12, as described above, the right circularly polarized light $R_R$ of red light, the right circularly polarized light $G_R$ of green light, and the right circularly polarized light $B_R$ of blue light are refracted in a direction opposite to the arrow X direction at a predetermined angle with respect to the incidence direction and are converted into left circularly polarized light $R_{1L}$ of red light, left circularly polarized light $G_{1L}$ of green light, and left circularly polarized light $B_{1L}$ of blue light having an opposite turning direction (refer to transmitted light $L_5$ in FIG. 5).

Here, as described above, regarding the refraction angle by the optically-anisotropic layer, the angle of red light having the longest wavelength is the largest, and the angle of blue light having the shortest wavelength is the smallest. Accordingly, regarding the refraction angle with respect to the incidence light, as shown in FIG. 13, an angle $θ_{R1}$ of red light (R) is the largest, an angle $θ_{G1}$ of green light (G) is intermediate, and an angle $θ_{B1}$ of blue light (B) is the smallest. In addition, regarding the single period Λ of the optically-anisotropic layer, the single period $Λ_A$ of the optically-anisotropic layer of the first optically-anisotropic member 12 is the shortest. Therefore, the refraction angle of each light transmitted through the first optically-anisotropic member 12 is the largest.

Next, the left circularly polarized light $R_{1L}$ of red light, the left circularly polarized light $G_{1L}$ of green light, and the left circularly polarized light $B_{1L}$ of blue light transmitted through the first optically-anisotropic member 12 are incident into the wavelength selective phase difference layer 18R.

As described above, the wavelength selective phase difference layer 18R converts only the circularly polarized light of red light into circularly polarized light having an opposite turning direction and allows transmission of the other light as it is.

Accordingly, in a case where the left circularly polarized light $R_{1L}$ of red light, the left circularly polarized light $G_{1L}$ of green light and the left circularly polarized light $B_{1L}$ of blue light are incident into and transmits through the wavelength selective phase difference layer 18R, the left circularly polarized light $G_{1L}$ of green light and the left circularly polarized light $B_{1L}$ of blue light transmit through the wavelength selective phase difference layer 18R as it is. On the other hand, the left circularly polarized light $R_{1L}$ of red light is converted into right circularly polarized light $R_{1R}$ of red light.

Next, the right circularly polarized light $R_{1R}$ of red light, the left circularly polarized light $G_{1L}$ of green light, and the left circularly polarized light $B_{1L}$ of blue light transmitted through the wavelength selective phase difference layer 18R are incident into the laminate including the right-twisted optically-anisotropic layer 26Bp and the left-twisted optically-anisotropic layer 26Bm in the second optically-anisotropic member 14.

The right circularly polarized light $R_{1R}$ of red light, the left circularly polarized light $G_{1L}$ of green light, and the left circularly polarized light $B_{1L}$ of blue light incident into the second optically-anisotropic member 14 are also refracted and converted into circularly polarized light having an opposite turning direction such that left circularly polarized light $R_{2L}$ of red light, right circularly polarized light $G_{2R}$ of green light, and right circularly polarized light $B_{2R}$ of blue light are emitted.

Here, the green light and the blue light incident into the second optically-anisotropic member 14 are left circularly polarized light. On the other hand, the red light incident into the second optically-anisotropic member 14 is right circularly polarized light having a direction of circularly polarized light that is converted by the wavelength selective phase difference layer 18R and is different in turning direction from that of green light and blue light.

In addition, in the optically-anisotropic layer of the first optically-anisotropic member 12 and the optically-anisotropic layer of the second optically-anisotropic member 14, as described above, rotation directions of the optical axes 30A of the liquid crystal compounds 30 are opposite to each other.

Figure 13:
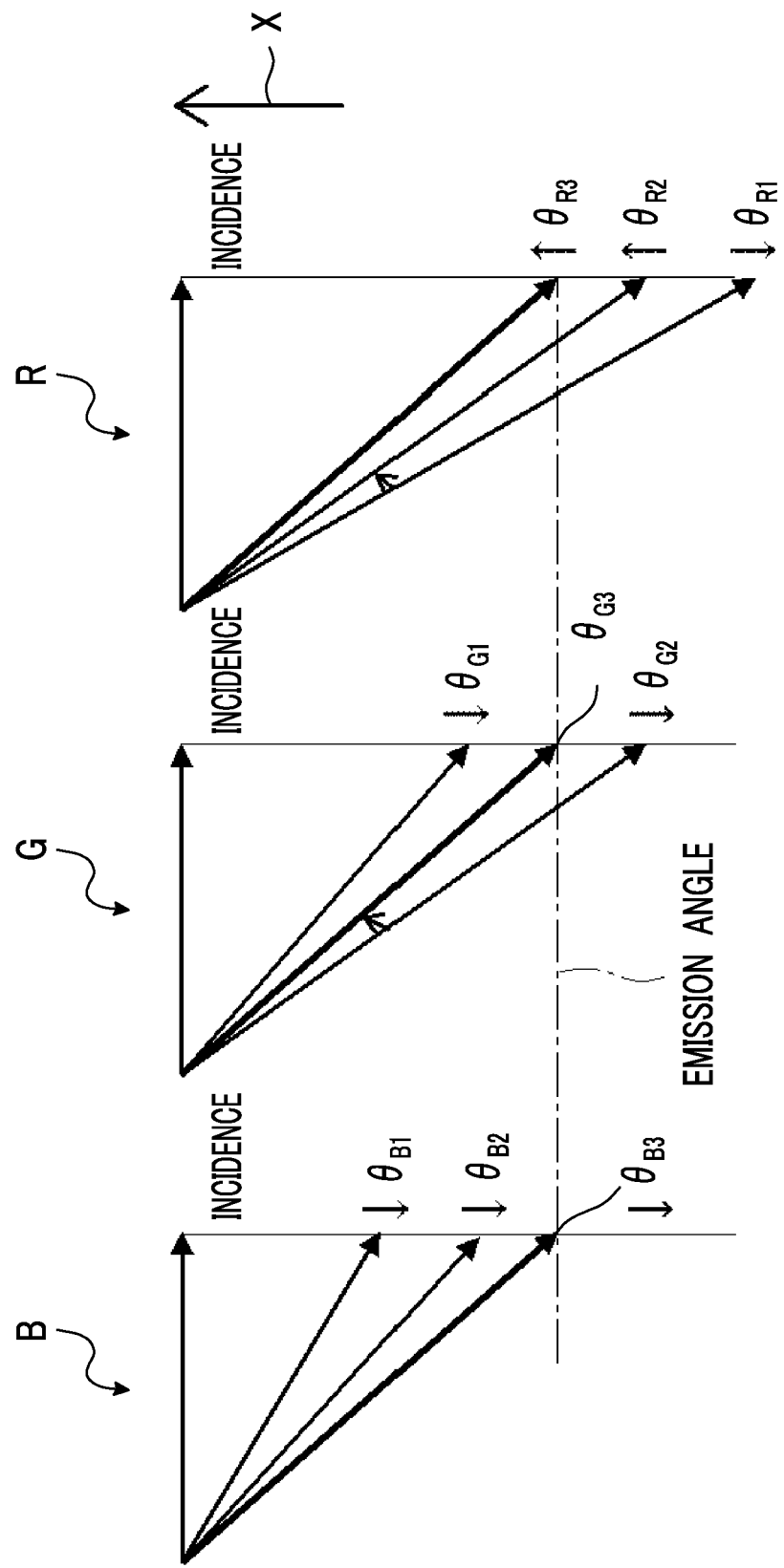
FIG. 13 is a conceptual diagram showing effects of the optical element shown in FIG. 11.

Therefore, the left circularly polarized light $G_{2L}$ of green light and the left circularly polarized light $B_{2L}$ of blue light incident into the right-twisted optically-anisotropic layer 26Bp are further refracted in a direction opposite to the arrow X direction and is emitted at the angle $\theta_{G2}$ and the angle $\theta_{B2}$ with respect to the incidence light (the right circularly polarized light $G_R$ of green light and the right circularly polarized light $B_R$ of blue light) as shown in FIG. 13 (refer to transmitted light $L_5$ in FIG. 5).

On the other hand, the right circularly polarized light $R_{1R}$ of red light having a turning direction opposite to that of circularly polarized light incident into the second optically-anisotropic member 14 is refracted in the arrow X direction that is opposite to that of the first optically-anisotropic member 12 such that refraction returns to the initial state as shown on the right side of FIG. 13 (refer to transmitted light $L_2$ of FIG. 4). As a result, the left circularly polarized light $R_{2L}$ of red light emitted from the second optically-anisotropic member 14 is emitted at an angle $\theta_{R2}$ that is less than the angle $\theta_{R1}$ with respect to the incidence light (the right circularly polarized light $R_R$ of red light).

In addition, regarding the single period $\Lambda$ of the optically-anisotropic layer, the single period $\Lambda_B$ of the optically-anisotropic layer of the second optically-anisotropic member 14 is the longest. Therefore, the refraction angle of each light transmitted through the second optically-anisotropic member 14 is the smallest.

Next, the left circularly polarized light $R_{2L}$ of red light, the right circularly polarized light $G_{2R}$ of green light, and the right circularly polarized light $B_{2R}$ of blue light transmitted through the second optically-anisotropic member 14 are incident into the wavelength selective phase difference layer 18G.

As described above, the wavelength selective phase difference layer 18G converts only the circularly polarized light of green light into circularly polarized light having an opposite turning direction and allows transmission of the other light as it is.

Accordingly, in a case where the left circularly polarized light $R_{2L}$ of red light, the right circularly polarized light $G_{2R}$ of green light and the right circularly polarized light $B_{2R}$ of blue light are incident into and transmits through the wavelength selective phase difference layer 18G, the left circularly polarized light $R_{2L}$ of red light and the right circularly polarized light $B_{2R}$ of blue light transmit through the wavelength selective phase difference layer 18G as it is. On the other hand, the right circularly polarized light $G_{2R}$ of green light is converted into left circularly polarized light $G_{2L}$ of green light having an opposite turning direction.

Next, the left circularly polarized light $R_{2L}$ of red light, the left circularly polarized light $G_{2L}$ of green light, and the right circularly polarized light $B_{2R}$ of blue light transmitted through the wavelength selective phase difference layer 18G are incident into the laminate including the right-twisted optically-anisotropic layer 26Cp and the left-twisted optically-anisotropic layer 26Cm of the third optically-anisotropic member 16.

The left circularly polarized light $R_{2L}$ of red light, the left circularly polarized light $G_{2L}$ of green light, and the right circularly polarized light $B_{2R}$ of blue light incident into the third optically-anisotropic member 16 are also refracted and converted into circularly polarized light having an opposite turning direction such that right circularly polarized light $R_{3R}$ of red light, right circularly polarized light $G_{3R}$ of green light, and left circularly polarized light $B_{3L}$ of blue light are emitted.

Here, the blue light incident into the third optically-anisotropic member 16 is the right circularly polarized light $B_{2R}$ of blue light. In addition, the direction of circularly polarized light of red light is previously converted by the wavelength selective phase difference layer 18R. Therefore, the red light incident into the third optically-anisotropic member 16 is the left circularly polarized light $R_{2L}$ of red light having a direction of circularly polarized light that is different from that of blue light. Further, the green light incident into the third optically-anisotropic member 16 is the left circularly polarized light $G_{2L}$ of green light having a direction of circularly polarized light that is converted by the wavelength selective phase difference layer 18G.

That is, the blue light incident into the third optically-anisotropic member 16 is right circularly polarized light, and the red light and the green light incident into the third optically-anisotropic member 16 are left circularly polarized light having a turning direction that is converted by the wavelength selective phase difference layer.

In addition, in the optically-anisotropic layer of the second optically-anisotropic member 14 and the optically-anisotropic layer of the third optically-anisotropic member 16, as described above, rotation directions of the optical axes 30A of the liquid crystal compounds 30 are opposite to each other.

Figure 12:
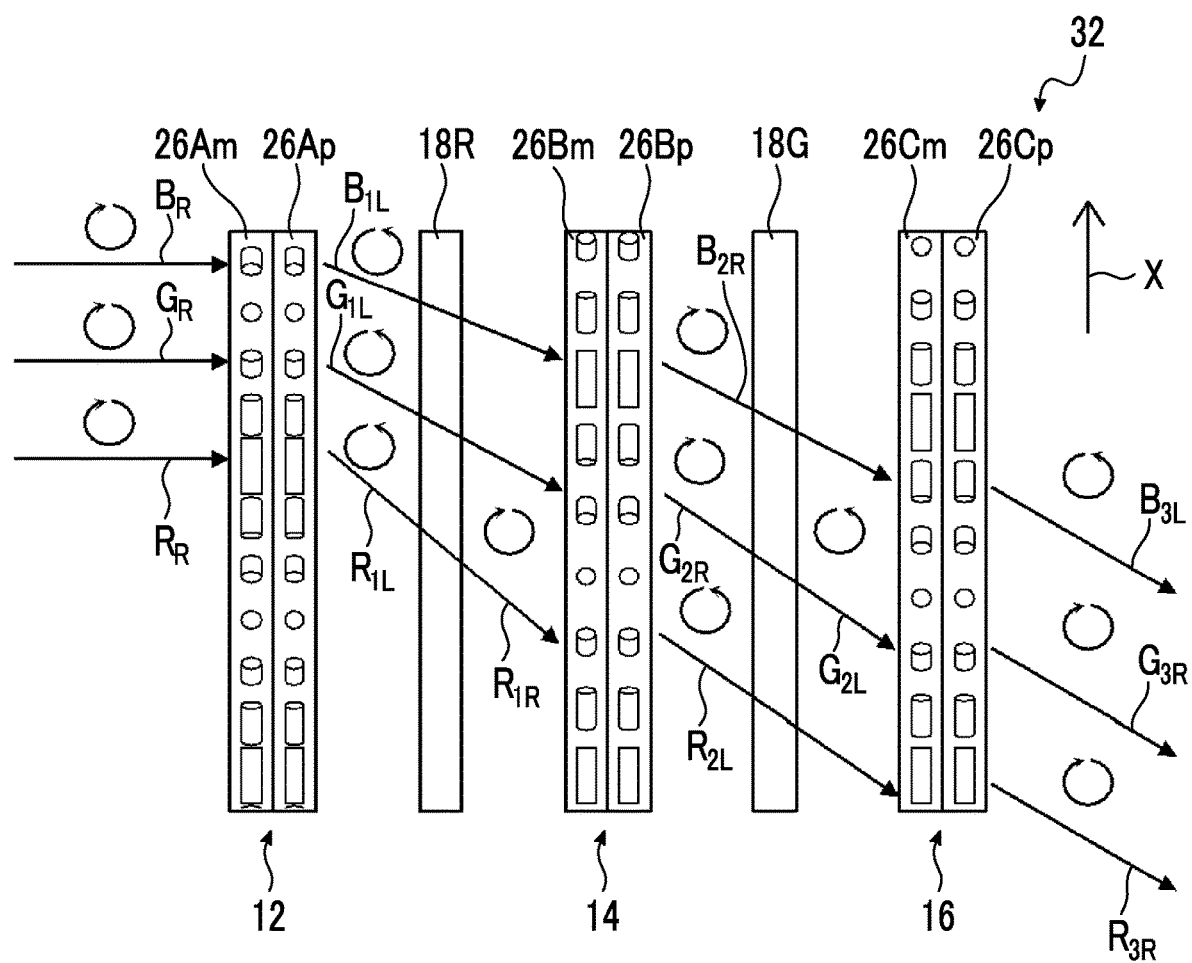
FIG. 12 is a conceptual diagram showing effects of the optical element shown in FIG. 11.

Therefore, as shown in FIGS. 12 and 13, the right circularly polarized light $B_{2R}$ of blue light incident into the third optically-anisotropic layer 26C is further refracted in a direction opposite to the arrow X direction and is emitted at an angle $\theta_{B3}$ with respect to the incidence light (the right circularly polarized light $B_R$ of blue light) as shown in FIG. 13.

On the other hand, in a case where the left circularly polarized light $R_{2L}$ of red light having an opposite direction of circularly polarized light is incident into the third optically-anisotropic member 16, the left circularly polarized light $R_{2L}$ of red light is further refracted to return to the arrow X direction. As a result, the right circularly polarized light $R_{3R}$ of red light emitted from the third optically-anisotropic member 16 is emitted at an angle $\theta_{R3}$ that is less than the previous angle $\theta_{R2}$ with respect to the incidence light (the right circularly polarized light $R_R$ of red light).

Likewise, in a case where the left circularly polarized light $G_{2L}$ of green light having a direction of circularly polarized light that is opposite to that of blue light is incident into the third optically-anisotropic member 16, conversely, the left circularly polarized light $G_{2L}$ of green light is refracted to return to the direction indicated by arrow X as shown in the center of FIG. 10. As a result, the right circularly polarized light $G_{3R}$ of green light emitted from the third optically-anisotropic member 16 is emitted at an angle $\theta_{G3}$ that is less than the angle $\theta_{G2}$ with respect to the incidence light (the right circularly polarized light $G_R$ of green light).

Among the single periods $\Lambda$ of the optically-anisotropic layers, the single period $\Lambda_C$ of the optically-anisotropic layer of the third optically-anisotropic member 16 is between those of the other optically-anisotropic members. Therefore, the refraction angle of light transmitted through the third optically-anisotropic member 16 is an angle between the first optically-anisotropic member 12 and the second optically-anisotropic member 14.

That is, in the optical element 32, red light having the longest wavelength and large refraction by the optically-anisotropic layer is refracted in a direction opposite to the arrow X direction by the first optically-anisotropic member 12 (the left-twisted optically-anisotropic layer 26Am and the right-twisted optically-anisotropic layer 26Ap). Next, the red light is refracted twice in the opposite arrow X direction by the second optically-anisotropic member (the left-twisted optically-anisotropic layer 26Bm and the right-twisted optically-anisotropic layer 26Bp) and the third optically-anisotropic member 16 (the left-twisted optically-anisotropic layer 26Cm and the right-twisted optically-anisotropic layer 26Cp).

In addition, the green light having the second longest wavelength and the second largest refraction by the optically-anisotropic layer is refracted in a direction opposite to the arrow X direction by the first optically-anisotropic member 12 and the second optically-anisotropic member 14 and is refracted once in the opposite arrow X direction by the third optically-anisotropic member 16.

Further, the blue light having the shortest wavelength and the smallest refraction by the optically-anisotropic layer is refracted three times in a direction opposite to the arrow X direction by the first optically-anisotropic member 12, the second optically-anisotropic member 14, and the third optically-anisotropic member 16.

This way, in a preferable aspect of the optical element 32 according to the embodiment of the present invention, initially, all the light components are largely refracted in the same direction. Next, the light is refracted by one or more optically-anisotropic members, and depending on the magnitude of refraction by the optically-anisotropic layer corresponding to a wavelength, the light having the longest wavelength is refracted to return to a direction opposite to the initial refraction direction the most multiple times. As the wavelength decreases, the number of times of refraction that returns to the direction opposite to the initial refraction is reduced. Regarding the light having the shortest wavelength, the number of times of refraction that returns to the direction opposite to the initial refraction direction is the smallest. As a result, the refraction angle $\theta_{R3}$ of red light, the refraction angle $\theta_{G3}$ of green light, and the refraction angle $\theta_{B3}$ of blue light with respect to incidence light can be made to be very close to each other.

Therefore, in the optical element 32 according to the embodiment of the present invention, red light, blue light, and green light that are incident can be refracted at substantially the same angle to be emitted substantially in the same direction. Further, the optically-anisotropic layer is obtained by twisting and aligning the liquid crystal compound, and the optically-anisotropic member is obtained by laminating two optically-anisotropic layers having different twisted directions. Therefore, the amount of emitted light (transmitted light) is also large.

In a case where light components having three wavelength ranges are targets as in the optical element 32 in the example shown in the drawing, a designed wavelength of light having the longest wavelength is represented by $\lambda a$, a designed wavelength of light having the intermediate wavelength is represented by $\lambda b$, and a designed wavelength of light having the shortest wavelength is represented by $\lambda c$ ($\lambda a > \lambda b > \lambda c$), a single period of a liquid crystal alignment pattern in the optically-anisotropic layer of the first optically-anisotropic member is represented by $\Lambda_1$, a single period of a liquid crystal alignment pattern in the optically-anisotropic layer of the second optically-anisotropic member is represented by $\Lambda_2$, and a single period of a liquid crystal alignment pattern in the optically-anisotropic layer of the third optically-anisotropic member is represented by $\Lambda_3$, emission directions of light components in two wavelength ranges can be made to be substantially the same by satisfying the following two expressions.

$$\Lambda_2 = [(\lambda a + \lambda c)\lambda b / (\lambda a - \lambda b)\lambda c]\Lambda_1$$

$$\Lambda_3 = [(\lambda a + \lambda c)\lambda b / (\lambda b - \lambda c)\lambda a]\Lambda_1$$

In the expressions, any one of the first optically-anisotropic member 12 and the third optically-anisotropic member 16 may be the first optically-anisotropic member.

In consideration of this point, in the present invention, in the optical element 32 in which light components having three wavelengths (wavelength ranges) are targets, it is preferable that at least one of the following two expressions is satisfied, and it is more preferable that both the following two expressions are satisfied.

$$0.6 * \{[(\lambda a + \lambda c)\lambda b / (\lambda a - \lambda b)\lambda c]\Lambda_1\} \leq \Lambda_2 \leq 3.0 * \{[(\lambda a + \lambda c)\lambda b / (\lambda a - \lambda b)\lambda c]\Lambda_1\}$$

$$0.6 * \{[(\lambda a + \lambda c)\lambda b / (\lambda b - \lambda c)\lambda a]\Lambda_1\} \leq \Lambda_3 \leq 3.0 * \{[(\lambda a + \lambda c)\lambda b / (\lambda b - \lambda c)\lambda a]\Lambda_1\}$$

As a result, by significantly reducing the wavelength dependence of refraction, emission directions of light components having two wavelength ranges can be made to be substantially the same.

In addition, in the present invention, in the optical element 32 in which light components having three wavelengths (wavelength ranges) are targets, it is more preferable that the following two expressions are satisfied.

$$0.7 * \{[(\lambda a + \lambda c)\lambda b / (\lambda a - \lambda b)\lambda c]\Lambda_1\} \leq \Lambda_2 \leq 1.8 * \{[(\lambda a + \lambda c)\lambda b / (\lambda a - \lambda b)\lambda c]\Lambda_1\}$$

$$0.7 * \{[(\lambda a + \lambda c)\lambda b / (\lambda b - \lambda c)\lambda a]\Lambda_1\} \leq \Lambda_3 \leq 1.8 * \{[(\lambda a + \lambda c)\lambda b / (\lambda b - \lambda c)\lambda a]\Lambda_1\}$$

It is still more preferable that the following two expressions are satisfied.

$$0.8*\{[(\lambda a+\lambda c)\lambda b/(\lambda a-\lambda b)\lambda c]\Lambda_1\} \leq \Lambda_2 \leq 1.3*\{[(\lambda a+\lambda c)\lambda b/(\lambda a-\lambda b)\lambda c]\Lambda_1\}$$

$$0.8*\{[(\lambda a+\lambda c)\lambda b/(\lambda b-\lambda c)\lambda a]\Lambda_1\} \leq \Lambda_3 \leq 1.3*\{[(\lambda a+\lambda c)\lambda b/(\lambda b-\lambda c)\lambda a]\Lambda_1\}$$

It is still more preferable that the following two expressions are satisfied.

$$0.9*\{[(\lambda a+\lambda c)\lambda b/(\lambda a-\lambda b)\lambda c]\Lambda_1\} \leq \Lambda_2 \leq 1.15*\{[(\lambda a+\lambda c)\lambda b/(\lambda a-\lambda b)\lambda c]\Lambda_1\}$$

$$0.9*\{[(\lambda a+\lambda c)\lambda b/(\lambda b-\lambda c)\lambda a]\Lambda_1\} \leq \Lambda_3 \leq 1.15*\{[(\lambda a+\lambda c)\lambda b/(\lambda b-\lambda c)\lambda a]\Lambda_1\}$$

In the optical element according to the embodiment of the present invention, as described above, a plurality of optically-anisotropic members are arranged, and depending on the wavelength of light, light having a long wavelength and large refraction by the optically-anisotropic layer is refracted in a direction opposite to the initial optically-anisotropic member a large number of times. As a result, light components having different wavelengths can be refracted substantially at the same angle and emitted substantially in the same direction.

Therefore, in a case where the optical element according to the embodiment of the present invention includes a plurality of wavelength selective phase difference layers, as in the optical element 32 shown in FIGS. 11 and 12, in the wavelength selective phase difference layers, it is preferable that a wavelength range of light having a turning direction of circularly polarized light that is converted into an opposite turning direction gradually decreases in the arrangement direction of the optically-anisotropic members.

In addition, in the optical element according to the embodiment of the present invention, in a case where the refraction by the optically-anisotropic layer of the initial optically-anisotropic member is set to be large, the light is subsequently refracted gradually in the same direction, and the refraction gradually returns to the initial state in the opposite direction, the refraction of each light is easily controlled and is easily made to be homogeneous. In consideration of this point, as in the optical element 32 shown in FIGS. 11 and 12, it is preferable that the single period $\Lambda$ in the liquid crystal alignment pattern of the optically-anisotropic layer of the optically-anisotropic member positioned at the most distant position in the arrangement direction is the shortest. That is, it is preferable that the refraction by the optically-anisotropic member positioned at the most distant position in the arrangement direction is the largest.

In the optical element according to the embodiment of the present invention, the single period $\Lambda$ in the liquid crystal alignment pattern of the optically-anisotropic layer of the optically-anisotropic member may gradually increase in the arrangement direction of the optically-anisotropic members. Alternatively, as in the optical element 32 shown in FIGS. 11 and 12, a change in the single period $\Lambda$ of the liquid crystal alignment pattern of the optically-anisotropic layer of the optically-anisotropic member may be irregular in the arrangement direction of the optically-anisotropic members, for example, a configuration in which an optically-anisotropic member having an intermediate length of the single period $\Lambda$ of the liquid crystal alignment pattern of the optically-anisotropic layer is provided between an optically-anisotropic member having the longest single period $\Lambda$ of the liquid crystal alignment pattern of the optically-anisotropic layer and an optically-anisotropic member having the shortest single period $\Lambda$ of the liquid crystal alignment pattern of the optically-anisotropic layer. That is, in the optical element according to the embodiment of the present invention, the single period $\Lambda$ in the liquid crystal alignment pattern of the optically-anisotropic layer of each of the optically-anisotropic members may be appropriately set depending on the wavelength of light and the refractive index of the optically-anisotropic member (optically-anisotropic layer).

In a case where the optical element according to the embodiment of the present invention includes a plurality of wavelength selective phase difference layers, basically, the optically-anisotropic members and the wavelength selective phase difference layers are alternately arranged as in the optical element 32 shown in FIGS. 11 and 12. In this case, it is preferable that the number of the wavelength selective phase difference layers is less than the number of the optically-anisotropic members by one.

However, the present invention is not limited to this configuration. For example, a plurality of optically-anisotropic layers may be continuously arranged such that light that is continuously refracted by the plurality of optically-anisotropic layers is incident into the wavelength selective phase difference layer.

In addition, a plurality of wavelength selective phase difference layers may be disposed between two optically-anisotropic members. However, in a case where a plurality of wavelength selective phase difference layers that convert circularly polarized light having the same wavelength range into circularly polarized light having an opposite turning direction are disposed between two optically-anisotropic members, it is preferable that the number of the wavelength conversion phase difference layers is an odd number.

In the optical element according to the embodiment of the present invention, optically-anisotropic members having the same single period $\Lambda$ of the liquid crystal alignment pattern of the optically-anisotropic layer may be present.

However, from the viewpoint that, for example, refraction, that is, emission angles of light components having a plurality of wavelength ranges can be easily made to be homogeneous, it is preferable that all the optically-anisotropic members have different single periods $\Lambda$ of the liquid crystal alignment patterns of the optically-anisotropic layers.

In the optical element according to the embodiment of the present invention, the single period $\Lambda$ in the alignment pattern of the liquid crystal compound of the optically-anisotropic layer forming the optically-anisotropic member is not particularly limited and may be appropriately set depending on the use of the optical element and the like.

The optical element according to the embodiment of the present invention may include a wavelength selective phase difference layer that selectively converts circularly polarized light having the shortest designed wavelength into circularly polarized light having an opposite turning direction. For example, a third wavelength selective phase difference layer that selectively converts circularly polarized light of blue light into circularly polarized light having an opposite turning direction may be disposed after the third optically-anisotropic member 16. "After the third optically-anisotropic member 16" represents the downstream of in the traveling direction of light.

As described above, the third wavelength selective phase difference layer converts only the circularly polarized light of blue light into circularly polarized light having an opposite turning direction and allows transmission of the other light as it is.

Accordingly, in a case where the right circularly polarized light $R_{3R}$ of red light, the right circularly polarized light $G_{3R}$ of green light and the left circularly polarized light $B_{3L}$ of blue light are incident into and transmits through the third wavelength selective phase difference layer B, the right circularly polarized light $R_{3R}$ of red light and the right circularly polarized light $G_{3R}$ of green light transmit through the third wavelength selective phase difference layer B as it is. On the other hand, the left circularly polarized light $B_{3L}$ of blue light is converted into right circularly polarized light $B_{3R}$ of blue light.

As a result, circularly polarized light components of blue light, green light, and red light emitted from the optical element can be made to have the same turning direction.

Here, the optical element according to the embodiment of the present invention can be suitably used as, for example, a diffraction element that refracts light displayed by a display to be introduced into a light guide plate or a diffraction element that refracts light propagated in a light guide plate to be emitted to an observation position by a user from the light guide plate in AR glasses. In particular, the optical element 32 that can handle with a full color image can be suitably used as a diffraction element in AR glasses.

In this case, in order to totally reflect light from the light guide plate, it is necessary to refract light to be introduced into the light guide plate at a large angle to some degree with respect to incidence light. In addition, in order to reliably emit light propagated in the light guide plate, it is necessary to refract light at a large angle to some degree with respect to incidence light.

In addition, as described above, regarding the transmission angle of light through the optically-anisotropic layer, the angle of transmitted light with respect to incidence light can be increased by reducing the single period Λ in the liquid crystal alignment pattern.

Further, as described above, in the optically-anisotropic member including the laminate of two optically-anisotropic layers having the liquid crystal alignment pattern in which the optical axis continuously rotates in the in-plane direction and having a configuration in which the liquid crystal compounds are twisted and aligned and twisted directions are opposite to each other, the amount of transmitted light (emitted light) in the optically-anisotropic member can be improved as compared to a case where the optically-anisotropic layer 26 that has the same liquid crystal alignment pattern and in which the liquid crystal compound 30 is not twisted and aligned is used.

In particular, the optically-anisotropic layer 26 in which the liquid crystal compound is not twisted and aligned, In a case where the refraction angle of transmitted light with respect to incidence light is a predetermined angle or more, a decrease in the amount of transmitted light increases. On the other hand, in the optically-anisotropic member in which two optically-anisotropic layers having opposite twisted directions are laminated, even in a case where the refraction angle of transmitted light is large, a decrease in the amount of light is extremely small. In a case where the refraction angle of transmitted light with respect to incidence light is a predetermined angle or more, the effect of improving the amount of light increases. Accordingly, in a case where the single period Λ of the alignment pattern of the liquid crystal compound in the optically-anisotropic layer is short, the effect of improving the amount of light in the optical element according to the embodiment of the present invention is high.

In consideration of this point, the single period Λ in the liquid crystal alignment pattern of at least one optically-anisotropic layer forming the optically-anisotropic member is preferably 10 μm or less, more preferably 5 μm or less, and still more preferably 3 μm or less.

In consideration of the accuracy of the liquid crystal alignment pattern and the like, the single period Λ in the liquid crystal alignment pattern of the optically-anisotropic layer is preferably 0.1 μm or more.

In addition, due to the same reason, in the optically-anisotropic member forming the optical element according to the embodiment of the present invention, the transmission angle of transmitted light with respect to incidence light is preferably 10° or more, more preferably 15° or more, and still more preferably 20° or more.

As described above, regarding a laminate including two optically-anisotropic layers that have the same liquid crystal alignment pattern in which the direction of the optical axis 30A continuously changes while rotating in a plane and have a configuration in which the liquid crystal compounds 30 are twisted and aligned in a thickness direction and twisted directions of the liquid crystal compounds 30 are opposite to each other, the same effects as those of the optically-anisotropic layer 26 shown in FIGS. 4 and 5 are exhibited.

That is, the laminate including the right-twisted optically-anisotropic layer 26Ap and the left-twisted optically-anisotropic layer 26Am, the laminate including the right-twisted optically-anisotropic layer 26Bp and the left-twisted optically-anisotropic layer 26Bm, and the laminate including the right-twisted optically-anisotropic layer 26Cp and the left-twisted optically-anisotropic layer 26Cm exhibits the same effects as those of the optically-anisotropic layer 26 shown in FIGS. 4 and 5.

On the other hand, in the optically-anisotropic layer that has the same liquid crystal alignment pattern in which the direction of the optical axis 30A continuously changes while rotating in a plane and has a configuration in which the liquid crystal compound 30 is twisted and aligned in a thickness direction, in a case where light is vertically incident, the single layer refracts only a circularly polarized light component having a turning direction that matches the twisted direction according to the twisted direction of the liquid crystal compound 30 and allows transmission of the other circularly polarized light components as they are.

For example, in the first optically-anisotropic member 12, the right-twisted optically-anisotropic layer 26Ap as a single layer in which the twisted direction of the liquid crystal compound 30 is the right direction (twisted angle: +ϕ) refracts only right circularly polarized light as described above and allows transmission of left circularly polarized light. Conversely the left-twisted optically-anisotropic layer 26Am as a single layer in which the twisted direction of the liquid crystal compound 30 is the left direction (twisted angle: +−ϕ) refracts only left circularly polarized light as described above and allows transmission of right circularly polarized light.

Accordingly, in a case where the turning direction of circularly polarized light of incidence light is the in-plane direction, the optically-anisotropic member positioned closest to the light incidence side, that is, the optically-anisotropic member positioned at the end portion in the arrangement direction (laminating direction) may include only one optically-anisotropic layer depending on the turning direction of incident circularly polarized light without including two optically-anisotropic layers having opposite twisted directions of the liquid crystal compounds 30.

Figure 14:
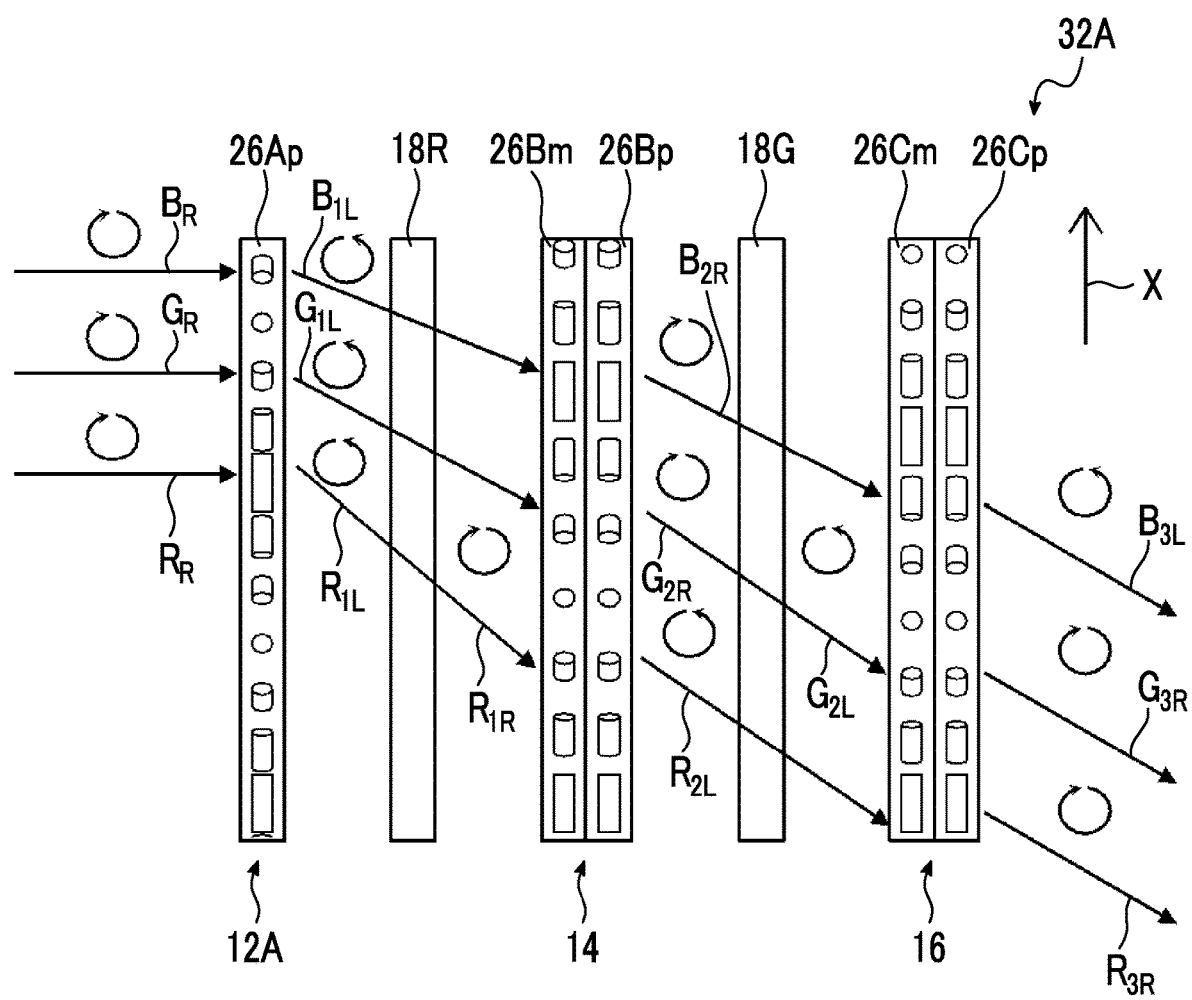
FIG. 14 is a diagram conceptually showing another example of the optically-anisotropic layer of the optical element according to the present invention.

For example, in a case where right circularly polarized light $R_R$ of red light, right circularly polarized light $G_R$ of green light, and right circularly polarized light $B_R$ of blue light are incident as in the optical element 32 shown in FIGS. 11 and 12, a first optically-anisotropic member 12A may include only one right-twisted optically-anisotropic layer 26Ap in which the twisted direction of the liquid crystal compound 30 is the right direction as in an optical element 32A shown in FIG. 14.

Figure 9:
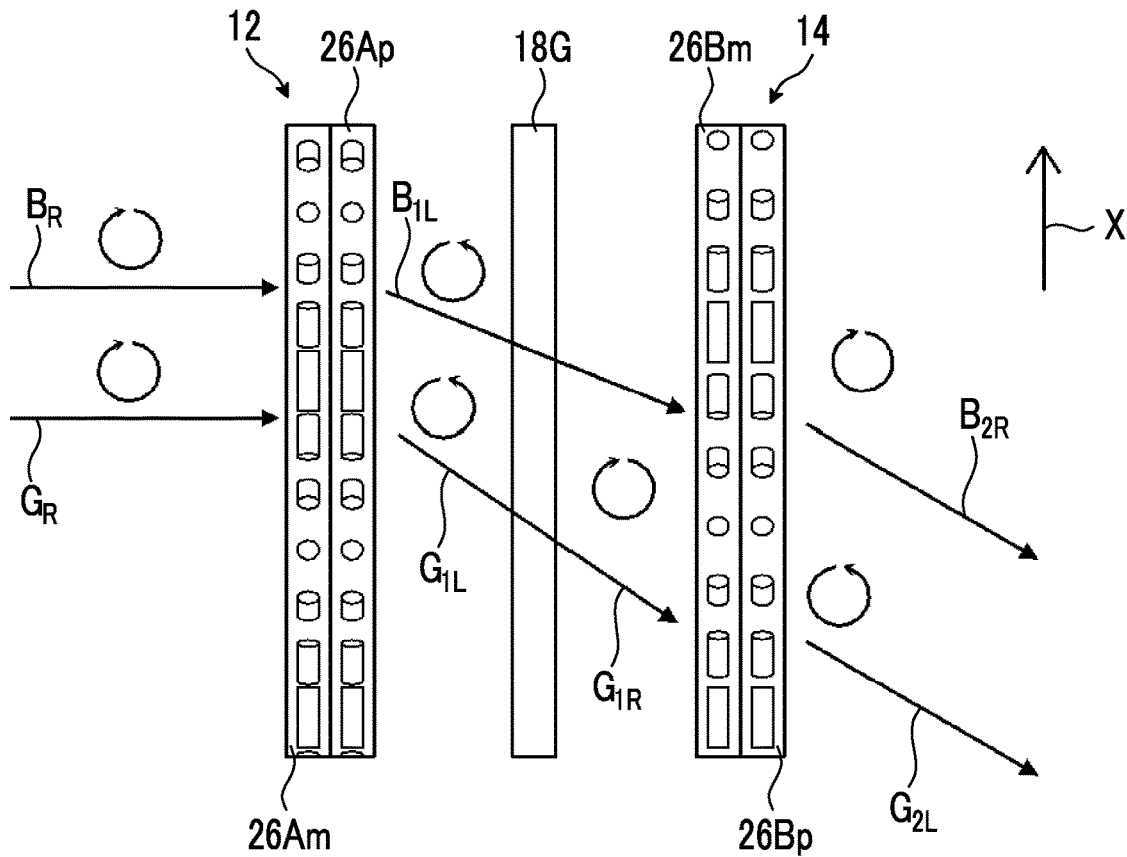
FIG. 9 is a conceptual diagram showing effects of the optical element shown in FIG. 1.

Likewise, in a case where right circularly polarized light $G_R$ of green light and right circularly polarized light $B_R$ of blue light are incident as in the optical element 10 shown in FIGS. 1 and 9, in the optical element 10 shown in FIGS. 1 and 9, the first optically-anisotropic member 12 may include only one right-twisted optically-anisotropic layer 26Ap in which the twisted direction of the liquid crystal compound 30 is the right direction without including left-twisted optically-anisotropic layer 26Am in which the twisted direction of the liquid crystal compound 30 is the left direction.

Conversely, in a case where left circularly polarized light is incident into the optical element, the first optically-anisotropic member 12 on the light incidence side may include only one left-twisted optically-anisotropic layer 26Am in which the twisted direction of the liquid crystal compound 30 is the left direction without including right-twisted optically-anisotropic layer 26Ap in which the twisted direction of the liquid crystal compound 30 is the right direction.

Further, in the optical element according to the embodiment of the present invention, the optically-anisotropic layer 26 that has the liquid crystal alignment pattern in which the direction of the optical axis 30A continuously changes while rotating in a plane and in which the liquid crystal compound 30 is not twisted and aligned in the thickness direction can also be used.

That is, as described above, the laminate including the right-twisted optically-anisotropic layer 26Ap and the left-twisted optically-anisotropic layer 26Am, the laminate including the right-twisted optically-anisotropic layer 26Bp and the left-twisted optically-anisotropic layer 26Bm, and the laminate including the right-twisted optically-anisotropic layer 26Cp and the left-twisted optically-anisotropic layer 26Cm exhibits the same effects as those of the optically-anisotropic layer 26 shown in FIGS. 4 and 5.

Accordingly, for example, in the optical element 10 shown in FIGS. 1 and 9, any one of the first optically-anisotropic member 12 or the second optically-anisotropic member 14 may be replaced with the optically-anisotropic layer 26 shown in FIGS. 4 and 5. In addition, in the optical element 32 shown in FIGS. 11 and 12, one or two among the first optically-anisotropic member 12, the second optically-anisotropic member 14, and the third optically-anisotropic member 16 may be replaced with the optically-anisotropic layer 26 shown in FIGS. 4 and 5.

In addition, for example, in the optical element 32A shown in FIG. 14, any one of the second optically-anisotropic member 14 or the third optically-anisotropic member 16 may be replaced with the optically-anisotropic layer 26 shown in FIGS. 4 and 5. Further, in the configuration in which the first optically-anisotropic member 12 of the optical element 10 shown in FIGS. 1 and 9 includes only one right-twisted optically-anisotropic layer 26Ap, the second optically-anisotropic member 14 may be replaced with the optically-anisotropic layer 26 shown in FIGS. 4 and 5.

This way, in an aspect where the optically-anisotropic layer 26 is used, there are some disadvantages from the viewpoint of the amount of transmitted light, but light components having different wavelengths can be refracted substantially at the same angle and emitted substantially in the same direction as in the above-described examples.

Here, as described above, in the present invention, it is preferable that light is refracted to the highest degree in the first optically-anisotropic member into which the light is initially incident. In addition, as described above, in the optically-anisotropic layer 26, in a case where the refraction angle of transmitted light with respect to incidence light increases, the amount of light significantly decreases. In consideration of this point, it is preferable that the member into which light is initially incident, that is, the member positioned at one end in the arrangement direction is the optically-anisotropic member including one optically-anisotropic layer in which the liquid crystal compound is twisted and aligned or a laminate of two optically-anisotropic layers having different twisted directions, for example, as shown in FIGS. 11 and 14 without being the optically-anisotropic layer 26 in which the liquid crystal compound is not twisted and aligned.

In the optical element according to the embodiment of the present invention in which one of the first optically-anisotropic member 12 to the third optically-anisotropic member 16 are replaced with the optically-anisotropic layer 26, the single period Λ of the liquid crystal alignment pattern of the optically-anisotropic layer 26 is the same as the single period Λ of the optically-anisotropic layer of the first optically-anisotropic member 12 to the third optically-anisotropic member 16.

In the optical elements shown in FIGS. 1 to 16, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the in-plane direction.

Figure 16:
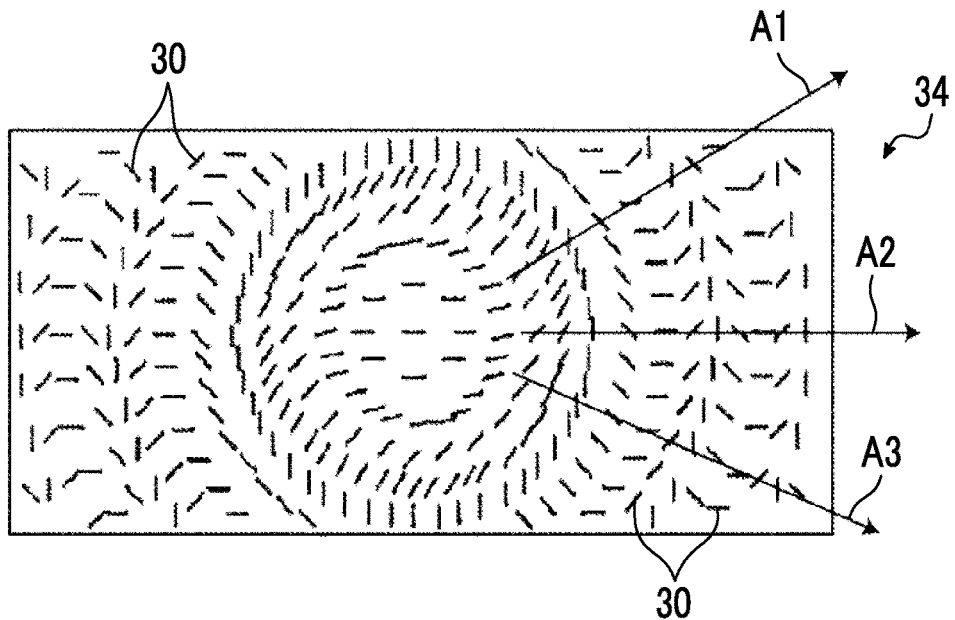
FIG. 16 is a plan view showing still another example of the optically-anisotropic layer of the optical element according to the present invention.

For example, an optically-anisotropic layer 34 conceptually shown in a plan view of FIG. 16 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside. In other words, the liquid crystal alignment pattern of the optically-anisotropic layer 34 shown in FIG. 16 is a liquid crystal alignment pattern where the in-plane direction in which the direction of the optical axis of the liquid crystal compound 30 changes while continuously rotating is provided in a radial shape from the center of the optically-anisotropic layer 34.

As in FIG. 3, only the liquid crystal compound 30 on the surface of the alignment film is shown in the optically-anisotropic layer 34 of FIG. 16. However, as described above, even in the optically-anisotropic layer 34, the liquid crystal compounds 30 are laminated on the liquid crystal compound 30 on the surface of the alignment film as shown in FIG. 2, and the liquid crystal compounds 30 are twisted and aligned in the thickness direction as in the right-twisted and left-twisted optically-anisotropic layers.

In addition, in the optically-anisotropic layer 34 shown in FIG. 16, the optically-anisotropic member may include the laminate of the right-twisted optically-anisotropic layer and the left-twisted optically-anisotropic layer in which twisted directions of twisted alignments of the liquid crystal compounds 30 are different from each other, or may include only one of the right-twisted optically-anisotropic layer or the left-twisted optically-anisotropic layer.

Further, FIG. 16 shows only the optically-anisotropic layer 34. However, as described above, the optical element according to the embodiment of the present invention includes a plurality of optically-anisotropic members including one or two optically-anisotropic layers, in which a wavelength selective phase difference layer is provided between at least one pair of two optically-anisotropic members. Accordingly, even in a case where the optically-anisotropic layer 34 having the concentric circular liquid crystal alignment pattern, for example, as in the optical element 32 shown in FIG. 11 is used, the optical element has a configuration in which a first optically-anisotropic member, a wavelength selective phase difference layer that converts circularly polarized light of red light, a second optically-anisotropic member, a wavelength selective phase difference layer that converts circularly polarized light of green light, and a third optically-anisotropic member are arranged in this order.

In the optically-anisotropic layer 34 shown in FIG. 16, the optical axis (not shown) of the liquid crystal compound 30 is a longitudinal direction of the liquid crystal compound 30.

In the optically-anisotropic layer 34, the direction of the optical axis of the liquid crystal compound 30 changes while continuously rotating in a direction in which a large number of optical axes move to the outside from the center of the optically-anisotropic layer 34, for example, a direction indicated by an arrow A1, a direction indicated by an arrow A2, a direction indicated by an arrow A3, or . . . .

In circularly polarized light incident into the optically-anisotropic layer 34 having the above-described liquid crystal alignment pattern, the absolute phase changes depending on individual local regions having different directions of optical axes of the liquid crystal compound 30. In this case, the amount of change in absolute phase varies depending on the directions of the optical axes of the liquid crystal compound 30 into which circularly polarized light is incident.

This way, in the optically-anisotropic layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically-anisotropic layer in a concentric circular shape, the optical element according to the embodiment of the present invention exhibits, for example, a function as a convex lens or a concave lens.

Here, in a case where the liquid crystal alignment pattern of the optically-anisotropic layer is concentric circular such that the optical element functions as a convex lens, it is preferable that the length of the single period Λ over which the optical axis rotates by 180° in the liquid crystal alignment pattern gradually decreases from the center of the optically-anisotropic layer 34 toward the outer direction in the in-plane direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light collecting power of the optically-anisotropic layer 34 can be improved, and the performance as a convex lens can be improved.

In the present invention, depending on the uses of the optical element such as a concave lens, it is preferable that the length of the single period Λ over which the optical axis rotates by 180° in the liquid crystal alignment pattern gradually decreases from the center of the optically-anisotropic layer 34 toward the outer direction in the in-plane direction.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light diverging power of the optically-anisotropic layer 34 can be improved, and the performance as a concave lens can be improved.

As described above, in the optically-anisotropic layer having the liquid crystal alignment pattern in which the optical axis derived from the liquid crystal compound rotates in the in-plane direction, the refraction direction of light is reversed depending on the rotation direction of the optical axis (whether the direction is clockwise or counterclockwise) and the turning direction of incident circularly polarized light. That is in the optically-anisotropic layer used in the optical element according to the embodiment of the present invention, the refraction direction of incident light is determined to be any one of the in-plane direction in which the optical axis rotates and a direction opposite to the in-plane direction in which the optical axis rotates depending on the rotation direction of the optical axis (whether the direction is clockwise or counterclockwise) and the turning direction of incident circularly polarized light.

Accordingly, in the optical element including the optically-anisotropic layer having the concentric circular liquid crystal alignment pattern as shown in FIG. 16, whether or not the optical element functions as a concave lens or a convex lens is determined depending on a combination of the rotation direction of the optical axis and the turning direction of incident circularly polarized light. In other words, by selecting the turning direction of incident circularly polarized light, whether the optical element functions as a concave lens or a convex lens can be selected.

Regarding this point, the same can be applied to the optically-anisotropic layer shown in FIG. 1 in which the optical axis 30A of the liquid crystal compound 30 continuously rotates only in the in-plane direction of the arrow X direction. By selecting the turning direction of incident circularly polarized light, whether the traveling direction of transmitted light is the arrow X direction or a direction opposite to the arrow X direction can be selected.

In the present invention, in a case where the optical element is made to function as a convex lens or a concave lens, it is preferable that the optical element satisfies the following expression.

$$\Phi(r)=(\pi/\lambda)[(r^2+f^2)^{1/2}-f]$$

Here, r represents a distance from the center of a concentric circle and is represented by the following expression "$r=(x^2+y^2)^{1/2}$". x and y represent in-plane positions, and (x,y)=(0,0) represents the center of the concentric circle. $\Phi(r)$ represents an angle of the optical axis at the distance r from the center, λ represents a wavelength, and f represents a designed focal length.

In the present invention, depending on the uses of the optical element such as a case where it is desired to provide a light amount distribution in transmitted light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: an optically-anisotropic layer in which the single period Λ is homogeneous over the entire surface; and an optically-anisotropic layer in which regions having different lengths of the single periods Λ are provided. Regarding this point, the same can also be applied to the configuration shown in FIG. 1 in which the optical axis continuously rotates only in the in-plane direction.

Figure 17:
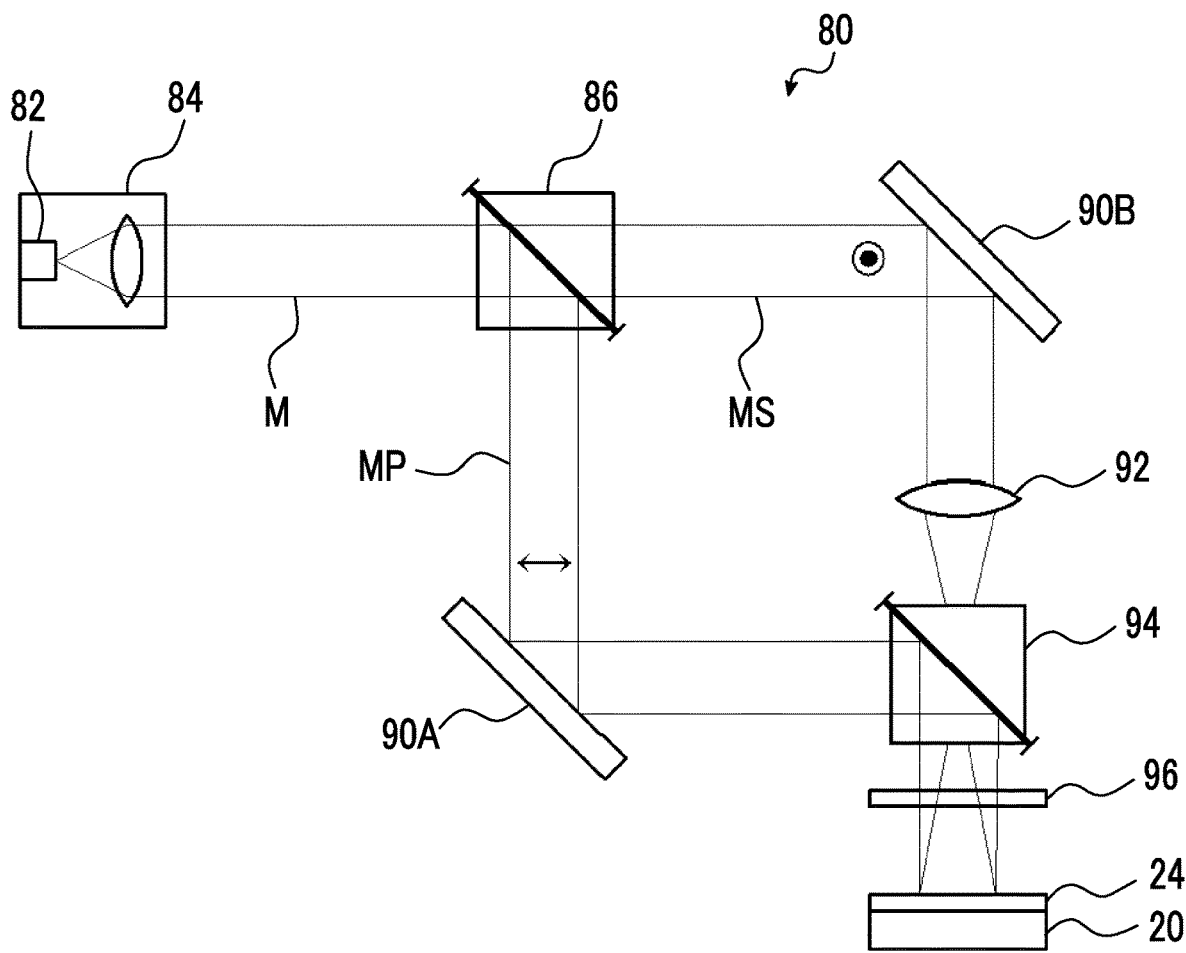
FIG. 17 is a diagram conceptually showing an example of an exposure device that exposes an alignment film forming the optically-anisotropic layer shown in FIG. 16.

FIG. 17 conceptually shows an example of an exposure device that forms the concentric circular alignment pattern in the alignment film 24. Examples of the alignment film 24 include the alignment film 24A, the alignment film 24B, and the alignment film 24C.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersecting angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the single period Λ in the liquid crystal alignment pattern in which the optical axis of the liquid crystal compound 30 continuously rotates by 180° in the in-plane direction can be controlled by changing the refractive power of the lens 92 (the F number of the lens 92), the focal length of the lens 92, the distance between the lens 92 and the alignment film 24, and the like.

In addition, by adjusting the refractive power of the lens 92, the length of the single period Λ in the liquid crystal alignment pattern in the in-plane direction in which the optical axis of the liquid crystal compound 30 continuously rotates can be changed.

Specifically, In addition, the length of the single period Λ in the liquid crystal alignment pattern in the in-plane direction in which the optical axis of the liquid crystal compound 30 continuously rotates can be changed depending on a light spread angle at which light is spread by the lens 92 due to interference with parallel light. More specifically, in a case where the refractive power of the lens 92 is weak, light is approximated to parallel light. Therefore, the length of the single period Λ in the liquid crystal alignment pattern gradually decreases from the inside toward the outside, and the F number increases. Conversely, in a case where the refractive power of the lens 92 is stronger, the length of the single period Λ in the liquid crystal alignment pattern rapidly decreases from the inside toward the outside, and the F number decreases.

This way, the configuration of changing the length of the single period Λ over which the optical axis rotates by 180° in the in-plane direction in which the optical axis continuously rotates can also be used in the configuration shown in FIGS. 1, 11, and 14 in which the optical axis 30A of the liquid crystal compound 30 changes while continuously rotating only in the in-plane direction as the arrow X direction.

For example, by gradually decreasing the single period Λ of the liquid crystal alignment pattern in the arrow X direction, an optical element that allows transmission of light to be collected can be obtained. In addition, by reversing the direction in which the optical axis in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be collected can be used.

The optical element according to the embodiment of the present invention can be used for various uses where transmission of light in a direction different from an incidence direction is allowed, for example, an optical path changing member, a light collecting element, a light diffusing element to a predetermined direction, a diffraction element, or the like in an optical device.

Figure 18:
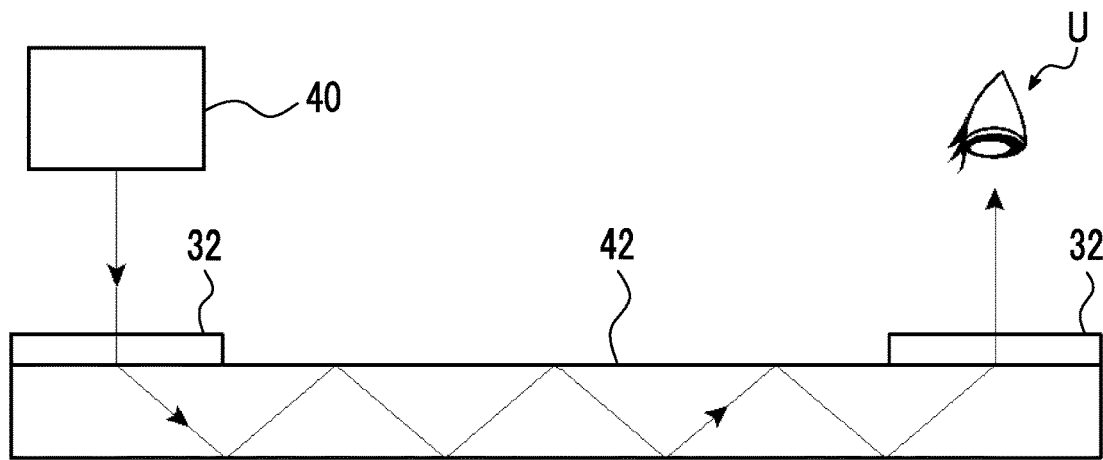
FIG. 18 is a diagram conceptually showing an example of AR glasses including an example of a light guide element according to the present invention.

In a preferable example, as conceptually shown in FIG. 18, the optical element according to the embodiment of the present invention can be used as a diffraction element that is provided to be spaced from the light guide plate 42 such that, in the above-described AR glasses, light (projection image) emitted from the display 40 is introduced into the light guide plate 42 in the above-described AR glasses at a sufficient angle for total reflection and the light propagated in the light guide plate 42 is emitted from the light guide plate 42 to an observation position by a user U in the AR glasses. That is, FIG. 18 shows a light guide element according to the embodiment of the present invention including the optical element according to the embodiment of the present invention. FIG. 18 shows the optical element 32 shown in FIG. 11 corresponding to a full color image. For example, in a case where a two-color image is displayed in the AR glasses, the optical element 10 shown in FIG. 1 can also be suitably used.

As described above, in the optical element according to the embodiment of the present invention, the wavelength dependence of the refraction angle during transmission is small. Therefore, red light, green light, and blue light emitted from the display 40 can be refracted in the same direction. Therefore, with one light guide plate 42, even in a case where red image, green image, and blue image are propagated, a full color image having no color shift can be emitted from the light guide plate to the observation position by the user U in the AR glasses. Accordingly, in the light guide element according to the embodiment of the present invention including the optical element according to the embodiment of the present invention, the light guide plate of the AR glasses can be made thin and light as a whole, and the configuration of the AR glasses can be simplified. Further, as described above, in the optical element according to the embodiment of the present invention, the amount of transmitted light is large, and thus a bright full color image can be displayed.

The light guide element according to the embodiment of the present invention is not limited to the configuration in which two optical elements according to the embodiment of the present invention spaced from each other are provided in the light guide plate 42 as shown in FIG. 18. A configuration may be adopted in which only one optical element according to the embodiment of the present invention is provided in the light guide plate for introduction or extraction of light into or from the light guide plate 42.

In the above-described example, the optical element according to the embodiment of the present invention is used as the optical element that includes two or three optically-anisotropic members and allows transmission of two light components including green light and blue light or three light components including red light, green light, and blue light to refract the light components. However, the present invention is not limited to this example, and various configurations can be used.

For example, the optical element according to the embodiment of the present invention may have a configuration in which three optically-anisotropic members and two wavelength selective phase difference layers are provided as in FIG. 11 and transmission of not only two light components selected from red light, green light, and blue light but also infrared light or ultraviolet light is allowed to refract the light components. Alternatively, the optical element according to the embodiment of the present invention may have a configuration in which four or five (or six or more) optically-anisotropic members and three or four (the number of optically-anisotropic layers−1) wavelength selective phase difference layers are provided and transmission of not only red light, green light, and blue light but also infrared light and/or ultraviolet light is allowed to refract the light components. Alternatively, the optical element according to the embodiment of the present invention may have a configuration in which two optically-anisotropic members and one wavelength selective phase difference layer are provided as in FIG. 1 and transmission of red light and blue light or transmission of red light and green light is allowed to refract the light components, a configuration in which not only one light component selected from red light, green light, or blue light but also infrared light or ultraviolet light are refracted to be transmitted. In addition, the optical element according to the embodiment of the present invention may have a configuration in which infrared light and/or ultraviolet light is refracted and transmitted.

Hereinabove, the optical element and the light guide element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of First Optically-Anisotropic Member>
(Support and Saponification Treatment of Support)
As the support, a commercially available triacetyl cellulose film (manufactured by Fujifilm Corporation, Z-TAC) was prepared.

The support was caused to pass through a dielectric heating roll at a temperature of 60° C. such that the support surface temperature was increased to 40° C.

Next, an alkali solution shown below was applied to a single surface of the support using a bar coater in an application amount of 14 mL (liter)/m$^2$, the support was heated to 110° C., and the support was transported for 10 seconds under a steam far infrared electric heater (manufactured by Noritake Co., Ltd.).

Next, 3 mL/m$^2$ of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)
The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

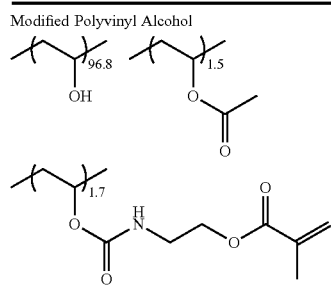

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

-Material A for Photo-Alignment-

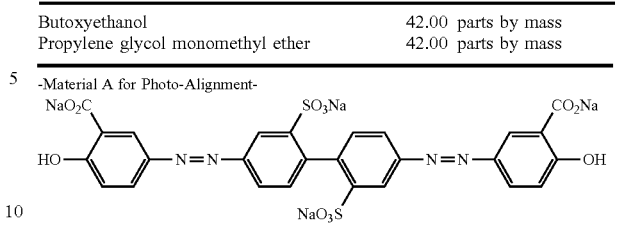

(Exposure of Alignment Film)

The alignment film was exposed using the exposure device shown in FIG. 15 to form a patterned alignment film P-1 having an alignment pattern.

In the exposure device, a laser that emits laser light having a wavelength (405 nm) was used as the semiconductor laser. The exposure dose of the interference light was 100 mJ/cm$^2$. The single period (the length over which the optical axis derived from the liquid crystal compound rotates by 180°) of an alignment pattern formed by interference of two laser beams was controlled by changing an intersecting angle (intersecting angle α) between the two beams.

(Formation of Right-Twisted Optically-Anisotropic Layer)

As the liquid crystal composition forming the optically-anisotropic layer, the following composition A-1 was prepared.

| Composition A-1 | |
|---|---|
| Liquid crystal compound L-3 | 100.00 parts by mass |
| Chiral agent Ch1 | 0.12 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 313.00 parts by mass |

Liquid Crystal Compound L-1

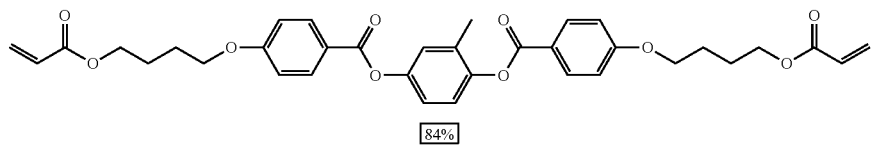 [SMILES: C=CC(=O)OCCCCOc1ccc(C(=O)Oc2ccc(OC(=O)c3ccc(OCCCCOC(=O)C=C)cc3)c(C)c2)cc1]

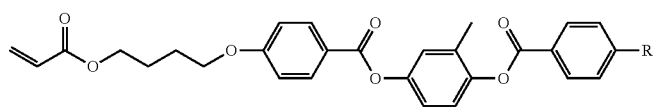

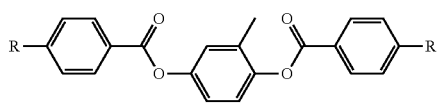

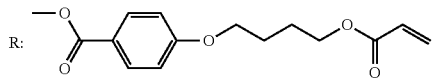

Chiral agent Ch1

Composition A-1

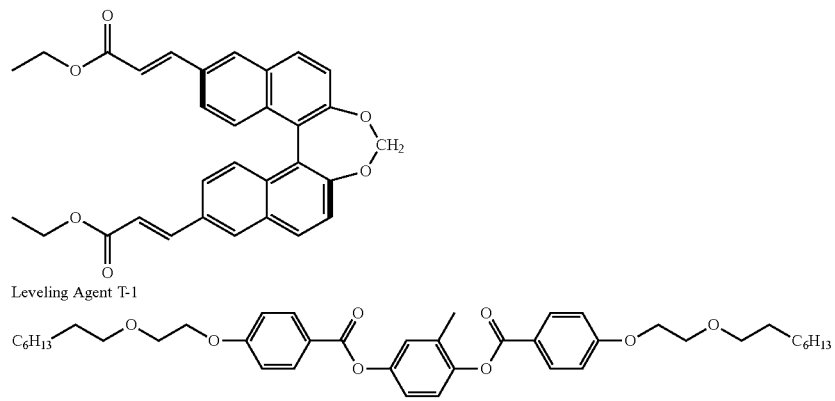

Leveling Agent T-1

The right-twisted optically-anisotropic layer was formed by applying multiple layers of the composition A-1 to the patterned alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

First, in order to form the first layer, the following composition A-1 was applied to the patterned alignment film P-1, and the coating film was heated on a hot plate at 70° C. Next, the coating film was cooled to 25° C. and was irradiated with only ultraviolet light (i-ray) having a wavelength of 365 nm using a LED light source under a nitrogen atmosphere at an irradiation dose of 40 mJ/cm². Next, the coating film was heated to 70° C. on a hot plate, was cooled to 25° C., and was irradiated with mixed ultraviolet light having a wavelength of 350 nm or shorter using a high-pressure mercury lamp under a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, the right-twisted optically-anisotropic layer was obtained.

Finally, in the right-twisted optically-anisotropic layer, $\Delta n_{550} \times$ thickness (Re(550)) of the liquid crystals was 285 nm, and it was verified using a polarizing microscope that periodic alignment occurred on the surface as shown in FIG. 3. In the liquid crystal alignment pattern of the first optically-anisotropic layer, the single period over which the optical axis derived from the liquid crystal compound rotated by 180° was 1.1 μm. Hereinafter, unless specified otherwise, "$\Delta n_{550} \times d$" and the like were measured as described above.

In addition, the twisted angle of the liquid crystal compound in the right-twisted optically-anisotropic layer was obtained by observing a cross-section of the optically-anisotropic layer with a scanning electron microscope (SEM). As a result, the twisted angle of the liquid crystal compound in the right-twisted optically-anisotropic layer was +65°.

In this example, in a case where the twisted angle of the liquid crystal compound is observed from a light incidence direction, a case where the liquid crystal compound is twisted in the right direction is represented by "+", and a case where the liquid crystal compound is twisted in the left direction opposite to the right direction is represented by "−".

(Formation of Left-Twisted Optically-Anisotropic Layer)

A composition for forming the optically-anisotropic layer was prepared using the same method, except that a chiral agent Ch2 was used instead of the chiral agent Ch1. This chiral agent is a chiral agent that twists and aligns the liquid crystal compound in a twisted direction opposite to that of the above-described chiral agent Ch1.

A left-twisted optically-anisotropic layer was directly formed on the right-twisted optically-anisotropic layer using the same method as that of the right-twisted optically-anisotropic layer except that the above-described composition was used. As a result, a first optically-anisotropic member having the configuration shown in FIG. 1 was prepared.

In a case where the measurement was performed using the same method as that of the right-twisted optically-anisotropic layer, the twisted angle of the liquid crystal compound in the left-twisted optically-anisotropic layer was −65°.

Chiral Agent Ch2

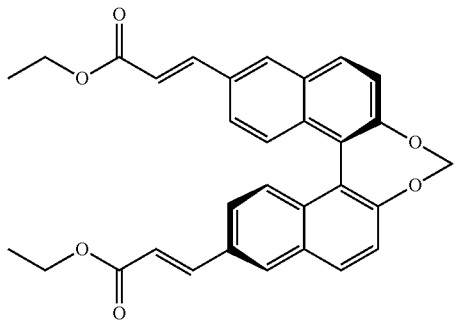

<Preparation of Second Optically-Anisotropic Member>

A patterned alignment film P-2 having an alignment pattern was formed using the same method as that of the patterned alignment film P-1, except that, in a case where the alignment film was exposed using the exposure device shown in FIG. 15, the intersecting angle between two light components was changed.

The right-twisted optically-anisotropic layer and the left-twisted optically-anisotropic layer were formed on the patterned alignment film P-2 using the same composition as that of the first optically-anisotropic member with the same method as that of the first optically-anisotropic member. As a result, a second optically-anisotropic member was prepared.

Finally, in the formed optically-anisotropic layer, $\Delta n_{550} \times$ thickness (Re(550)) of the liquid crystals was 285 nm, and it was verified using the same method as that of the first optically-anisotropic layer that periodic alignment occurred on the surface as shown in FIG. 3. In the optically-anisotropic layer forming the second optically-anisotropic member, the single period over which the optical axis derived from the liquid crystal compound rotated by 180° was 12.8 μm.

In a case where the measurement was performed using the same method as that of the first optically-anisotropic member, the twisted angle of the liquid crystal compound in the right-twisted optically-anisotropic layer of the second optically-anisotropic member was +65°, and the twisted angle of the liquid crystal compound in the left-twisted optically-anisotropic layer of the second optically-anisotropic member was −65°.

<Preparation of Third Optically-Anisotropic Member>

A patterned alignment film P-3 having an alignment pattern was formed using the same method as that of the patterned alignment film P-1, except that, in a case where the alignment film was exposed using the exposure device shown in FIG. 15, the intersecting angle between two light components was changed.

The right-twisted optically-anisotropic layer and the left-twisted optically-anisotropic layer were formed on the patterned alignment film P-2 using the same composition as that of the first optically-anisotropic member with the same method as that of the first optically-anisotropic member, except that the irradiation dose of only ultraviolet light (i-ray) having a wavelength of 365 nm using a LED light source was changed to 45 mJ/cm². As a result, a third optically-anisotropic member was prepared.

Finally, in the formed optically-anisotropic layer, $\Delta n_{550} \times$ thickness (Re(550)) of the liquid crystals was 285 nm, and it was verified using the same method as that of the first optically-anisotropic layer that periodic alignment occurred on the surface as shown in FIG. 3. In the liquid crystal alignment pattern of the optically-anisotropic layer, the single period over which the optical axis derived from the liquid crystal compound rotated by 180° was 11.9 μm.

In a case where the measurement was performed using the same method as that of the first optically-anisotropic member, the twisted angle of the liquid crystal compound in the right-twisted optically-anisotropic layer of the third optically-anisotropic member was +60°, and the twisted angle of the liquid crystal compound in the left-twisted optically-anisotropic layer of the third optically-anisotropic member was −60°.

<Preparation of Wavelength Selective Phase Difference Layer>

(Formation of Alignment Film P-3)

An alignment film P-3 was formed using the same method as that of the first optically-anisotropic member.

(Exposure of Alignment Film P-3)

By irradiating the obtained alignment film P-3 with polarized ultraviolet light (50 mJ/cm², using an extra high pressure mercury lamp), the alignment film was exposed.

(Preparation of λ/4 Plate)

As the liquid crystal composition forming the λ/4 plate, the following composition D-1 was prepared.

| Composition D-1 | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Polymerization initiator PI-1 | 0.50 parts by mass |
| Leveling agent G-1 | 0.20 parts by mass |
| Methyl ethyl ketone | 176.00 parts by mass |
| Cyclopentanone | 44.00 parts by mass |

-Liquid Crystal Compound L-2-

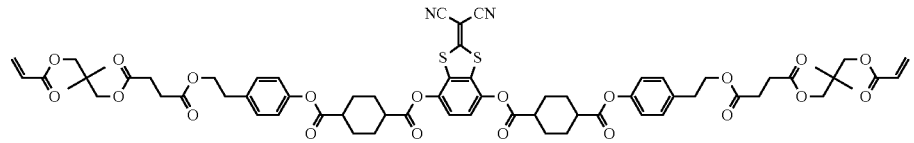

Me Position Isomer Mixture

-Liquid Crystal Compound L-3-

-continued

Composition D-1

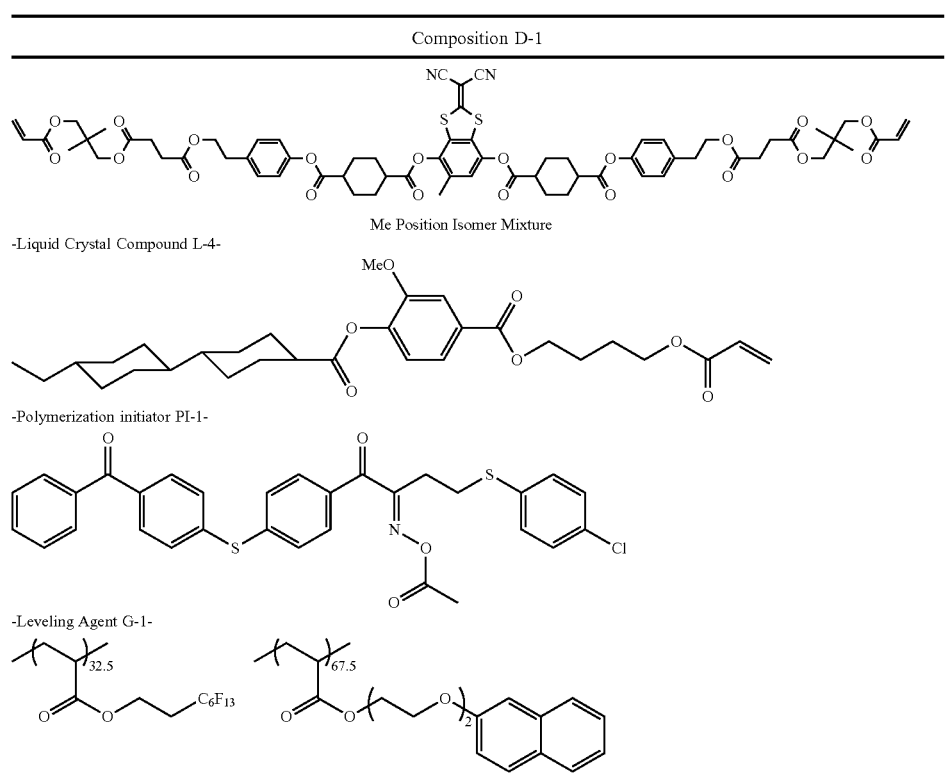

-Liquid Crystal Compound L-4-

-Polymerization initiator PI-1-

-Leveling Agent G-1-

As the λ/4 plate, a layer formed of a reverse dispersion liquid crystal compound was formed.

The λ/4 plate was formed by applying the following composition D-1 to the alignment film P-3. The applied coating film was heated using a hot plate at 100° C., the coating film was cooled to 65° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized.

As a result, a λ/4 plate was obtained. In the obtained λ/4 plate, Re(550) was 128 nm, and Re(450)/Re(550) was 0.86.

(Preparation of λ Plate at λ=490 nm)

As the liquid crystal composition forming the λ plate, the following composition D-2 was prepared.

| Composition D-2 | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent G-1 | 0.20 parts by mass |
| Methyl ethyl ketone | 243.00 parts by mass |

The λ plate was formed by applying the composition D-2 to the alignment film P-3 that was separately prepared. The applied coating film was heated using a hot plate at 70° C., the coating film was cooled to 25° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized. As a result, a λ plate was obtained.

Re(490) of the obtained λ plate at the wavelength λ=490 nm was 490 nm.

(Preparation of 2λ Plate at λ=490 nm)

A 2λ plate was obtained using the same preparation method as that of the λ plate, except that the thickness of the coating film of the liquid crystal compound was changed.

Re(490) of the obtained 2λ plate at the wavelength λ=490 nm was 980 nm.

The λ/4 plate, the λ plate, and the 2λ plate were laminated such that the layer configuration was as shown in the following Table 1. The layers were sequentially laminated such that the layer having the smallest layer number in Table 1 was the first optically-anisotropic member side. In addition, during the lamination, the layers were sequentially laminated after peeling off the support and the alignment film. As a result, a first wavelength selective phase difference layer that converted circularly polarized light of red light into circularly polarized light having an opposite turning direction and allowed transmission of the other light was prepared.

TABLE 1

| Layer Number | λ [nm] | Re(λ) [nm] | Re(450)/Re(550) | Slow Axis Direction [°] |
|---|---|---|---|---|
| 1 | 550 | 128 | 0.86 | −45 |
| 2 | 490 | 490 | 1.09 | 45 |
| 3 | 490 | 980 | 1.09 | −15.7 |
| 4 | 490 | 980 | 1.09 | 14.5 |
| 5 | 490 | 980 | 1.09 | −4 |
| 6 | 490 | 980 | 1.09 | 8.5 |
| 7 | 490 | 980 | 1.09 | −0.4 |

TABLE 1-continued

| Layer Number | λ [nm] | Re(λ) [nm] | Re(450)/Re(550) | Slow Axis Direction [°] |
|---|---|---|---|---|
| 8 | 490 | 980 | 1.09 | 6.1 |
| 9 | 490 | 980 | 1.09 | 1.5 |
| 10 | 490 | 980 | 1.09 | 4.7 |
| 11 | 550 | 128 | 0.86 | 45 |

Using the same method as described above except that Re(λ) and the slow axis direction were changed as shown in Table 2, a second wavelength selective phase difference layer that converted circularly polarized light of green light into circularly polarized light having an opposite turning direction and allowed transmission of the other light was prepared.

TABLE 2

| Layer Number | λ [nm] | Re(λ) [nm] | Re(450)/Re(550) | Slow Axis Direction [°] |
|---|---|---|---|---|
| 1 | 550 | 128 | 0.86 | 45 |
| 2 | 725 | 725 | 1.09 | −45 |
| 3 | 725 | 1450 | 1.09 | 74.3 |
| 4 | 725 | 1450 | 1.09 | −75.5 |
| 5 | 725 | 1450 | 1.09 | 86 |
| 6 | 725 | 1450 | 1.09 | −81.5 |
| 7 | 725 | 1450 | 1.09 | 89.6 |
| 8 | 725 | 1450 | 1.09 | −83.9 |

TABLE 2-continued

| Layer Number | λ [nm] | Re(λ) [nm] | Re(450)/Re(550) | Slow Axis Direction [°] |
|---|---|---|---|---|
| 9 | 725 | 1450 | 1.09 | −88.5 |
| 10 | 725 | 1450 | 1.09 | −85.3 |
| 11 | 550 | 128 | 0.86 | −45 |

<Preparation of Optical Element>

By bonding the first optically-anisotropic member, the first wavelength selective phase difference layer, the second optically-anisotropic member, the second wavelength selective phase difference layer, and the third optically-anisotropic member in this order using an adhesive, an optical element was prepared.

During bonding, the layers were bonded after peeling off the support and the alignment film from each of the optically-anisotropic layers and each of the wavelength selective phase difference layers. This configuration corresponds to the aspect where the support 20 and the alignment film 24A, 24B, and 24C are removed from the conceptual diagram shown in FIG. 11.

Example 2

<Preparation of First Optically-Anisotropic Member>

As the liquid crystal composition forming the optically-anisotropic layer, the following composition C-1 was prepared.

| Composition C-1 | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Chiral agent Ch1 | 0.06 parts by mass |
| Polymerization initiator PI-1 | 0.50 parts by mass |
| Leveling agent T-1 | 0.10 parts by mass |
| Methyl ethyl ketone | 176.00 parts by mass |
| Cyclopentanone | 44.00 parts by mass |

-Liquid Crystal Compound L-2-

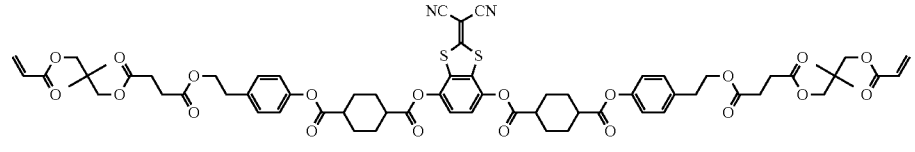

Me Position Isomer Mixture

-Liquid Crystal Compound L-3-

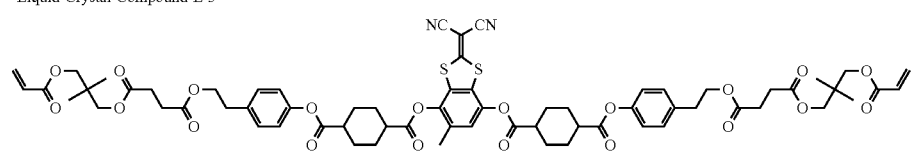

Me Position Isomer Mixture

-Liquid Crystal Compound L-4-

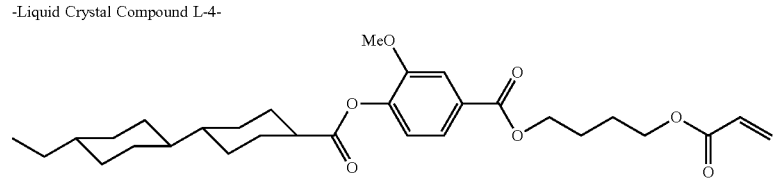

-Polymerization initiator PI-1-

-continued

Composition C-1

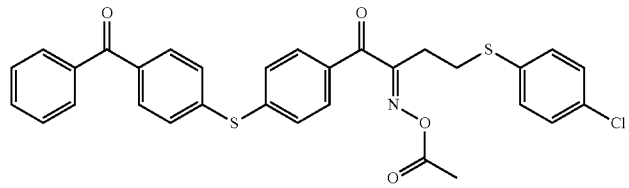 [SMILES: CC(=O)O/N=C(\CCSc1ccc(Cl)cc1)C(=O)c1ccc(Sc2ccc(C(=O)c3ccccc3)cc2)cc1]

A composition for forming the optically-anisotropic layer was prepared using the same method as that of the composition C-1, except that a chiral agent Ch2 was used instead of the chiral agent Ch1.

An optically-anisotropic layer was formed using the same method as that of Example 1, except that the composition C-1 was used for forming the right-twisted optically-anisotropic layer, a composition including the changed chiral agent was used for forming the left-twisted optically-anisotropic layer instead of the composition C-1, the coating film was heated on a hot plate at 100° C., was cooled to 80° C., and was irradiated with only ultraviolet light (i-ray) having a wavelength of 365 nm using a LED light source under a nitrogen atmosphere at an irradiation dose of 15 mJ/cm$^2$, and the coating film was heated again on a hot plate at 100° C., was cooled to 80° C., and was irradiated with mixed ultraviolet light having a wavelength of 350 nm or less using a high-pressure mercury lamp under a nitrogen atmosphere. As a result, a first optically-anisotropic member, a second optically-anisotropic member, and a third optically-anisotropic member were prepared using the same method as that of Example 1. For only the third optically-anisotropic member, the irradiation dose of only ultraviolet light (i-ray) using a LED light source was changed to 18 mJ/cm$^2$.

Finally, in the formed optically-anisotropic layer, $\Delta n_{550} \times$ thickness (Re(550)) of the liquid crystals was 275 nm, and it was verified using the same method as that of Example 1 that periodic alignment occurred on the surface as shown in FIG. 3.

In the liquid crystal alignment pattern of the optically-anisotropic layer of the first optically-anisotropic member, the single period over which the optical axis derived from the liquid crystal compound rotated by 180° was 1.1 μm.

In the liquid crystal alignment pattern of the optically-anisotropic layer of the second optically-anisotropic member, the single period over which the optical axis derived from the liquid crystal compound rotated by 180° was 12.8 μm.

In the liquid crystal alignment pattern of the optically-anisotropic layer of the third optically-anisotropic member, the single period over which the optical axis derived from the liquid crystal compound rotated by 180° was 11.9 μm.

In addition, the twisted angle of the liquid crystal compound was verified using the same method as that of Example 1.

As a result, in the first optically-anisotropic member, the twisted angle of the liquid crystal compound in the right-twisted optically-anisotropic layer was +100°, and the twisted angle of the liquid crystal compound in the left-twisted optically-anisotropic layer was −100°.

In addition, in the second optically-anisotropic member, the twisted angle of the liquid crystal compound in the right-twisted optically-anisotropic layer was +100°, and the twisted angle of the liquid crystal compound in the left-twisted optically-anisotropic layer was −100°.

Further, in the third optically-anisotropic member, the twisted angle of the liquid crystal compound in the right-twisted optically-anisotropic layer was +90°, and the twisted angle of the liquid crystal compound in the left-twisted optically-anisotropic layer was −90°.

<Wavelength Selective Phase Difference Layer>

The same first wavelength selective phase difference layer and the second wavelength selective phase difference layer as those of Example 1 were used.

<Preparation of Optical Element>

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

Example 3

An optical element was prepared using the same method as that of Example 1, except that the first optically-anisotropic member did not include the left-twisted optically-anisotropic layer.

Comparative Example 1

As an optical element, the first optically-anisotropic member according to Example 1 was used.

Comparative Example 2

An optical element was prepared using the same method as that of Example 1, except that the first wavelength selective phase difference layer and the second wavelength selective phase difference layer were not used.

Comparative Example 3

A composition for forming the optically-anisotropic layer was prepared using the same method as described above, except that the chiral agent was removed from the composition A-1 forming the right-twisted optically-anisotropic layer.

An optically-anisotropic layer was formed using the same method as that of the right-twisted optically-anisotropic layer according to Example 1, except that the above-described composition was used and the coating film was heated using a hot plate at 70° C., was cooled to 25° C., and was irradiated with ultraviolet light having a wavelength of 365 nm at an irradiation dose of 100 mJ/cm$^2$ using a high-pressure mercury lamp in a nitrogen atmosphere to immobilize the alignment of the liquid crystal compound. In addition, a first optically-anisotropic member, a second optically-anisotropic member, and a third optically-anisotropic member were formed using the same method as that of Example 1, except that the left-twisted optically-anisotropic layer was not formed.

Using this optically-anisotropic member, an optical element was prepared using the same method as that of Example 1.

Comparative Example 4

As an optical element, the first optically-anisotropic member according to Example 2 was used.

Examples 4 to 13

<Preparation of Optically-Anisotropic Member>

Various first optically-anisotropic members, second optically-anisotropic members, and third optically-anisotropic members having the single periods shown in Table 3 below over which the optical axis derived from the liquid crystal compound rotated by 180° in the liquid crystal alignment patterns were prepared using the same method as that of Example 1, except that, in a case where the alignment film was exposed using the exposure device shown in FIG. 15, the intersecting angle between two light components was changed to various values.

In the liquid crystal alignment pattern of each of the optically-anisotropic members, the single period over which the optical axis derived from the liquid crystal compound rotated by 180° was verified using the same method as that of Example 1. In the liquid crystal alignment pattern, the single period over which the optical axis derived from the liquid crystal compound rotated by 180° was shown in Table 3.

<Wavelength Selective Phase Difference Layer>

The same first wavelength selective phase difference layer and the second wavelength selective phase difference layer as those of Example 1 were used.

<Preparation of Optical Element>

An optical element was prepared with the same method as that of Example 1 using the first optically-anisotropic member, the second optically-anisotropic member, the third optically-anisotropic member, the first wavelength selective phase difference layer, and the second wavelength selective phase difference layer.

<Preparation of Circular Polarization Plate>

In order to perform "Evaluation of Wavelength Dependence of Transmission" and Evaluation of Brightness" described below, a circular polarization plate B, a circular polarization plate G, and a circular polarization plate R were prepared as follows.

First, the circular polarization plate G was prepared.

First, the support on which the undercoat layer was formed was prepared using the same method as that of Example 1.

(Formation of Patterned Alignment Film P-0)

The following patterned alignment film P-0-forming coating solution was continuously applied to the support on which the undercoat layer was formed using a #2.4 wire bar. The support on which the coating film of the patterned alignment film P-0-forming coating solution was formed was dried using a hot plate at 80° C. for 5 minutes. As a result, a patterned alignment film P-0 was formed.

Patterned Alignment Film P—O-Forming Coating Solution

| Material for photo-alignment Polymer A2 | 4.35 parts by mass |
|---|---|
| Low molecular weight compound B2 | 0.80 parts by mass |
| Crosslinking agent C1 | 2.20 parts by mass |
| Compound D1 | 0.48 parts by mass |
| Compound D2 | 1.15 parts by mass |
| Butyl acetate | 100.00 parts by mass |

((Synthesis of Polymer A2))

100 parts by mass of 2-(3,4-epoxycyclohexyl)ethyltrimethoxysilane, 500 parts by mass of methyl isobutyl ketone, and 10 parts by mass of triethylamine were charged into a reaction vessel equipped with a stirrer, a thermometer, a dropping funnel, and a reflux cooling pipe and were mixed with each other at room temperature. Next, 100 parts by mass of deionized water was added dropwise for 30 minutes using a dropping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid.

In a case where the epoxy-containing polyorganosiloxane was analyzed by nuclear magnetic resonance ($^1$H-NMR), a peak having a theoretical intensity based on an oxiranyl group was obtained in the vicinity of chemical shift (δ)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, ω-carboxypolycaprolactone monoacrylate (polymerization degree n≈2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times.

An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

—Polymer A2—

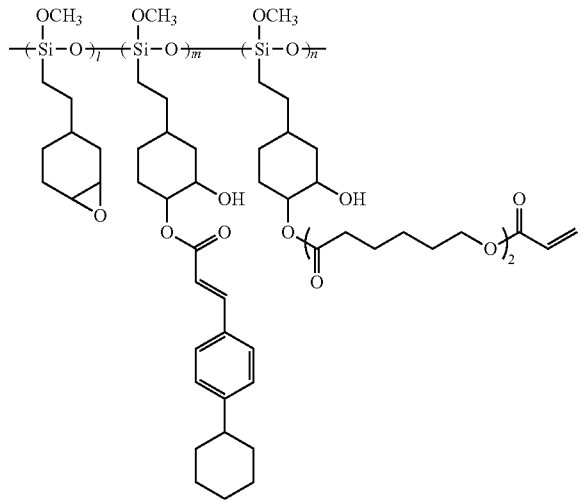

—Low Molecular Weight Compound B2—

The low molecular weight compound B2 represented by the following formula (manufactured by Nissin Ion Equipment Co., Ltd., NOMCOAT TAB) was used.

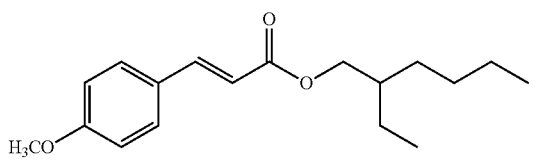

—Crosslinking Agent C1—

The crosslinking agent C1 (manufactured by Nagase ChemteX Corporation, DENACOL EX411) represented by the following formula was used.

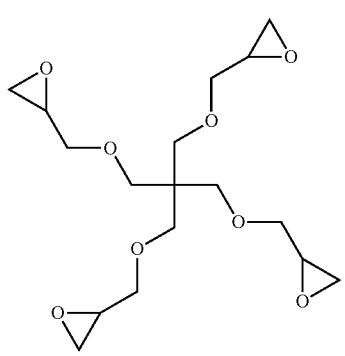

—Compound D1—

The following compound D1 (manufactured by Kawaken Fine Chemicals Co., Ltd., ALUMINUM CHELATE A(W)) represented by the following formula was used.

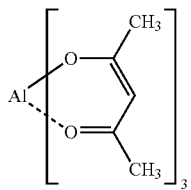

—Compound D2—

The compound D2 (manufactured by Toyo Science Corp., triphenylsilanol) represented by the following formula was used.

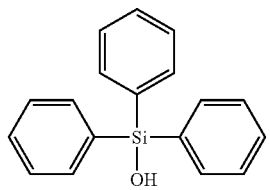

(Exposure of Patterned Alignment Film P-0)

By irradiating the obtained patterned alignment film P-0 with polarized ultraviolet light (20 mJ/cm², using an extra high pressure mercury lamp), the patterned alignment film P-0 was exposed.

<<Preparation of λ/4 Plate>>

An λ/4 plate (optically-anisotropic layer) was formed by applying the composition C-1 to the patterned alignment film P-0. The applied coating film was heated using a hot plate at 110° C., the coating film was cooled to 60° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized, and an optically-anisotropic layer was prepared.

In the obtained λ/4 plate, $\Delta n_{530} \times d$ (Re(530)) was 132.5 nm.

<<Preparation of Circular Polarization Plate G>>

A polarizing plate was bonded to the triacetyl cellulose film side of the λ/4 plate through a pressure sensitive adhesive to obtain a circular polarization plate G.

<<Preparation of Circular Polarization Plate B and Circular Polarization Plate R>>

A circular polarization plate B and a circular polarization plate R were prepared using the same method as that of the circular polarization plate G, except that the thickness of the λ/4 plate (optically-anisotropic layer) was changed such that $\Delta n_{450} \times d$ (Re(450)) was 112.5 nm and $\Delta n_{635} \times d$ (Re(635)) was 158.8 nm.

[Evaluation of Wavelength Dependence of Transmission]

In a case where light was incident into the prepared optical element from the front (direction with an angle of 0° with respect to the normal line), angles of transmitted light of red light, green light, and blue light with respect to the incidence light were measured. The angles of the transmitted light were angles of transmitted light with respect to the incidence light in a case where the incidence light was incident at 0°.

Specifically, each of laser beams having an output center wavelength in a red light range (635 nm), a green light range (530 nm), and a blue light range (450 nm) was caused to be vertically incident into the prepared optical element from a position at a distance of 10 cm in the normal direction, and transmitted light was captured using a screen disposed at a distance of 100 cm to calculate a transmission angle. That is, in this example, the designed wavelength λa of light having the longest wavelength was 635 nm, the designed wavelength λb of light having the intermediate wavelength was 530 nm, and the designed wavelength λc of light having the shortest wavelength was 450 nm.

Laser light was caused to be vertically incident into the circular polarization plate B, the circular polarization plate G, and the circular polarization plate R corresponding to the respective wavelengths to be converted into circularly polarized light, the circularly polarized light was incident into the prepared optical element, and the evaluation was performed.

Based on an average transmission angle $\theta_{ave}$ of the red light, the green light, and the blue light and a maximum transmission angle $\theta_{max}$ and a minimum transmission angle $\theta_{min}$ among the transmission angles of the red light, the green light, and the blue light, a wavelength dependence of refraction of transmitted light PE [%] was calculated from the following expression. As PE decreased, the wavelength dependence of refraction of transmitted light was low.

$$PE[\%]=[(\theta_{max}-\theta_{min})/\theta_{ave}]\times 100$$

A case where PE was 5% or lower was evaluated as AA.

A case where PE was higher than 5% and 10% or lower was evaluated as A.

A case where PE was higher than 10% and 20% or lower was evaluated as B.

A case where PE was higher than 20% and 30% or lower was evaluated as C.

A case where PE was higher than 30% was evaluated as D.

The results are shown in Table 3.

[Evaluation of Brightness]

Figure 20:
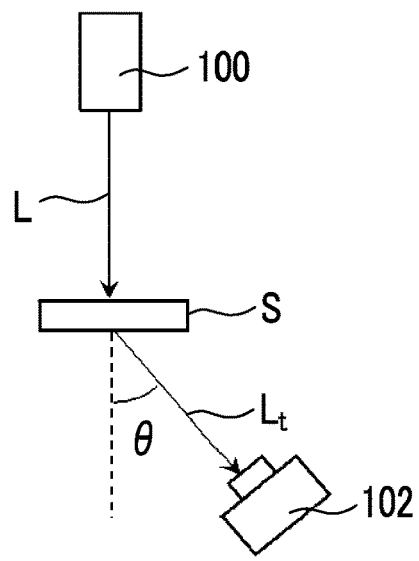
FIG. 20 is a conceptual diagram showing a method of measuring a light intensity.

In a case where light was incident into the prepared optical element from the front (direction with an angle of 0° with respect to the normal line) using the method shown in FIG. 20, a relative light intensity of transmitted light with respect to the incidence light was measured.

Specifically, laser light L having an output center wavelength in a red light range (635 nm), a green light range (530 nm), and a blue light range (450 nm) was caused to be vertically incident into the prepared optical element S from a light source 100. The intensity of transmitted light $L_t$ transmitted at a transmission angle θ was measured using a photodetector 102.

A ratio between the light intensity of the transmitted light $L_t$ and the light intensity of the laser light L was obtained to obtain the value of the relative light intensity of the transmitted light $L_t$ relative to the incidence light (laser light L) (transmitted light $L_t$/laser light L). An average relative light intensity value (relative light intensity) of red light, green light, and blue light was calculated to perform evaluation. As the transmission angle θ, the transmission angle of each of red light, green light, and blue light measured as described above was used.

Laser light was caused to be vertically incident into the circular polarization plate B, the circular polarization plate G, and the circular polarization plate R corresponding to the respective wavelengths to be converted into circularly polarized light, the circularly polarized light was incident into the prepared optical element, and the evaluation was performed.

The results will be described below.

Table 3 below shows the configuration of each of the optical elements and the evaluation results of the average transmission angle [°] and PE (the wavelength dependence of transmission).

In each of the optically-anisotropic members, the optical characteristics of the optical element were affected by only the optically-anisotropic layer. In addition, the members other than the optically-anisotropic layer were basically homogeneous. Therefore, Table 3 shows only the characteristics of the optically-anisotropic layer.

In addition, the left-twisted optically-anisotropic layer is basically the same as the right-twisted optically-anisotropic layer except for the twisted angle of the liquid crystal compound. Therefore, for the left-twisted optically-anisotropic layer, only the twisted angle of the liquid crystal compound is shown in Table 3.

TABLE 3

| | | Example 1 | Example 2 | Example 3 | Comparative Example 1 | Comparative Example 2 | Comparative Example 3 | Comparative Example 4 |
|---|---|---|---|---|---|---|---|---|
| First Optically-Anisotropic Layer | Right-Twisted Optically-Anisotropic Layer | Composition | | | | | | |
| | | A-1 | C-1 | A-1 | A-1 | A-1 | A-1 | C-1 |
| | | $\Delta n_{550} \times$ Thickness [nm] | | | | | | |
| | | 285 | 275 | 285 | 285 | 285 | 285 | 275 |
| | | $(\Delta n_{450} \times$ Thickness)/ $(\Delta n_{550} \times$ Thickness) [nm] | | | | | | |
| | | 1.09 | 0.36 | 1.09 | 1.09 | 1.09 | 1.09 | 0.36 |
| | | Single Period [μm] | | | | | | |
| | | 1.1 | 1.1 | 1.1 | 1.1 | 1.1 | 1.1 | 1.1 |
| | | Twisted Angle [°] of Liquid Crystal Compound | | | | | | |
| | | +65 | +100 | +65 | +65 | +65 | 0 | +100 |
| | Left-Twisted Optically-Anisotropic Layer | Twisted Angle [°] of Liquid Crystal Compound | | | | | | |
| | | −65 | −100 | None | −65 | −65 | None | −100 |
| First Wavelength Selective Phase Difference Layer (Convert Red Light) | | Provided | Provided | Provided | None | None | Provided | None |
| Second Optically-Anisotropic Layer | Right-Twisted Optically-Anisotropic Layer | Composition | | | | | | |
| | | A-1 | C-1 | A-1 | — | A-1 | A-1 | — |
| | | $\Delta n_{550} \times$ Thickness [nm] | | | | | | |
| | | 285 | 275 | 285 | — | 285 | 285 | — |
| | | $(\Delta n_{450} \times$ Thickness)/ $(\Delta n_{550} \times$ Thickness) [nm] | | | | | | |
| | | 1.09 | 0.86 | 1.09 | — | 1.09 | 1.09 | — |
| | | Single Period [μm] | | | | | | |
| | | 12.8 | 12.8 | 12.8 | — | 12.8 | 12.8 | — |
| | | Twisted Angle [°] of Liquid Crystal Compound | | | | | | |
| | | +65 | +100 | +65 | — | +65 | 0 | — |
| | Left-Twisted Optically-Anisotropic Layer | Twisted Angle [°] of Liquid Crystal Compound | | | | | | |
| | | −65 | −100 | −65 | — | −65 | | — |
| Second Wavelength Selective Phase Difference Layer (Convert Green Light) | | Provided | Provided | Provided | None | None | Provided | None |
| Third Optically-Anisotropic Layer | Right-Twisted Optically-Anisotropic Layer | Composition | | | | | | |
| | | A-1 | C-1 | A-1 | — | A-1 | A-1 | — |
| | | $\Delta n_{550} \times$ Thickness [nm] | | | | | | |
| | | 285 | 275 | 285 | — | 285 | 285 | — |
| | | $(\Delta n_{450} \times$ Thickness)/ $(\Delta n_{550} \times$ Thickness) [nm] | | | | | | |
| | | 1.09 | 0.86 | 1.09 | — | 1.09 | 1.09 | — |
| | | Single Period [μm] | | | | | | |
| | | 11.9 | 11.9 | 11.9 | — | 11.9 | 11.9 | — |
| | | Twisted Angle [°] of Liquid Crystal Compound | | | | | | |
| | | +60 | +90 | +60 | — | +60 | 0 | — |
| | Left-Twisted Optically-Anisotropic Layer | Twisted Angle [°] of Liquid Crystal Compound | | | | | | |
| | | −60 | −90 | −60 | — | −60 | | — |
| Evaluation | | Average Transmission Angle [°] | | | | | | |
| | | 30 | 30 | 30 | 31 | 37 | 30 | 30 |
| | | PE (Wavelength Dependence of Transmission) | | | | | | |
| | | AA | AA | AA | D | D | AA | D |

TABLE 3-continued

| | | Example 4 | Example 5 | Example 6 | Example 7 | Example 8 | Example 9 | Example 10 | Example 11 | Example 12 | Example 13 |
|---|---|---|---|---|---|---|---|---|---|---|---|
| First Optically-Anisotropic Layer | Right-Twisted Optically-Anisotropic Layer | Composition | | | | | | | | | |
| | | $\Delta n_{550}$ × Thickness [nm] | A-1 | A-1 | A-1 | A-1 | A-1 | A-1 | A-1 | A-1 | A-1 | A-1 |
| | | ($\Delta n_{450}$ × Thickness)/ ($\Delta n_{550}$ × Thickness) [nm] | 285 | 285 | 285 | 285 | 285 | 285 | 285 | 285 | 285 | 285 |
| | | Single Period [μm] | 1.09 | 1.09 | 1.09 | 1.09 | 1.09 | 1.09 | 1.09 | 1.09 | 1.09 | 1.09 |
| | | Twisted Angle [°] of Liquid Crystal Compound | 1.1 | 1.1 | 1.1 | 1.1 | 1.1 | 1.1 | 1.1 | 1.1 | 1.1 | 1.1 |
| | | | +65 | +65 | +65 | +65 | +65 | +65 | +65 | +65 | +65 | +65 |
| | Left-Twisted Optically-Anisotropic Layer | Twisted Angle [°] of Liquid Crystal Compound | −65 | −65 | −65 | −65 | −65 | −65 | −65 | −65 | −65 | −65 |
| First Wavelength Selective Phase Difference Layer (Convert Red Light) | | | Provided | Provided | Provided | Provided | Provided | Provided | Provided | Provided | Provided | Provided |
| Second Optically-Anisotropic Layer | Right-Twisted Optically-Anisotropic Layer | Composition | A-1 | A-1 | A-1 | A-1 | A-1 | A-1 | A-1 | A-1 | A-1 | A-1 |
| | | $\Delta n_{550}$ × Thickness [nm] | 285 | 285 | 285 | 285 | 285 | 285 | 285 | 285 | 285 | 285 |
| | | ($\Delta n_{450}$ × Thickness)/ ($\Delta n_{550}$ × Thickness) [nm] | 1.09 | 1.09 | 1.09 | 1.09 | 1.09 | 1.09 | 1.09 | 1.09 | 1.09 | 1.09 |
| | | Single Period [μm] | 11.5 | 14.5 | 10.4 | 16.7 | 9.0 | 23.1 | 7.7 | 38.5 | 10.4 | 16.7 |
| | | Twisted Angle [°] of Liquid Crystal Compound | +65 | +65 | +65 | +65 | +65 | +65 | +65 | +65 | +65 | +65 |
| | Left-Twisted Optically-Anisotropic Layer | Twisted Angle [°] of Liquid Crystal Compound | −65 | −65 | −65 | −65 | −65 | −65 | −65 | −65 | −65 | −65 |
| Second Wavelength Selective Phase Difference Layer (Convert Green Light) | | | Provided | Provided | Provided | Provided | Provided | Provided | Provided | Provided | Provided | Provided |
| Third Optically-Anisotropic Layer | Right-Twisted Optically-Anisotropic Layer | Composition | A-1 | A-1 | A-1 | A-1 | A-1 | A-1 | A-1 | A-1 | A-1 | A-1 |
| | | $\Delta n_{550}$ × Thickness [nm] | 285 | 285 | 285 | 285 | 285 | 285 | 285 | 285 | 285 | 285 |
| | | ($\Delta n_{450}$ × Thickness)/ ($\Delta n_{550}$ × Thickness) [nm] | 1.09 | 1.09 | 1.09 | 1.09 | 1.09 | 1.09 | 1.09 | 1.09 | 1.09 | 1.09 |
| | | Single Period [μm] | 10.7 | 13.5 | 9.7 | 15.5 | 8.3 | 21.5 | 7.2 | 35.8 | 6.9 | 41.7 |
| | | Twisted Angle [°] of Liquid Crystal Compound | +60 | +60 | +60 | +60 | +60 | +60 | +60 | +60 | +60 | +60 |
| | Left-Twisted Optically-Anisotropic Layer | Twisted Angle [°] of Liquid Crystal Compound | −60 | −60 | −60 | −60 | −60 | −60 | −60 | −60 | −60 | −60 |
| Evaluation | | Average Transmission Angle [°] | 30 | 30 | 30 | 30 | 30 | 30 | 30 | 30 | 29 | 31 |
| | | PE (Wavelength Dependence of Transmission) | AA | AA | A | A | B | B | C | C | B | B |

The transmission angle refers to an angle with respect to incidence light in a case where an incidence angle of the incidence light is 0°.
The wavelength selective phase difference layer converts circularly polarized light of the described color into circularly polarized light having an opposite turning direction.

Although not shown in Table 3, regarding the evaluation of the brightness, in Examples 1 and 3, the relative light intensity was improved by 5% or higher as compared to Comparative Examples 1 to 3. In addition, in Example 2, the relative light intensity was improved by 5% or higher as compared to Comparative Example 4. In Examples 4 to 13, the relative light intensity was improved by 5% or higher as compared to Comparative Examples 1 to 3.

As shown in the above-described table, the optical element according to the embodiment of the present invention includes a plurality of optically-anisotropic members that include an optically-anisotropic layer having a liquid crystal alignment pattern in which an optical axis derived from a liquid crystal compound rotates in one in-plane direction and having a configuration the liquid crystal compound is twisted and aligned in a thickness direction, a single period in the liquid crystal alignment pattern of at least one optically-anisotropic layer is different from that of another optically-anisotropic layer, and a wavelength selective phase difference layer is provided between optically-anisotropic layers adjacent to each other. As a result, the wavelength dependence of an emission angle of transmitted light is small, and red light, green light, and blue light that are transmitted can be emitted substantially in the same direction. Further, the amount of transmitted light is also large as described above.

In addition, in the optical elements according to Examples 8 and 9 in which a relationship between the single period $\Lambda$ over which the optical axis of the liquid crystal compound in the liquid crystal alignment pattern rotated by 180° and the designed wavelengths $\lambda a$, $\lambda b$, and $\lambda c$ was in the more preferable range "$0.7*\{[(\lambda a+\lambda c)\lambda b/(\lambda a-\lambda b)\lambda c]\Lambda_1\} \le \Lambda_2 \le 1.8*\{[(\lambda a+\lambda c)\lambda b/(\lambda a-\lambda b)\lambda c]\Lambda_1\}$" and "$0.7*\{[(\lambda a+\lambda c)\lambda b/(\lambda b-\lambda c)\lambda a]\Lambda_1\} \le \Lambda_3 \le 1.8*\{[(\lambda a+\lambda c)\lambda b/(\lambda b-\lambda c)\lambda a]\Lambda_1\}$, the wavelength dependence of the emission angle of transmitted light was smaller (Evaluation of PE: B).

In addition, in the optical elements according to Examples 6 and 7 in which a relationship between the single period $\Lambda$ over which the optical axis of the liquid crystal compound in the liquid crystal alignment pattern rotated by 180° and the designed wavelengths $\lambda a$, $\lambda b$, and $\lambda c$ was in the still more preferable range "$0.8*\{[(\lambda a+\lambda c)\lambda b/(\lambda a-\lambda b)\lambda c]\Lambda_1\} \le \Lambda_2 \le 1.3*\{[(\lambda a+\lambda c)\lambda b/(\lambda a-\lambda b)\lambda c]\Lambda_1\}$" and "$0.8*\{[(\lambda a+\lambda c)\lambda b/(\lambda b-\lambda c)\lambda a]\Lambda_1\} \le \Lambda_3 \le 1.3*\{[(\lambda a+\lambda c)\lambda b/(\lambda b-\lambda c)\lambda a]\Lambda_1\}$, the wavelength dependence of the emission angle of transmitted light was much smaller (Evaluation of PE: A).

In particular, in the optical elements according to Examples 1 to 5 in which a relationship between the single period $\Lambda$ over which the optical axis of the liquid crystal compound in the liquid crystal alignment pattern rotated by 180° and the designed wavelengths $\lambda a$, $\lambda b$, and $\lambda c$ was in the still more preferable range "$0.9*\{[(\lambda a+\lambda c)\lambda b/(\lambda a-\lambda b)\lambda c]\Lambda_1\} \le \Lambda_2 \le 1.15*\{[(\lambda a+\lambda c)\lambda b/(\lambda a-\lambda b)\lambda c]\Lambda_1\}$" and "$0.9*\{[(\lambda a+\lambda c)\lambda b/(\lambda b-\lambda c)\lambda a]\Lambda_1\} \le \Lambda_3 \le 1.15*\{[(\lambda a+\lambda c)\lambda b/(\lambda b-\lambda c)\lambda a]\Lambda_1\}$, the wavelength dependence of the emission angle of transmitted light was much smaller (Evaluation of PE: AA).

In addition, in the optical elements according to Examples 12 and 13 in which a relationship between the single period $\Lambda$ over which the optical axis of the liquid crystal compound in the liquid crystal alignment pattern rotated by 180° and the designed wavelengths $\lambda a$, $\lambda b$, and $\lambda c$ satisfied only one of the expressions, the wavelength dependence of the emission angle of transmitted light was more than that of Examples 6 and 7 but was sufficiently small.

On the other hand, in Comparative Examples 1 and 4 including only one optically-anisotropic member and in Comparative Example 2 not including the wavelength selective phase difference layer, the wavelength dependence of an emission angle of transmitted light was large, red light, green light, and blue light that was transmitted was emitted in different directions, and the amount of transmitted light was also small. In addition, in Comparative Example 3 in which the optically-anisotropic layer was not twisted and aligned, that is, the twisted angle of the liquid crystal compound was "0°", the amount of transmitted light was small as described above.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES 10, 32: optical element
12: first optically-anisotropic member
14: second optically-anisotropic member
16: third optically-anisotropic member
18G, 18R: wavelength selective phase difference layer
20: support
24A, 24B, 24C: alignment film
26: optically-anisotropic layer
26Ap, 26Bp, 26Cp: right-twisted optically-anisotropic layer
26Am, 26Bm, 26Cm: left-twisted optically-anisotropic layer
30: liquid crystal compound
30A: optical axis
34: optically-anisotropic layer
40: display
42: light guide plate
60, 80: exposure device
62, 82: laser
64, 84: light source
68: beam splitter
70A, 70B, 90A, 90B: mirror
72A, 72B, 96: $\lambda/4$ plate
86, 94: polarization beam splitter
92: lens
$B_R$, $B_{2R}$: right circularly polarized light of blue light
$G_R$, $G_{1R}$, $G_{2R}$, $G_{3R}$: right circularly polarized light of green light
$R_R$, $R_{1R}$, $R_{3R}$: right circularly polarized light of red light
$B_{1L}$, $B_{3L}$: left circularly polarized light of blue light
$G_{1L}$, $G_{2L}$: left circularly polarized light of green light
$R_{1L}$, $R_{2L}$: left circularly polarized light of red light
M: laser light
MA, MB: beam
MP: P polarized light
MS: S polarized light
$P_O$: linearly polarized light
$P_R$: right circularly polarized light
$P_L$: left circularly polarized light
Q1, Q2: absolute phase
E1, E2: equiphase surface
U: user

What is claimed is:

1. An optical element comprising:
a plurality of optically-anisotropic members including at least one optically-anisotropic layer that is formed using a composition including a liquid crystal compound and has a liquid crystal alignment pattern in which a direction of an optical axis derived from the liquid crystal compound changes while continuously rotating in at least an in-plane direction; and a wavelength selective phase difference layer that is disposed between at least one pair of optically-anisotropic members among the plurality of optically-anisotropic members and converts circularly polarized light in a specific wavelength range into circularly polarized light having an opposite turning direction, wherein in a case where, in the liquid crystal alignment pattern, a length over which the direction of the optical axis rotates by 180° in the in-plane direction in which the direction of the optical axis changes while continuously rotating is set as a single period, the length of the single period in the optically-anisotropic layer of at least one optically-anisotropic member is different from that in the optically-anisotropic layer of another optically-anisotropic member, the liquid crystal compound in the optically-anisotropic layer is twisted and aligned in a thickness direction, and the at least one optically-anisotropic member includes two optically-anisotropic layers having the same in-plane liquid crystal alignment pattern and opposite twisted directions of twisted alignments of the liquid crystal compounds.

2. The optical element according to claim 1,
wherein an optically-anisotropic member positioned at one end in an arrangement direction of the optically-anisotropic members includes one optically-anisotropic layer.

3. The optical element according to claim 1,
wherein each of all the optically-anisotropic members includes the two optically-anisotropic layers.

4. The optical element according to claim 1,
wherein the wavelength selective phase difference layer is disposed between each of plural pairs of adjacent optically-anisotropic members, and
a specific wavelength range in which circularly polarized light is converted by the wavelength selective phase difference layer gradually decreases in an arrangement direction of the optically-anisotropic members.

5. The optical element according to claim 1,
wherein the length of the single period in the liquid crystal alignment pattern of the optically-anisotropic layer varies depending on all the optically-anisotropic members.

6. The optical element according to claim 1,
wherein the optically-anisotropic members and the wavelength selective phase difference layers are alternately disposed.

7. The optical element according to claim 1,
wherein in the optically-anisotropic layer of the optically-anisotropic member positioned at one end in an arrangement direction of the optically-anisotropic members, the length of the single period in the liquid crystal alignment pattern is the shortest.

8. The optical element according to claim 1,
wherein the optically-anisotropic layer of the at least one the optically-anisotropic member has in-plane regions having different lengths of the single periods in the liquid crystal alignment pattern.

9. The optical element according to claim 8,
wherein the length of the single period in the liquid crystal alignment pattern gradually decreases in the in-plane direction in which the direction of the optical axis derived from the liquid crystal compound changes while continuously rotating in the liquid crystal alignment pattern.

10. The optical element according to claim 1,
wherein the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

11. The optical element according to claim 1, comprising:
three or more optically-anisotropic members; and
two or more wavelength selective phase difference layers.

12. The optical element according to claim 11,
wherein one wavelength selective phase difference layer converts circularly polarized light of red light into circularly polarized light having an opposite turning direction, and
another wavelength selective phase difference layer converts circularly polarized light of green light into circularly polarized light having an opposite turning direction.

13. The optical element according to claim 1,
wherein the wavelength selective phase difference layer consists of a plurality of phase difference layers, and
an in-plane slow axis direction of at least one phase difference layer is different from that of another phase difference layer.

14. The optical element according to claim 13,
wherein at least one phase difference layer in the wavelength selective phase difference layer is a λ/4 plate.

15. The optical element according to claim 14,
wherein the λ/4 plate in the wavelength selective phase difference layer has reverse wavelength dispersion properties, and
at least one other phase difference layer has forward wavelength dispersion properties.

16. A light guide element comprising:
the optical element according to claim 1; and
a light guide plate.

17. The light guide element according to claim 16,
wherein two optical elements spaced from each other are provided in the light guide plate.

* * * * *